(12) United States Patent
Craig

(10) Patent No.: US 12,554,700 B2
(45) Date of Patent: Feb. 17, 2026

(54) DISTRIBUTED STREAM-BASED ACID TRANSACTIONS

(71) Applicant: NASDAQ, INC., New York, NY (US)

(72) Inventor: Michael Craig, Wayne, NJ (US)

(73) Assignee: NASDAQ, INC., New York, NY (US)

( * ) Notice: Subject to any disclaimer, the term of this patent is extended or adjusted under 35 U.S.C. 154(b) by 0 days.

(21) Appl. No.: 18/667,338

(22) Filed: May 17, 2024

(65) Prior Publication Data

US 2025/0355859 A1 Nov. 20, 2025

(51) Int. Cl.
*G06F 16/23* (2019.01)
*G06F 9/54* (2006.01)
*G06F 11/07* (2006.01)

(52) U.S. Cl.
CPC .......... *G06F 16/2365* (2019.01); *G06F 9/542* (2013.01); *G06F 11/0757* (2013.01); *G06F 16/2379* (2019.01)

(58) Field of Classification Search
None
See application file for complete search history.

(56) References Cited

U.S. PATENT DOCUMENTS

| | | | |
|---|---|---|---|
| 6,115,365 A | 9/2000 | Newberg et al. | |
| 11,178,091 B1 | 11/2021 | Madhavan et al. | |
| 11,494,839 B2 | 11/2022 | Craig et al. | |
| 11,503,108 B1 | 11/2022 | Prem et al. | |
| 2004/0240444 A1 | 12/2004 | Matthews et al. | |
| 2007/0130144 A1 | 6/2007 | Banks | |
| 2010/0191884 A1* | 7/2010 | Holenstein | G06F 16/2343 707/613 |
| 2014/0040194 A1* | 2/2014 | Krasensky | H04L 47/34 707/613 |
| 2014/0068635 A1 | 3/2014 | Holzleitner et al. | |
| 2019/0384628 A1 | 12/2019 | Moothoor et al. | |
| 2020/0167865 A1* | 5/2020 | Craig | G06F 16/288 |
| 2022/0141826 A1* | 5/2022 | Ramu | H04W 24/02 370/329 |
| 2022/0150204 A1 | 5/2022 | Madhavan et al. | |
| 2023/0174341 A1 | 6/2023 | Wang et al. | |
| 2024/0152429 A1 | 5/2024 | Goldstein et al. | |

OTHER PUBLICATIONS

End-to-End Voting with Non-Permissioned and Permissioned Ledgers; J Grid Computing; 2019; pp. 97-117 (Year: 2019).*

(Continued)

*Primary Examiner* — Albert M Phillips, III
*Assistant Examiner* — Jermaine A Mincey
(74) *Attorney, Agent, or Firm* — Nixon & Vanderhye P.C.

(57) ABSTRACT

A system for processing distributed transactions is provided. The system includes a sequencer that communicates an atomic message stream to multiple different service instances. The service instances each process the messages from the message stream into a local queue. Each service instance also executes a state machine by reading messages from a queue and transitioning between states in the state machine while also performing one or more operations in connection with performing a distributed transaction.

20 Claims, 23 Drawing Sheets

(56) References Cited

OTHER PUBLICATIONS

Azure Architecture Center "Saga distributed transactions pattern", <https://learn.microsoft.com/en-us/azure/architecture/reference-architectures/saga/saga>, seven pages, Sep. 17, 2022.
Dremio—Two-Phase Commit <https://www.dremio.com/wiki/two-phase-commit/>, five pages, Oct. 5, 2023.
Kleppmann, "Distributed Systems 7.1: Two-phase commit", Fault-tolerant two-phase commit (1/2): 13:00-18:44, YouTube Video, <https://www.youtube.com/watch?v=-_rdWB9hN1c>, Oct. 28, 2020.
Kleppmann, "Distributed Systems Lecture Series", YouTube Video, <https://www.youtube.com/playlist?list=PLeKd45zvjcDFUEv_ohr_HdUFe97RItdiB>, seven pages, Oct. 28, 2020.
Kleppmann, "Distributed Systems" Computer Science Tripos, Part IB, University of Cambridge, <https://www.cl.cam.ac.uk/teaching/2122/ConcDisSys/dist-sys-notes.pdf>, Jan. 2022.
Office Action for U.S. Appl. No. 18/667,463, 22 pages, dated Feb. 26, 2025.
Office Action for U.S. Appl. No. 18/667,463, 22 pages, dated Jun. 18, 2025.

\* cited by examiner

DISTRIBUTED STREAM-BASED ACID TRANSACTIONS

CROSS REFERENCE(S) TO RELATED APPLICATION(S)

This application is one of five related applications, all filed on even date herewith; this application incorporates the entire contents of each of the other four related applications. The related applications are: U.S. patent application Ser. Nos. 18/667,338; 18/667,463; 18/667,603; 18/667,706; 18/667,805. This application also incorporates by reference the entire contents of U.S. Pat. No. 11,503,108.

TECHNICAL OVERVIEW

The technology described herein relates to distributed computing systems. More particularly, the technology described herein relates to techniques for providing ACID transactions in such distributed computing systems.

INTRODUCTION

When engineering computing systems to handle transactions, an important consideration is ensuring that the transactions are carried out with ACID characteristics-Atomicity, Consistency, Isolation, and Durability.

Atomicity ensures that each transaction (e.g., each read, write/update, or delete) is treated as a single unit. Either the entire transaction succeeds, or it fails. Consistency ensures that transactions only change data (e.g., in a database) in a predicable manner. Isolation ensures that concurrently executed transactions are executed in a manner that is the same as if they were executed sequentially. Durability ensures that a commit of a transaction will remain in case the of failure. Implementation of systems that have ACID compliant transactions is thus an important aspect for computing systems, including database systems, distributed systems, and distributed database systems.

In some computing systems that handle transaction implementations it can be advantageous to implement a database as part of the distributed system. Databases allows for storing, retrieving, and analyzing data and are an important part of modern technology infrastructure. Various types of databases can include weather databases, traffic databases, databases for economic data, health databases, media content databases, search databases, and many other types of databases that underpin the services that people use in everyday life. Distributed databases allow for multiple systems to operate and handle transactions while also providing redundancy should one computing system fail.

An issue with implementing databases in a distributed manner is that having ACID compliant transaction can be difficult. Existing techniques include the Saga design pattern "Saga" or Two-Phase Commit protocol. However, these implementations can come with drawbacks.

Accordingly, it will be appreciated that new and improved techniques, systems, and processes are continually sought after—especially in the area of distributed database technology.

SUMMARY

In certain example embodiments, a system for processing distributed transactions is provided. The system includes a sequencer that communicates an atomic message sequence to multiple different service instances. The service instance each process messages from the atomic broadcast into a local queue. Each service instance also executes a state machine by reading messages from the queue and transitioning between states in the machine while also performing one or more operations in connection with performing a distributed transaction.

This Summary is provided to introduce a selection of concepts that are further described below in the Detailed Description. This Summary is intended neither to identify key features or essential features of the claimed subject matter, nor to be used to limit the scope of the claimed subject matter; rather, this Summary is intended to provide an overview of the subject matter described in this document. Accordingly, it will be appreciated that the above-described features are merely examples, and that other features, aspects, and advantages of the subject matter described herein will become apparent from the following Detailed Description, Figures, and Claims.

BRIEF DESCRIPTION OF THE DRAWINGS

These and other features and advantages will be better and more completely understood by referring to the following detailed description of example non-limiting illustrative embodiments in conjunction with the drawings of which.

DETAILED DESCRIPTION

In the following description, for purposes of explanation and non-limitation, specific details are set forth, such as particular nodes, functional entities, techniques, protocols, etc. in order to provide an understanding of the described technology. It will be apparent to one skilled in the art that other embodiments may be practiced apart from the specific details described below. In other instances, detailed descriptions of well-known methods, devices, techniques, etc. are omitted so as not to obscure the description with unnecessary detail.

Figure 1A:
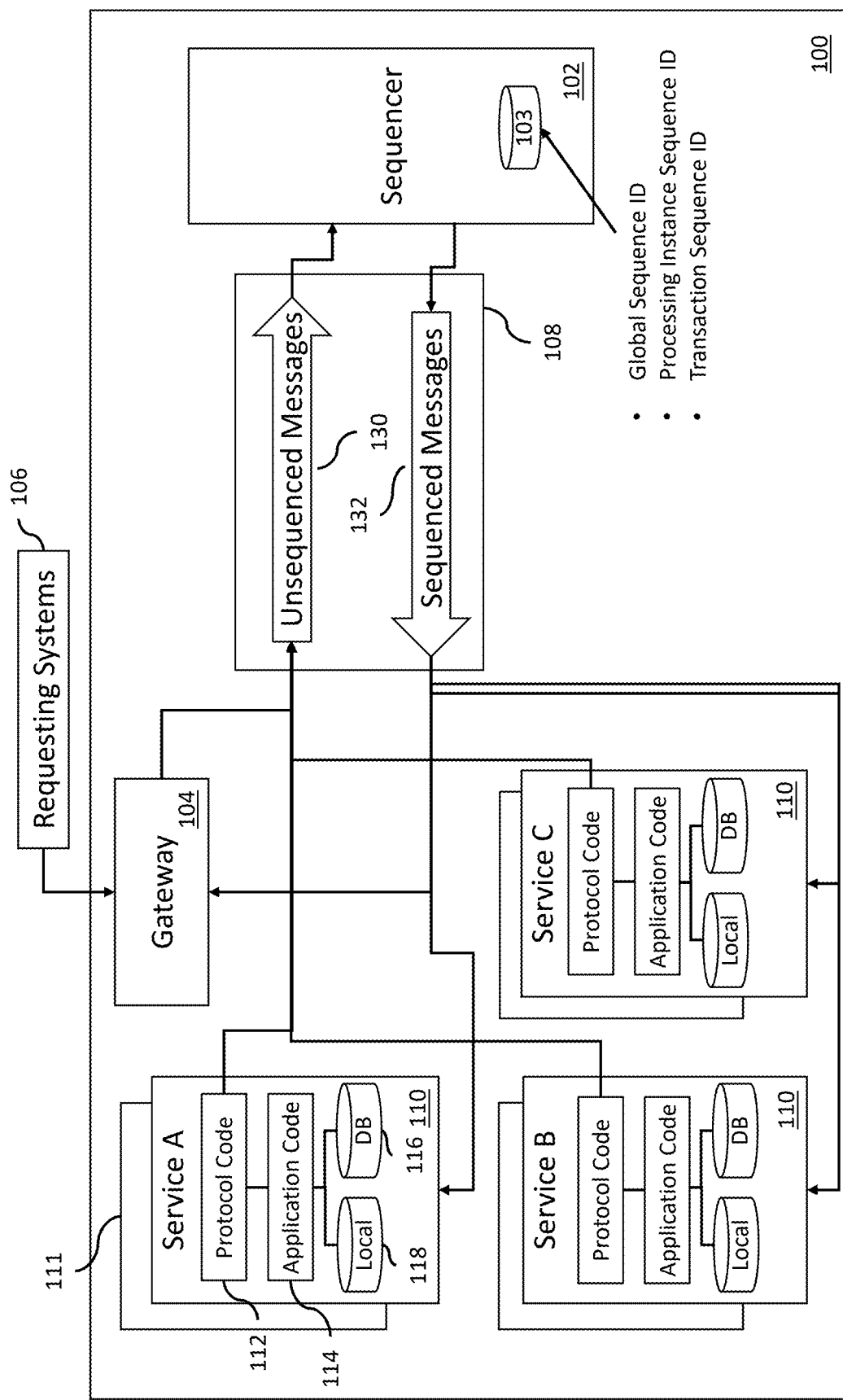
FIG. 1A is an architecture diagram of an example distributed computing system that includes a sequencer and multiple processing instances for processing distributed transactions according to certain example embodiments.
Figure 2A:
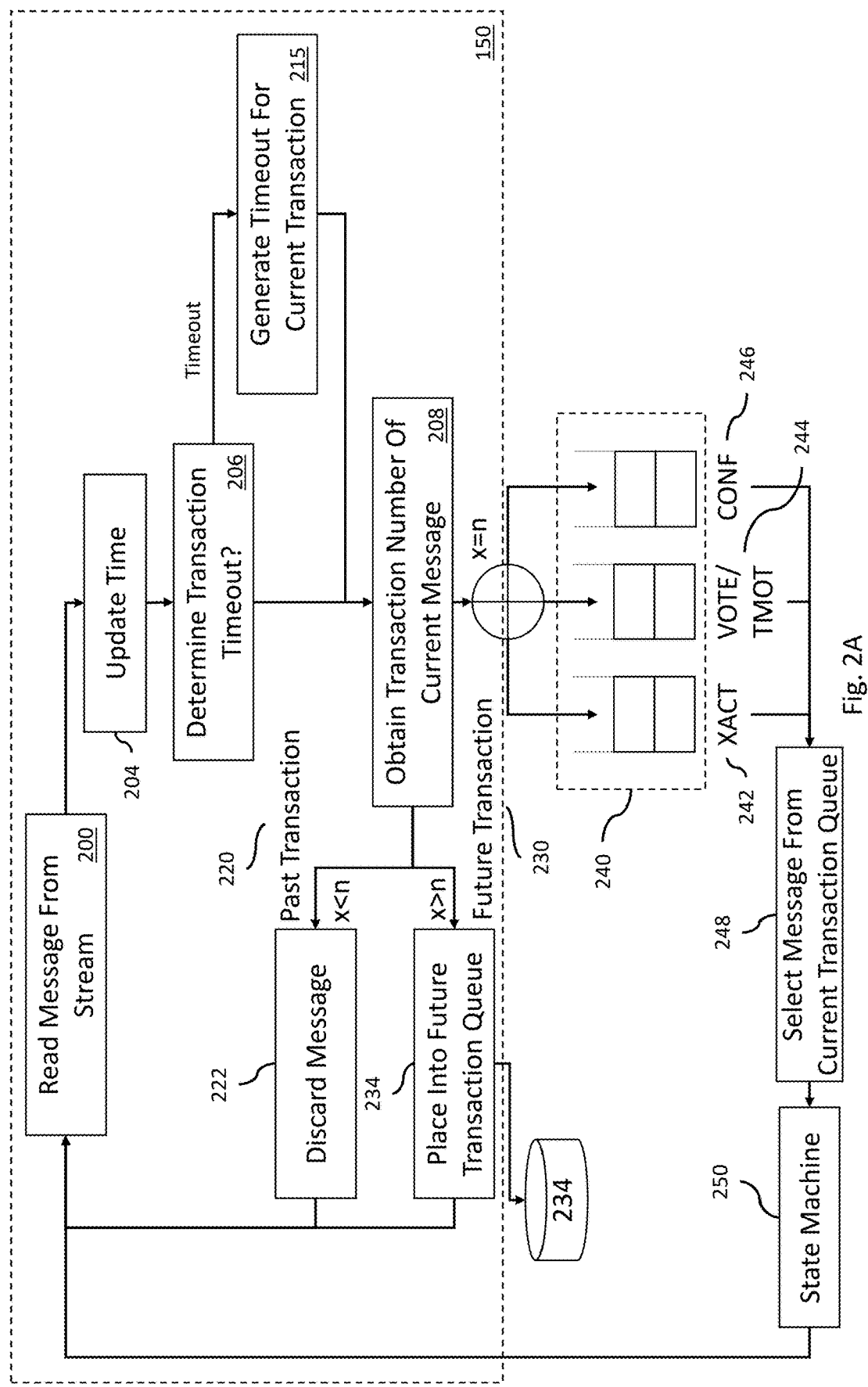
FIG. 2A is a flowchart that illustrates how processing instances can processes data messages read from a message stream of the system of FIG. 1A according to certain example embodiments.

Sections are used in this Detailed Description solely in order to orient the reader as to the general subject matter of each section; as will be seen below, the description of many features spans multiple sections, and headings should not be read as affecting the meaning of the description included in any section. Some reference numbers are reused across multiple Figures to refer to the same element; for example, as will be provided below, the state machine 250 first shown in FIG. 2A is also referenced and described in connection FIG. 3. Sequencer 102 is first discussed in connection with FIGS. 1A and 1s shown and discussed in various figures throughout the description including each of examples 4B-12B.

Overview

Some embodiments described herein relate to processing transactions in distributed computing systems and techniques for implementing distributed transaction processing on such systems. Some embodiments herein relate to techniques for processing distributed database transactions.

An example distributed computing system can include multiple different processing instances. The processing instances are configured to carry out processing for distributed transactions.

The processing instances operate based on an atomic message stream provided by, for example, a sequencer. Processing instances can implement transaction program code for a transaction protocol used by the distributed computing system; and 2) application program code to carry out requested transactions on that processing instance. The transaction protocol may include a message queuing protocol and a state machine. Processing instances that implement the transaction protocol may be called "service instances" herein.

The message queuing protocol of each service instance processes the atomic message stream by queuing messages to a message queue that is in local memory of a corresponding service instance. The atomic message stream can include messages that have been sequenced by the sequencer that are from any or all of the service instances of the distributed computing system. The state machine then reads messages from the message queue and processes them using the state machine to carry out the distributed transaction.

The state machine includes different stages for ACID-compliant transactions. Example stages can include: 1) a transaction request stage that initiates a transaction operation (e.g., a query against a database), 2) a voting stage in which votes are cast, 3) a decision stage in which each service instance decides on (and executes) the overall transaction outcome (e.g., commit or abort), and 4) a confirmation stage to signify the completion of a transaction by a service instance.

The distributed computing system may implement one or more services for carrying out distributed transactions. Each service that is implemented may also be implemented using one or more service instances (which may be redundant). For example, service A may be implemented using service instances A1 and A2 (which may be redundant to each other), while service B is implemented by service instance B1 (e.g., which implements the same transaction protocol, but perhaps different application code from service instances A1 and A2).

Figure 1B:
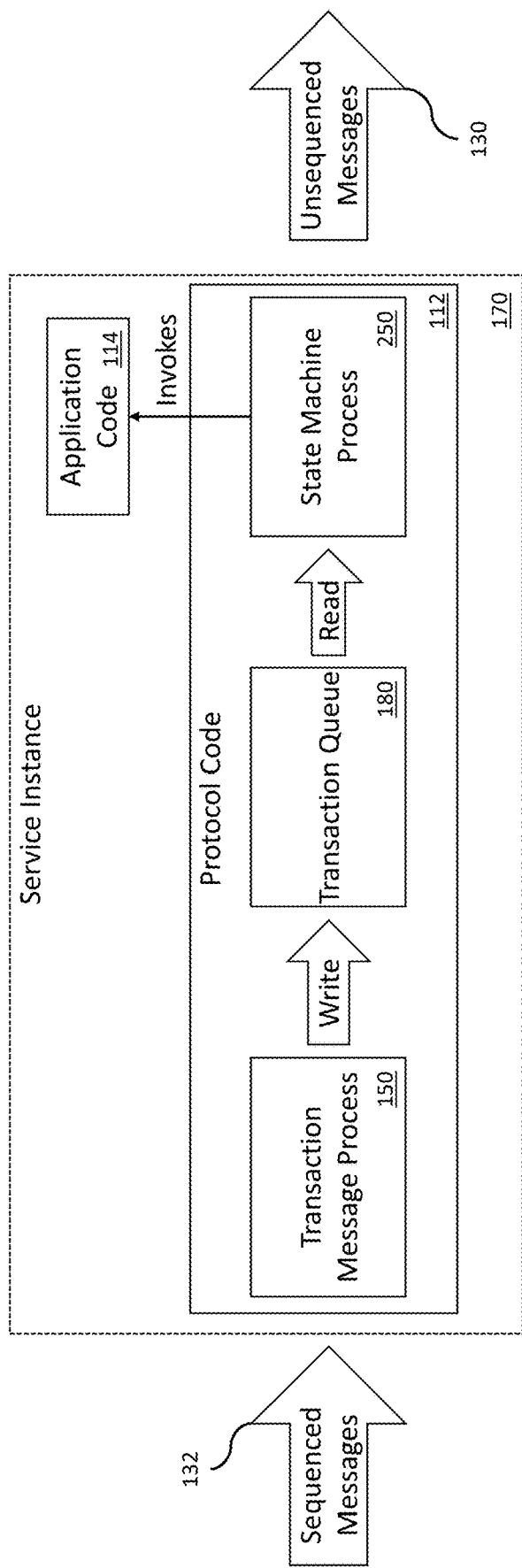
FIG. 1B is an architecture diagram illustrating components that may be included in each service instance of the system of FIG. 1A according to certain example embodiments.
Figure 2B:
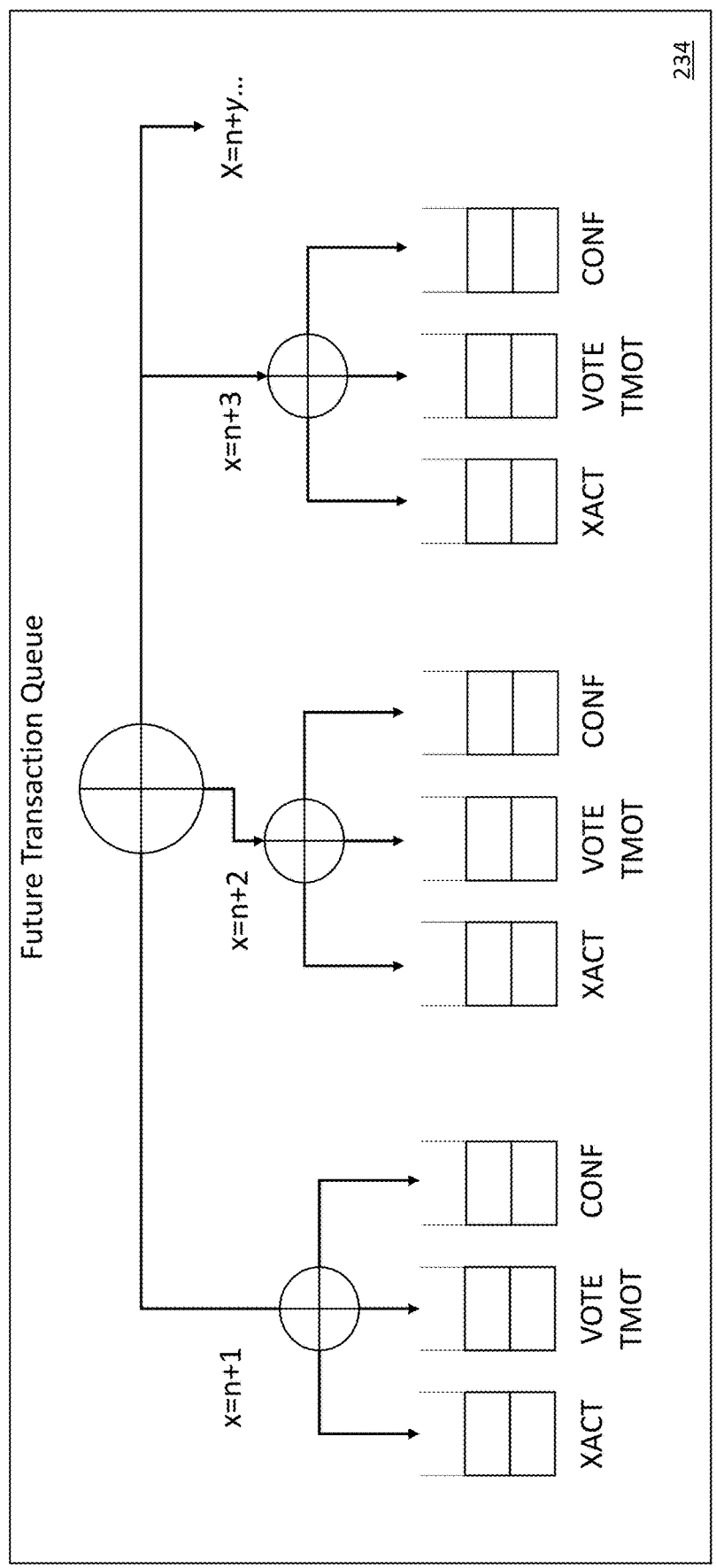
FIG. 2B graphically illustrates how the future transaction queue(s) on processing instances are maintained according to certain example embodiments.
Figure 3:
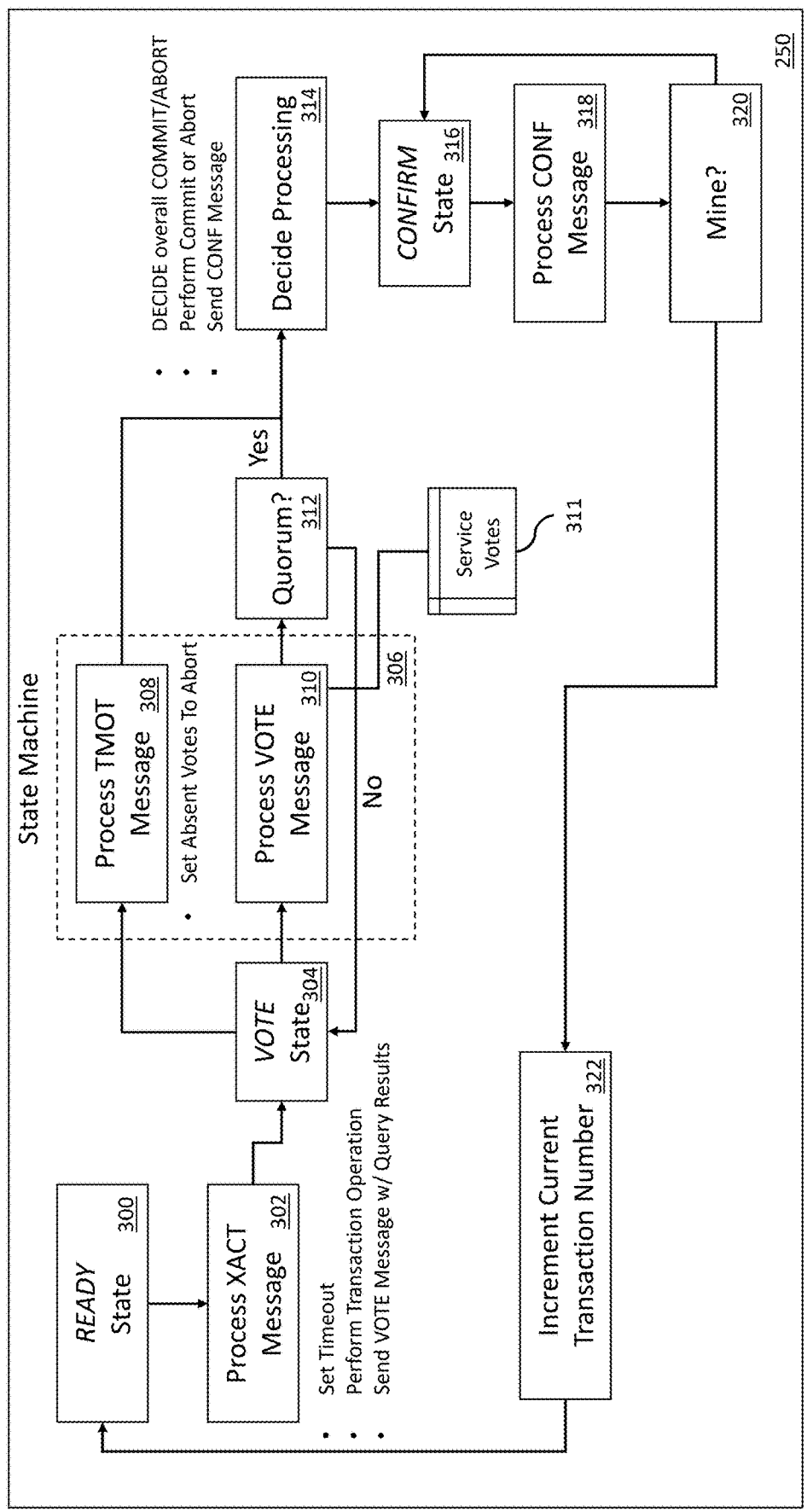
FIG. 3 is a flowchart for an example state machine that is used to process transaction messages based on the processing performed in FIG. 2A according to certain example embodiments.
Figure 4A:
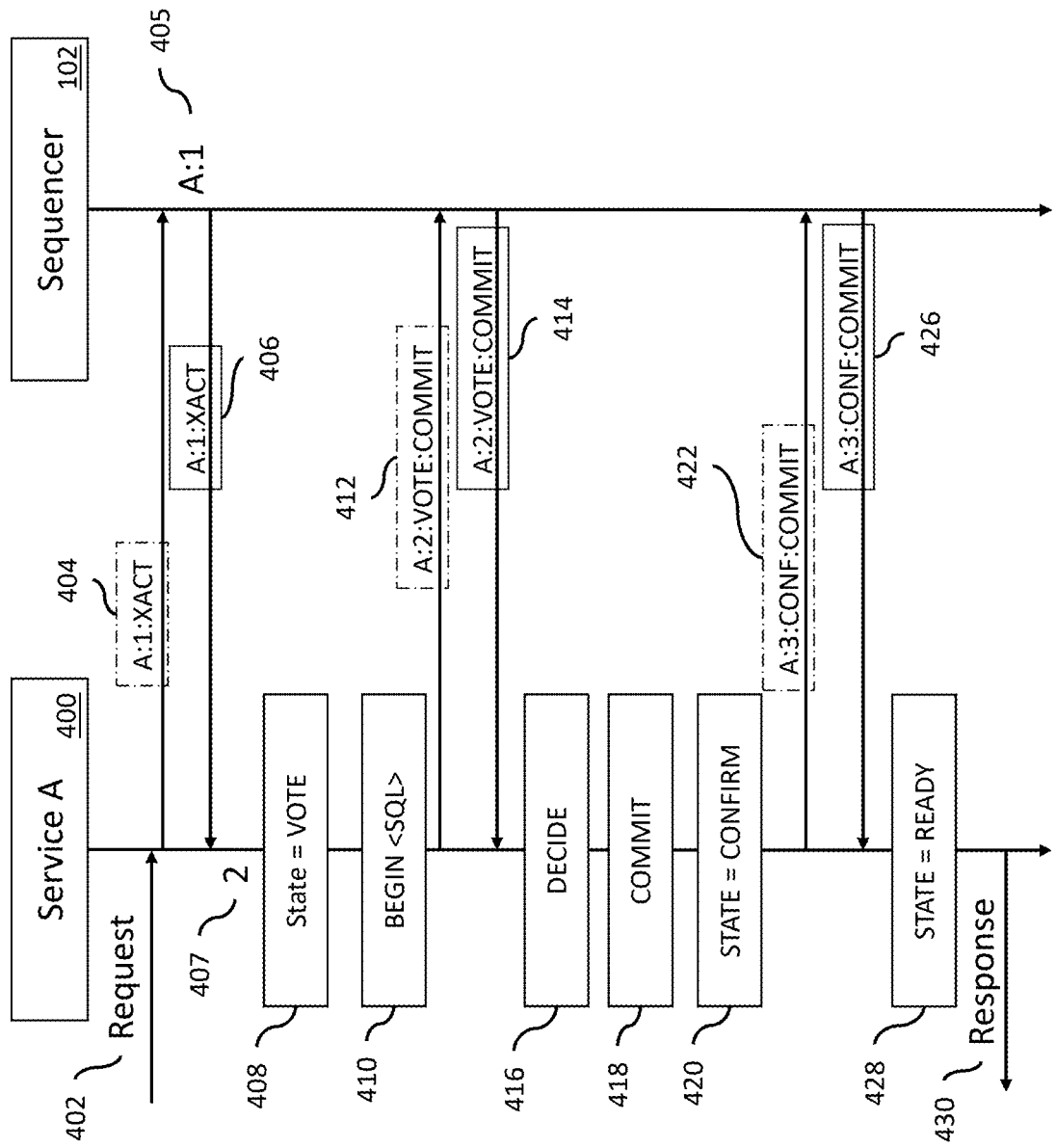
FIG. 4A is a sequence diagram showing an example of how a commit action is handled for a single service using the system shown in FIG. 1A according to certain example embodiments.
Figure 4B:
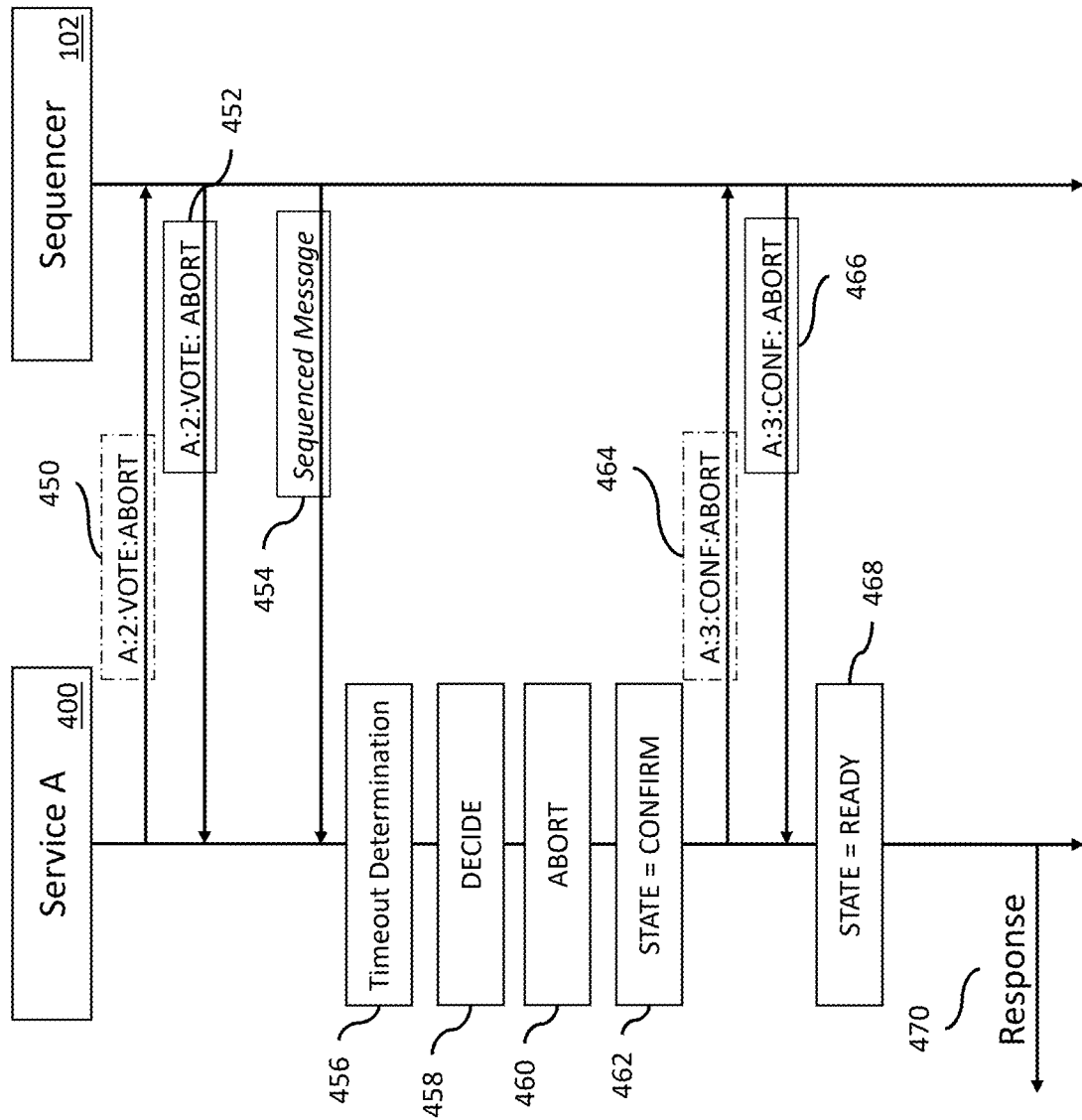
FIG. 4B is a sequence diagram showing an example of how an abort is handled for a single service using the system shown in FIG. 1A according to certain example embodiments.
Figure 5A:
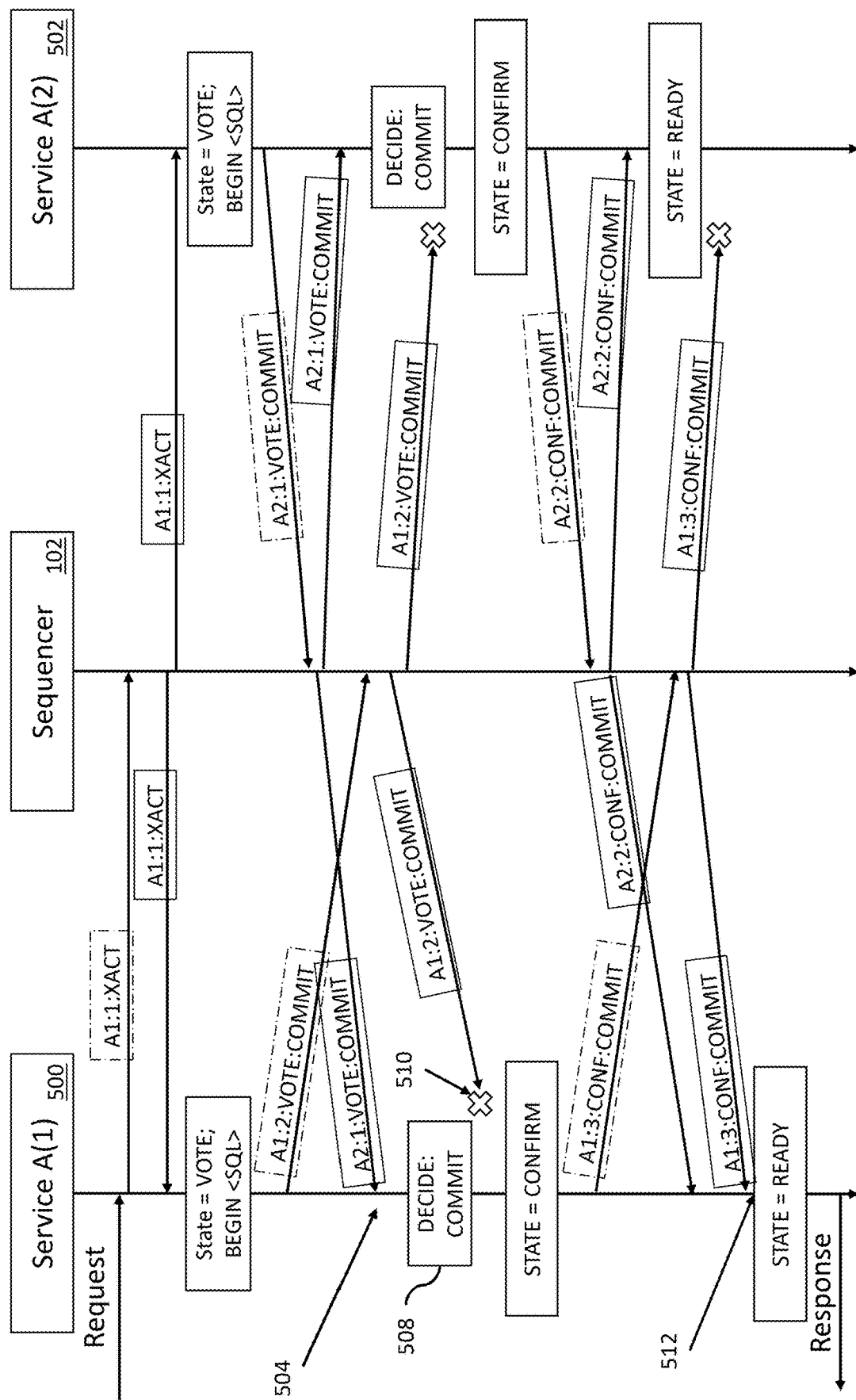
FIG. 5A is a sequence diagram showing an example of how commits that from a service with redundant instances are handled using the system shown in FIG. 1A according to certain example embodiments.
Figure 5B:
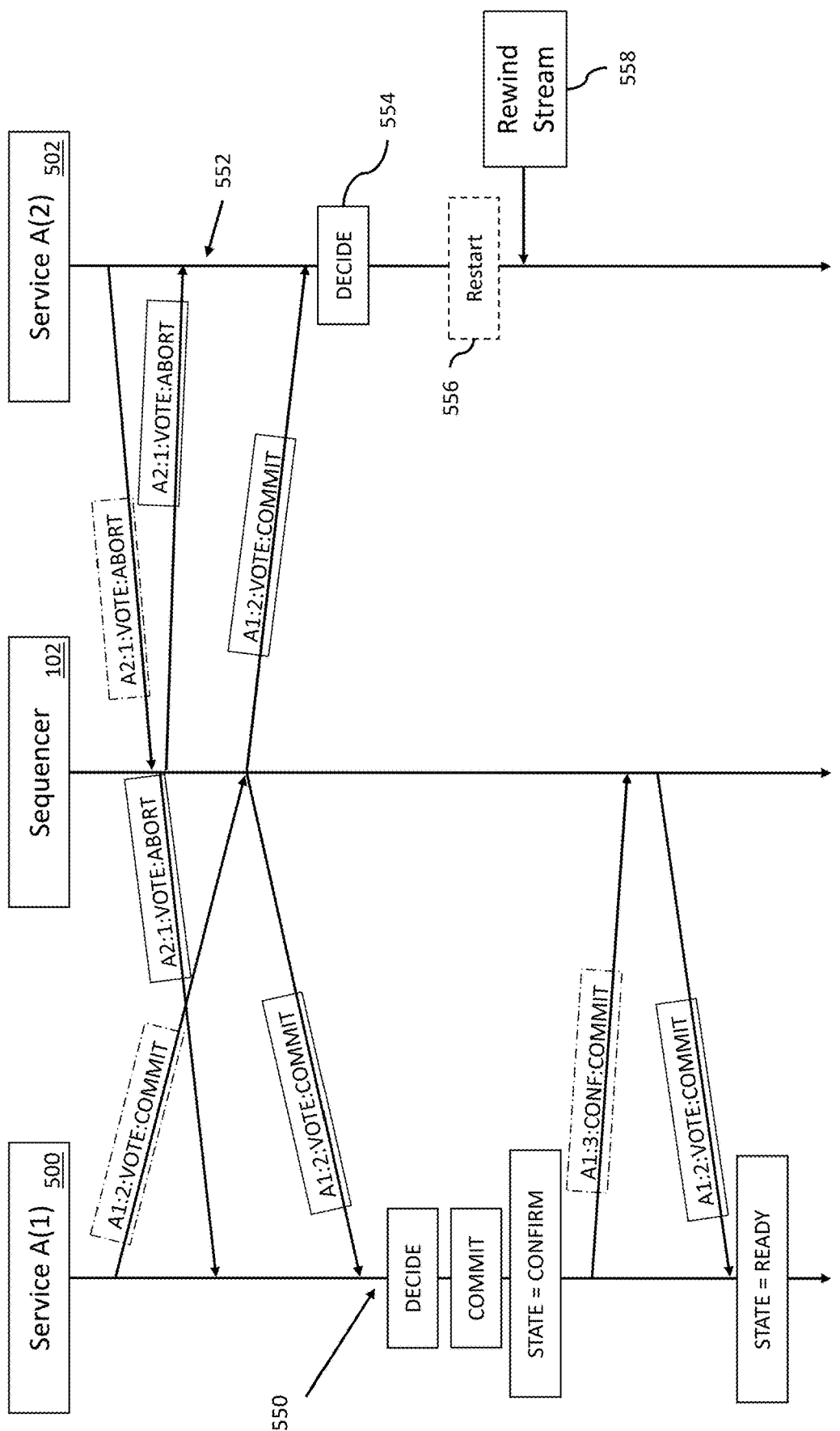
FIG. 5B is a sequence diagram showing an example of how conflicting votes from a service with redundant instances are handled using the system shown in FIG. 1A according to certain example embodiments.
Figure 6A:
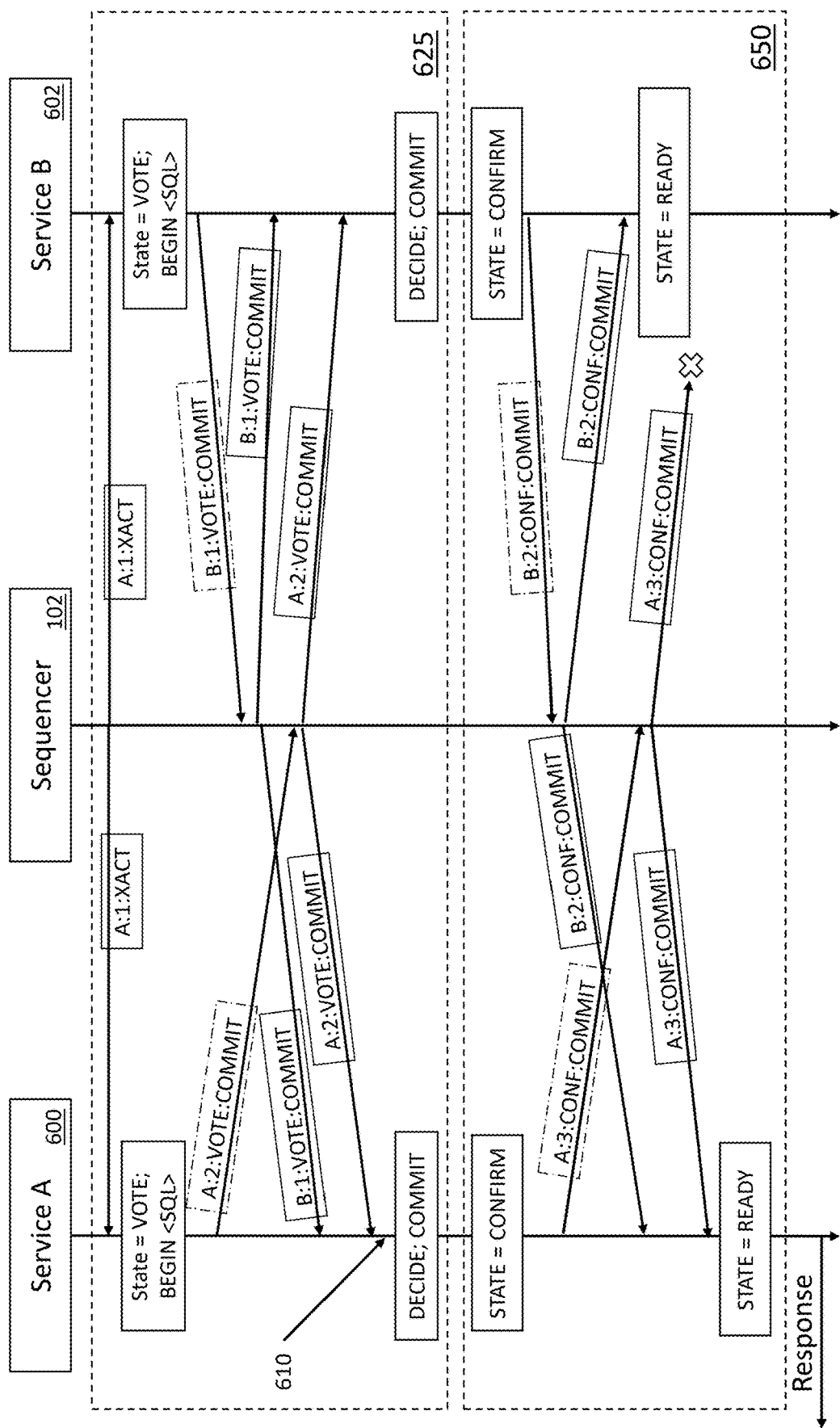
FIG. 6A is a sequence diagram showing an example of how commit votes from multiple services are handled using the system shown in FIG. 1A according to certain example embodiments.
Figure 6B:
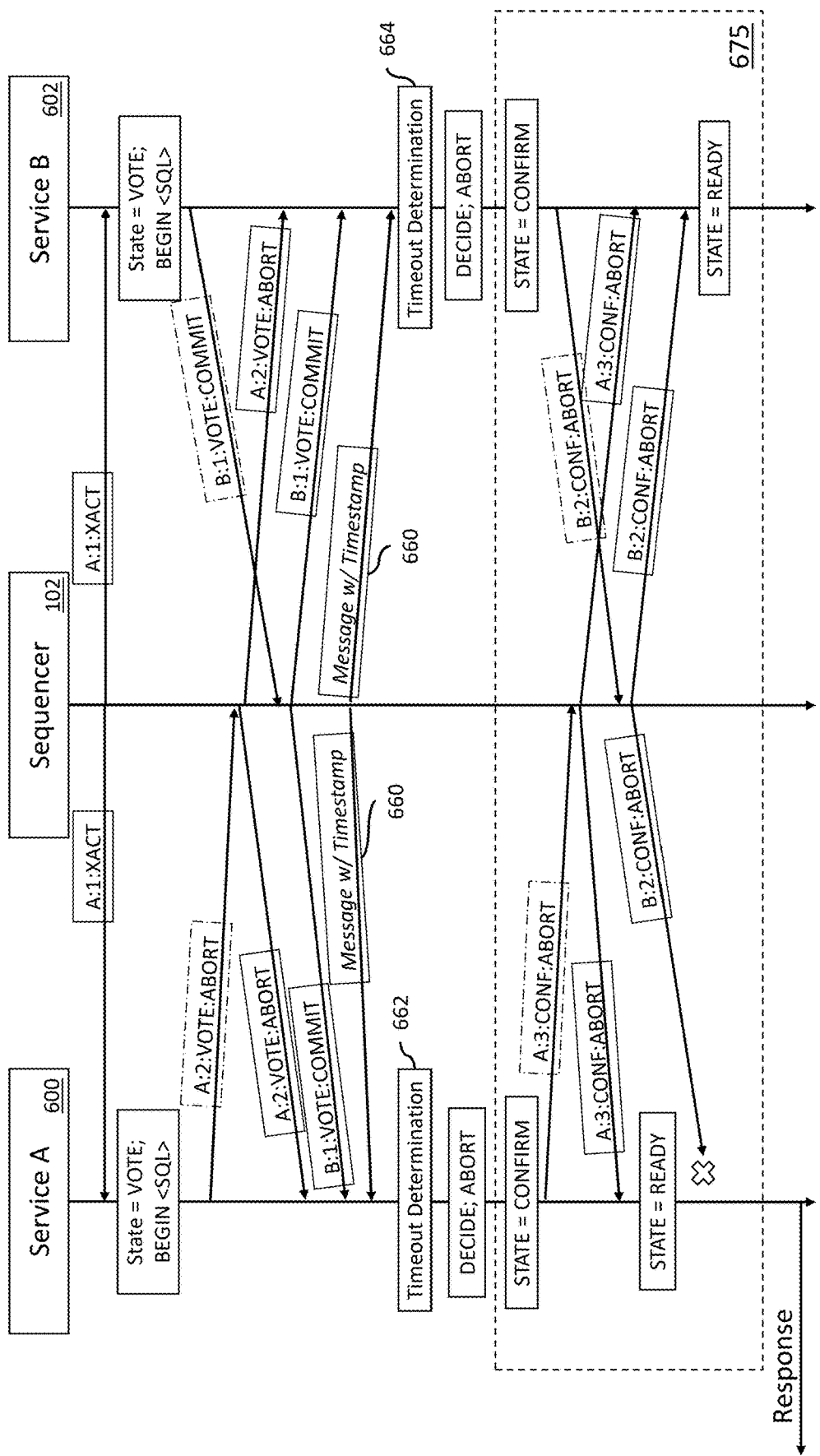
FIG. 6B is a sequence diagram showing an example for how conflicting votes from multiple services are handled using the system shown in FIG. 1A according to certain example embodiments.
Figure 7:
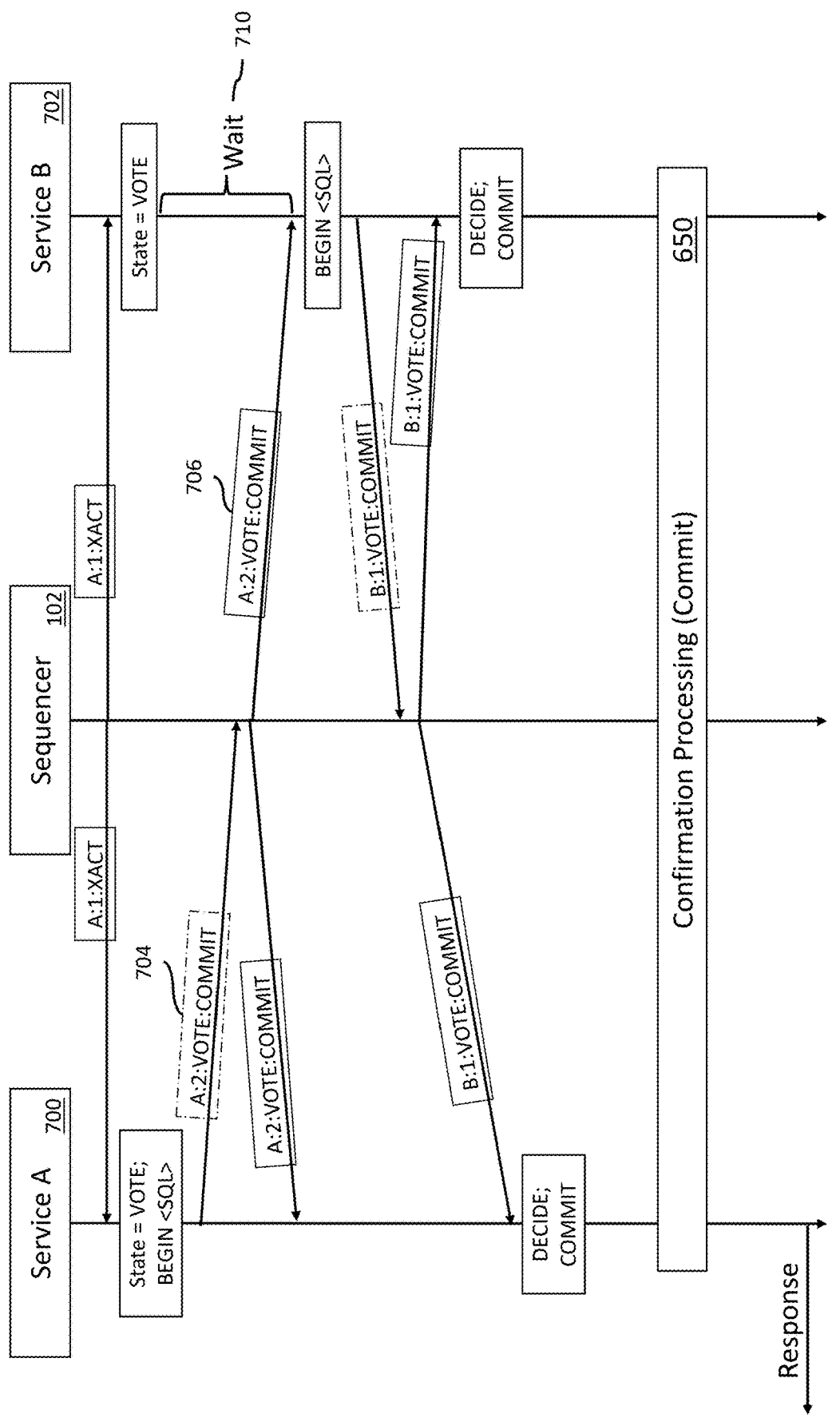
FIG. 7 is a sequence diagram showing an example for how a dependent operation involving multiple services that commit is handled using the system shown in FIG. 1A according to certain example embodiments.
Figure 8:
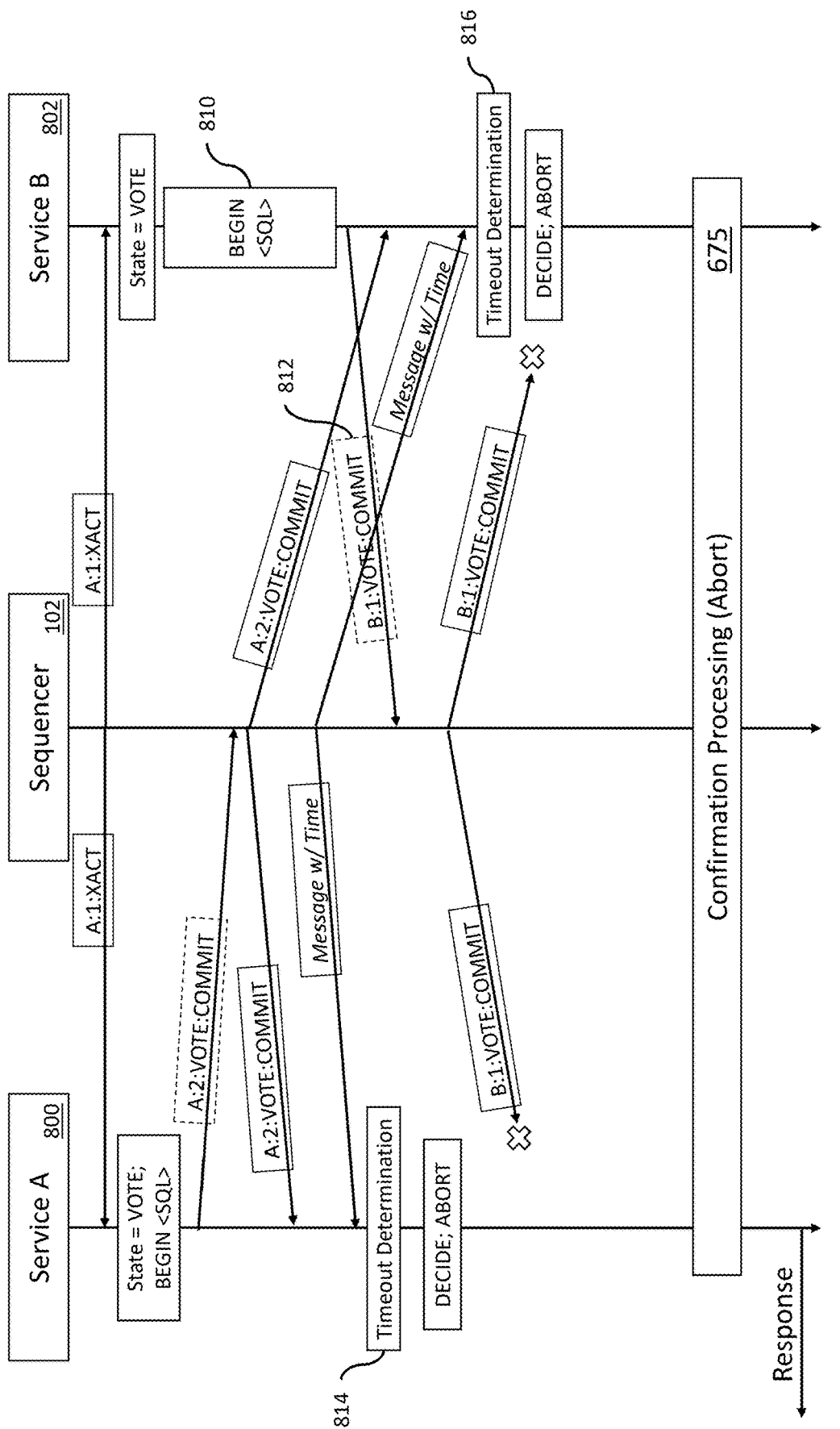
FIG. 8 is a sequence diagram showing an example for how an operation involving multiple services is handled when one of the services times out using the system shown in FIG. 1A according to certain example embodiments.
Figure 9:
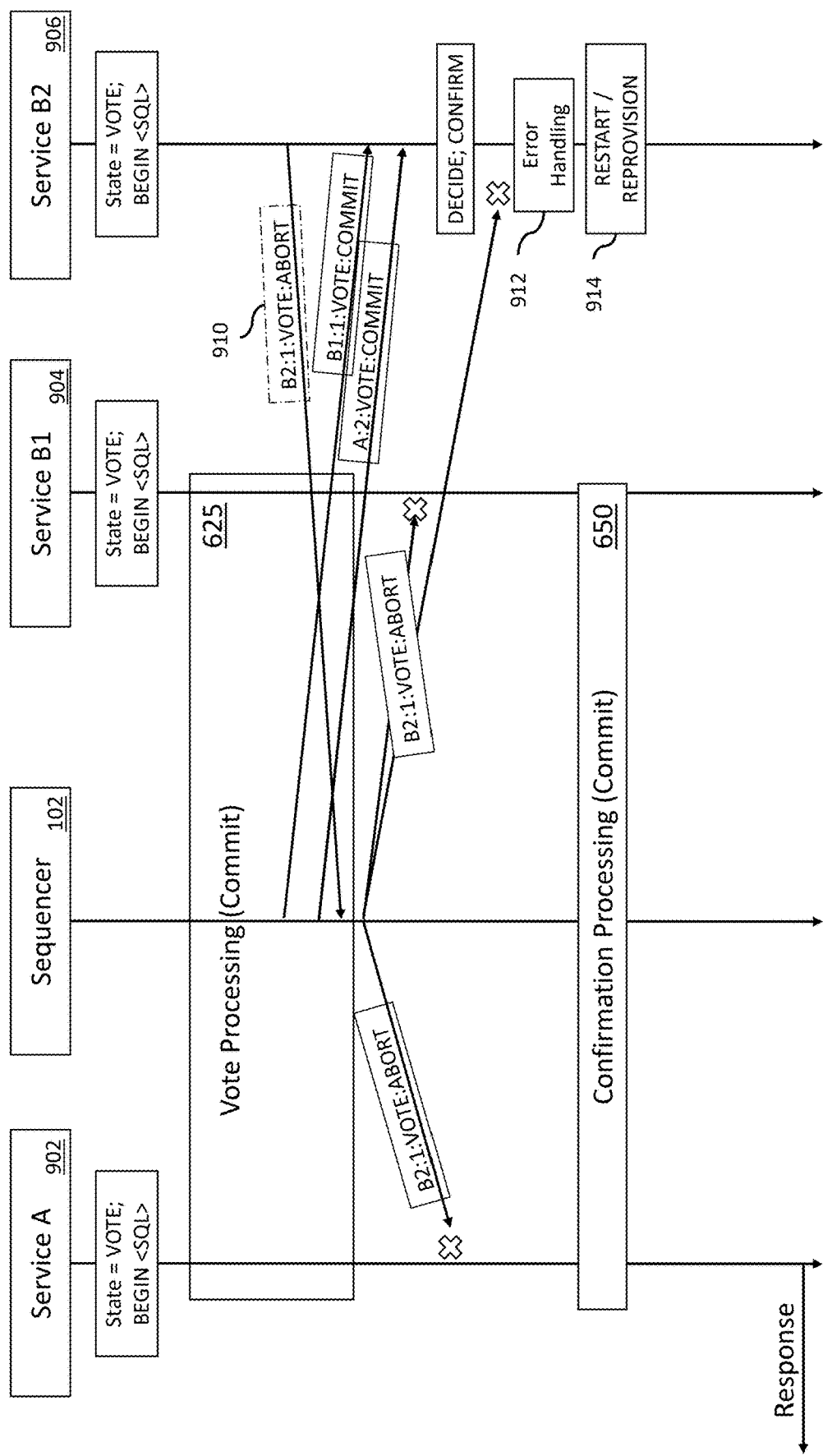
FIG. 9 is a sequence diagram showing an example for how an operation involving multiple services is handled when a redundant instance aborts using the system shown in FIG. 1A according to certain example embodiments.
Figure 10:
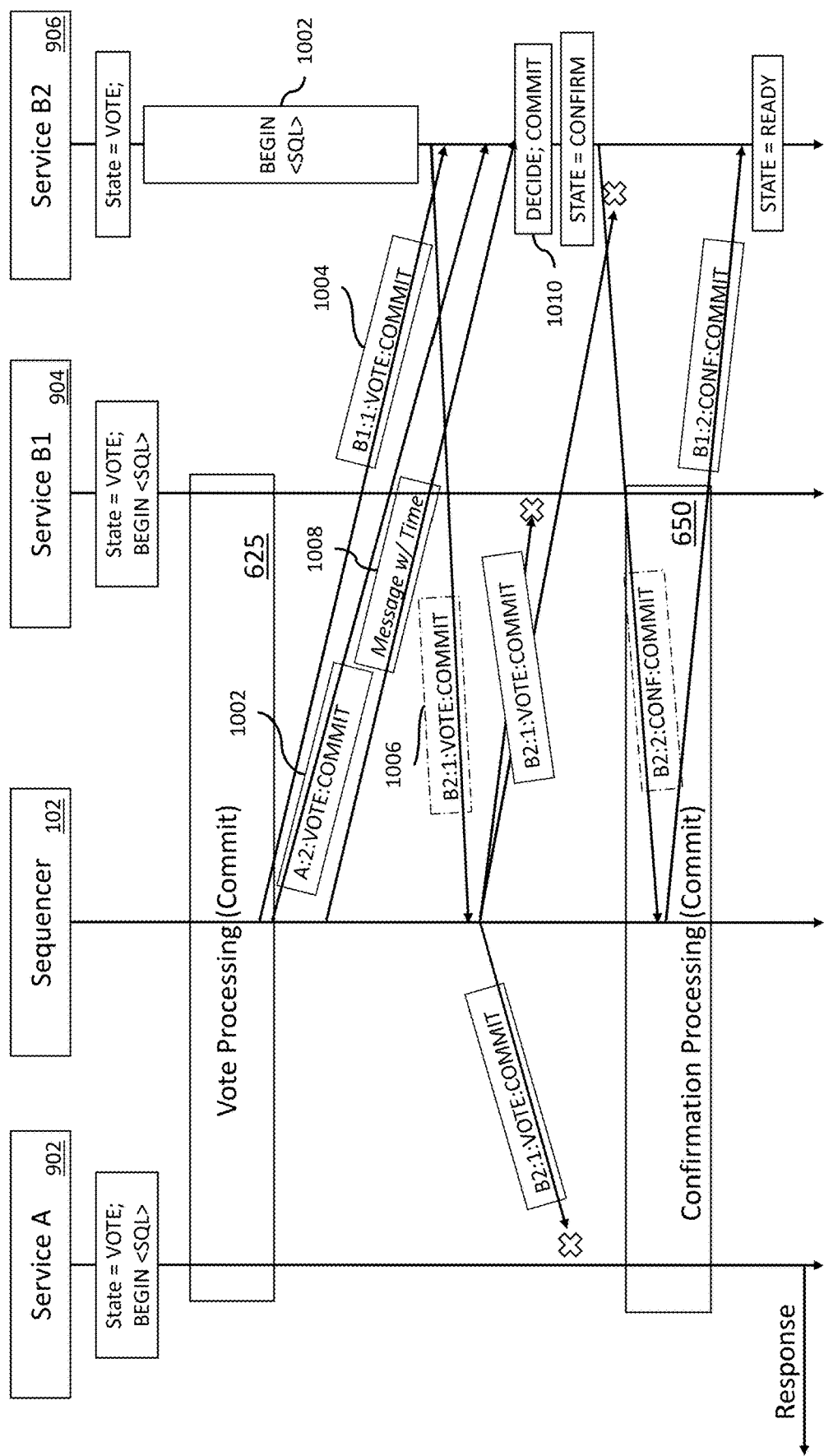
FIG. 10 is a sequence diagram showing an example for how an operation involving multiple services is handled when a redundant instance is behind in processing requests using the system shown in FIG. 1A according to certain example embodiments.
Figure 11A:
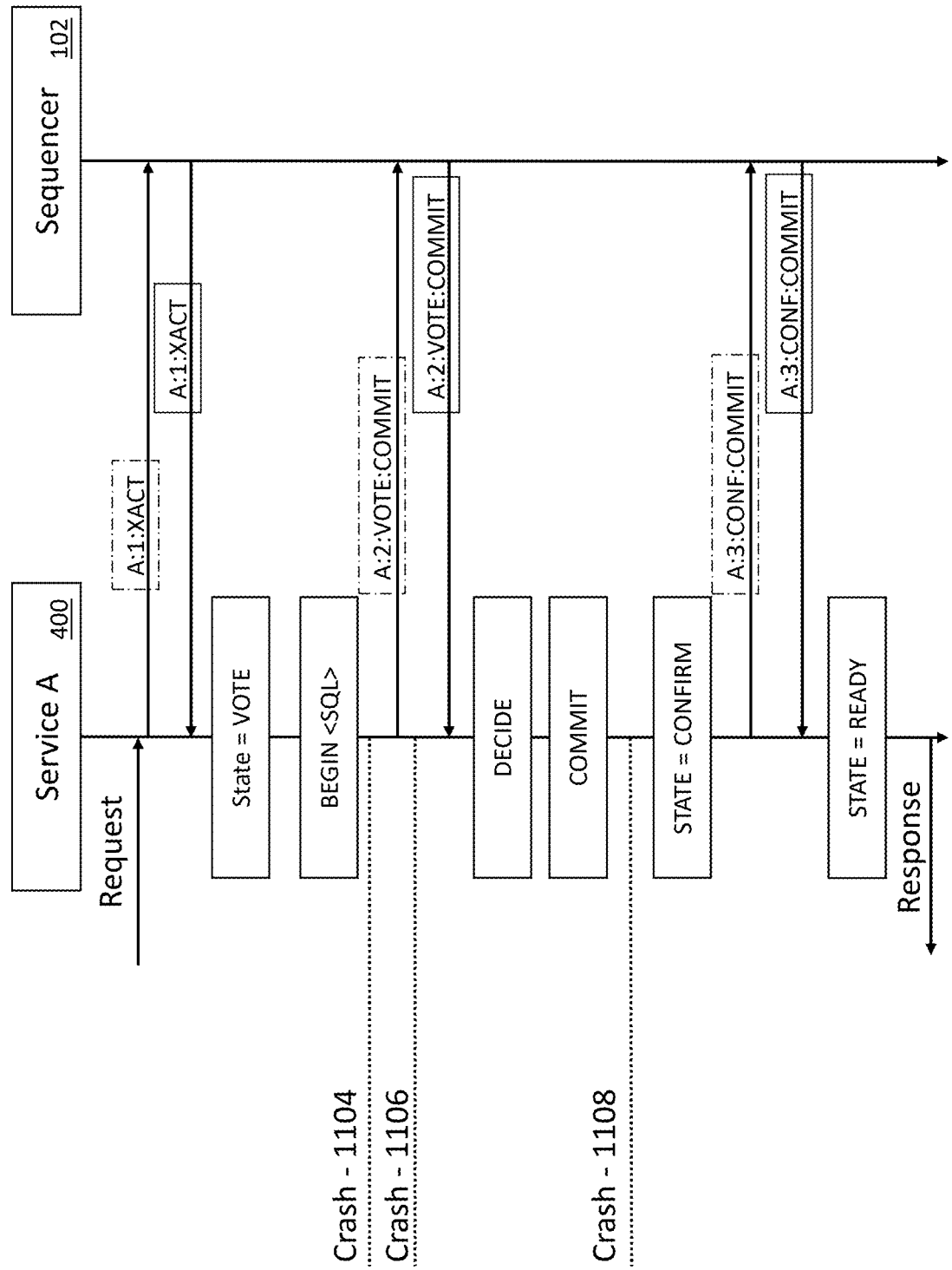
FIG. 11A is a sequence diagram showing illustrative examples of when crashes may occur for a service that is involved in processing a transaction using the system shown in FIG. 1A according to certain example embodiments.
Figure 11B:
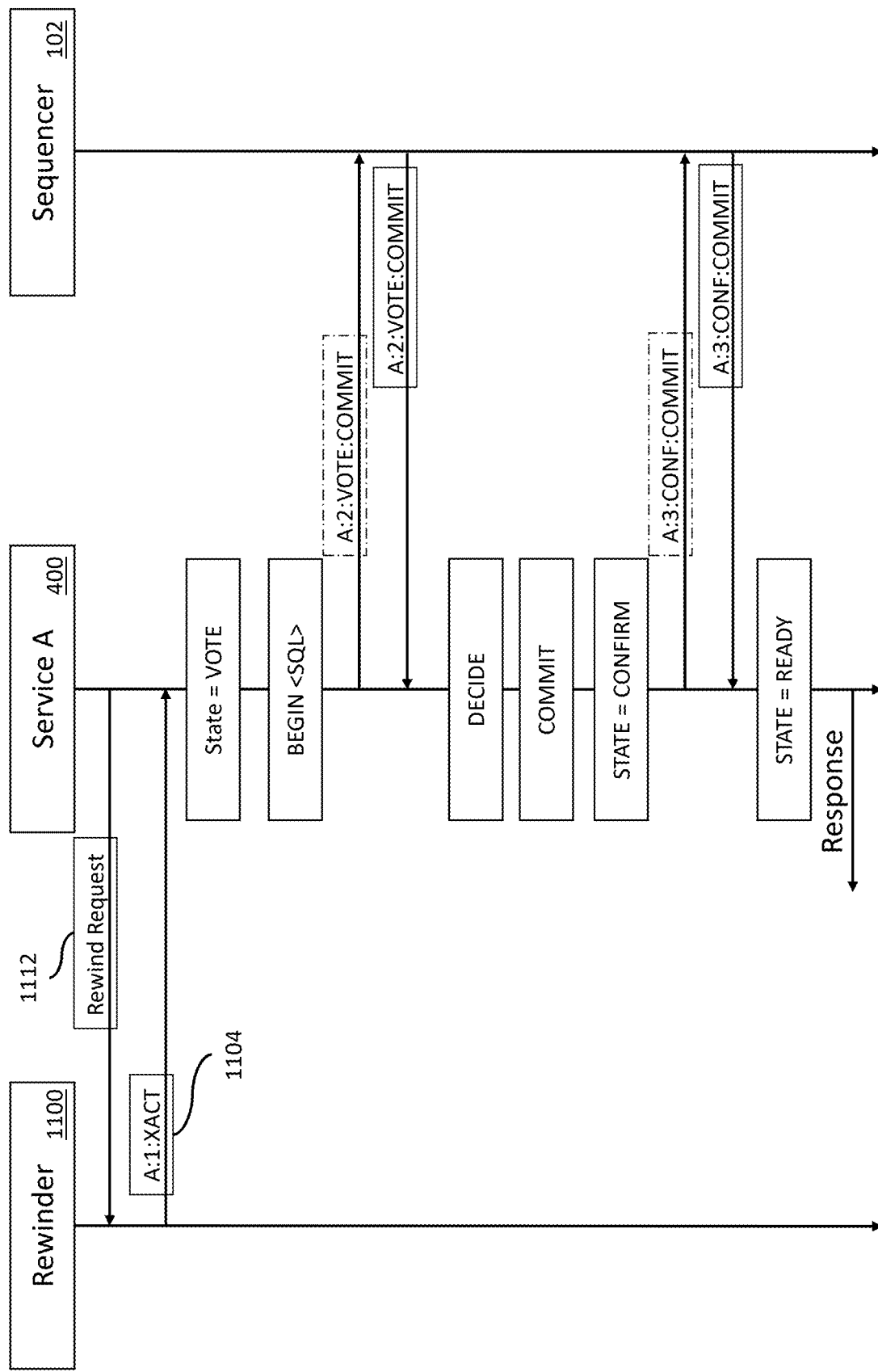
FIGS. 11B-11C are sequence diagrams that illustrate recovery processing for a service that has crashed in the situations shown in FIG. 11A using the system shown in FIG. 1A according to certain example embodiments.
Figure 11C:
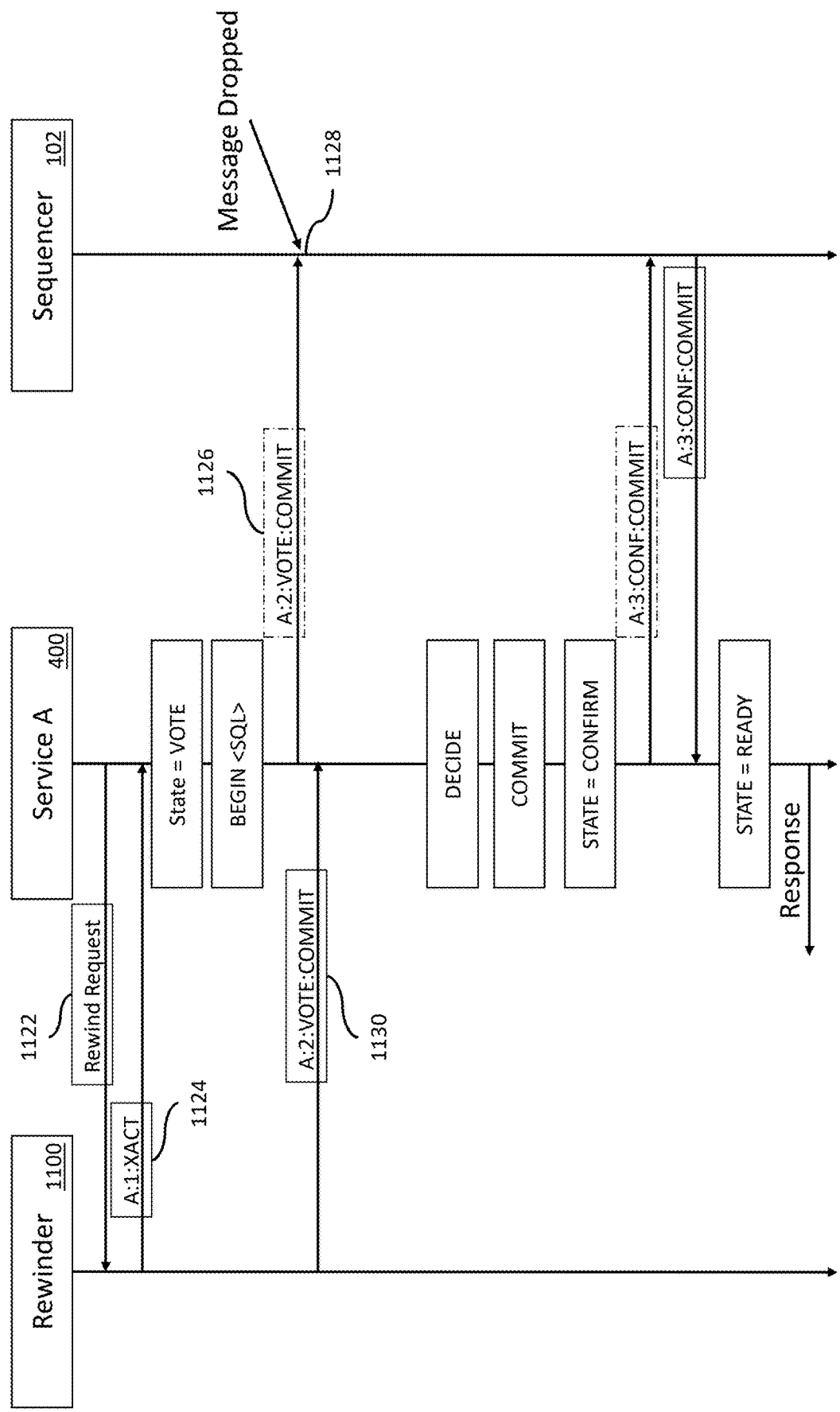
Figure 12A:
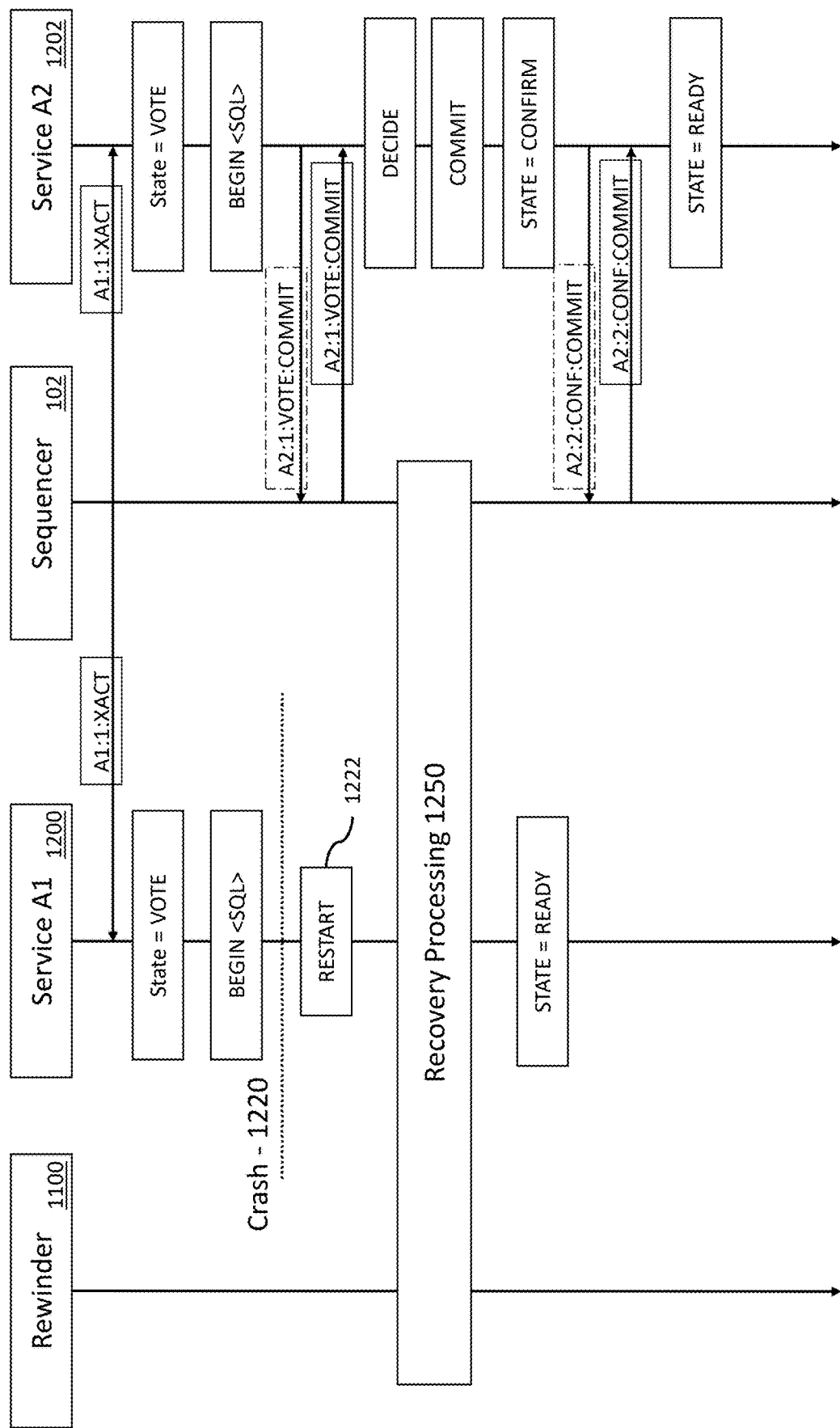
FIG. 12A is sequence diagram that illustrates processing that occurs when a crash in a redundant service occurs using the system shown in FIG. 1A according to certain example embodiments.
Figure 12B:
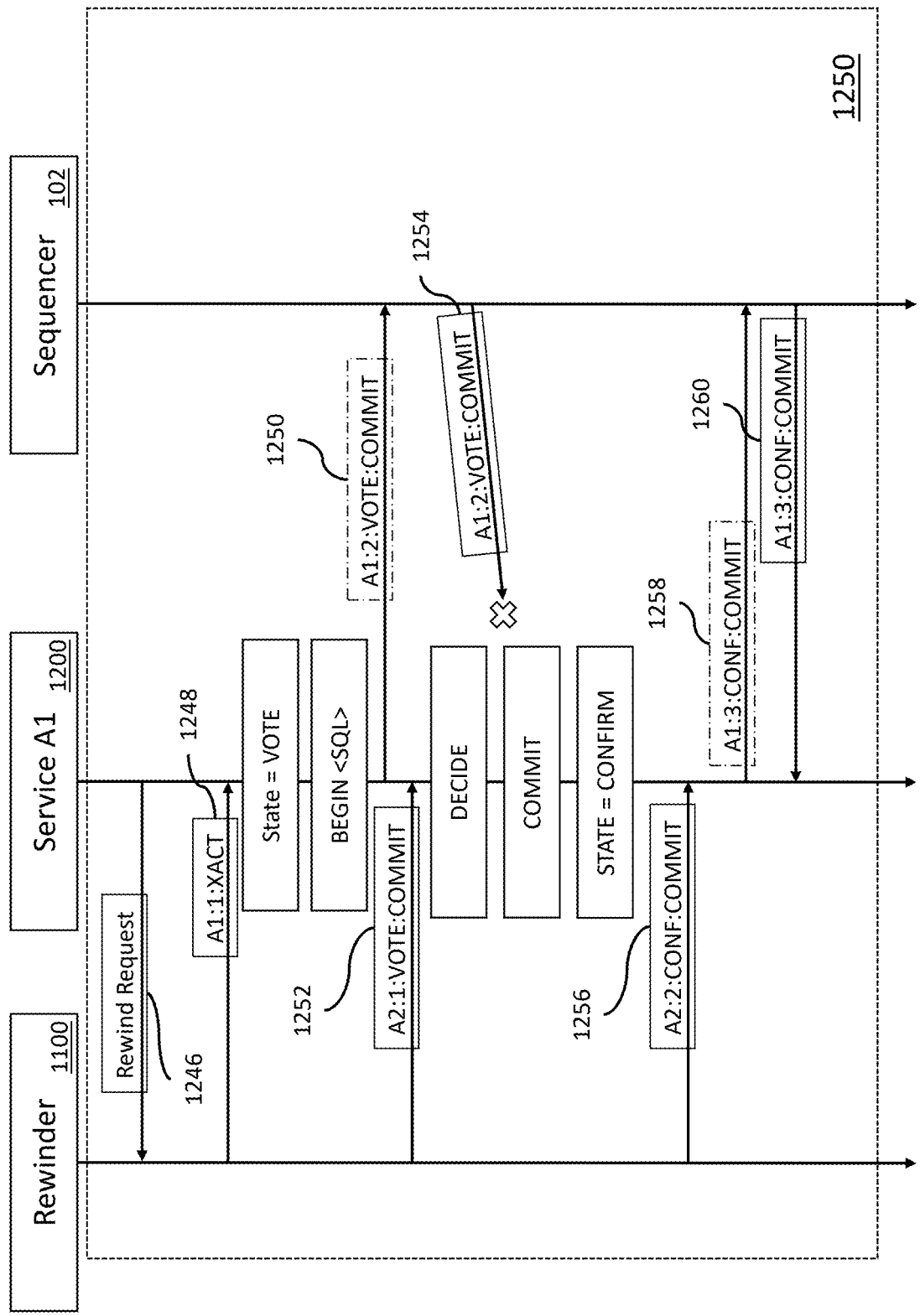
FIG. 12B is sequence diagram that illustrates recovery processing for a redundant service that has crashed in the example shown in FIG. 12A using the system shown in FIG. 1A according to certain example embodiments.
Figure 13A:
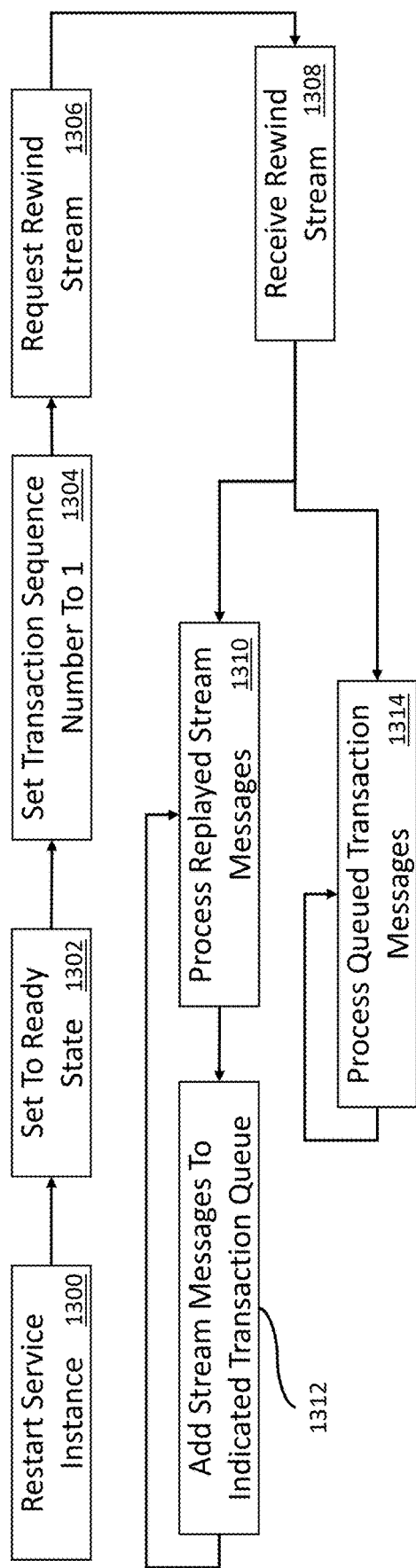
FIG. 13A is a flow chart of a recovery process that may be used by processing instances to recover from failures according to certain example embodiments.
Figure 13B:
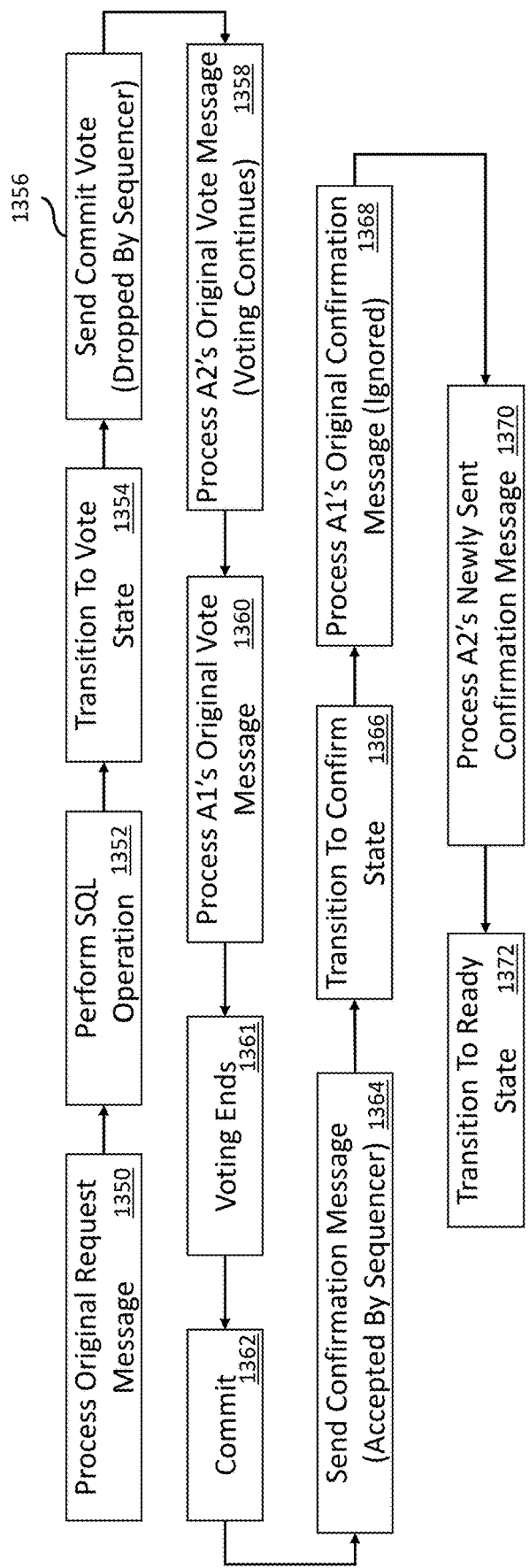
FIG. 13B is a flow chart that illustrates example processing that may be performed as part of a recovery process for a failed service instance according to certain example embodiments, such as shown in FIG. 5B.
Figure 14:
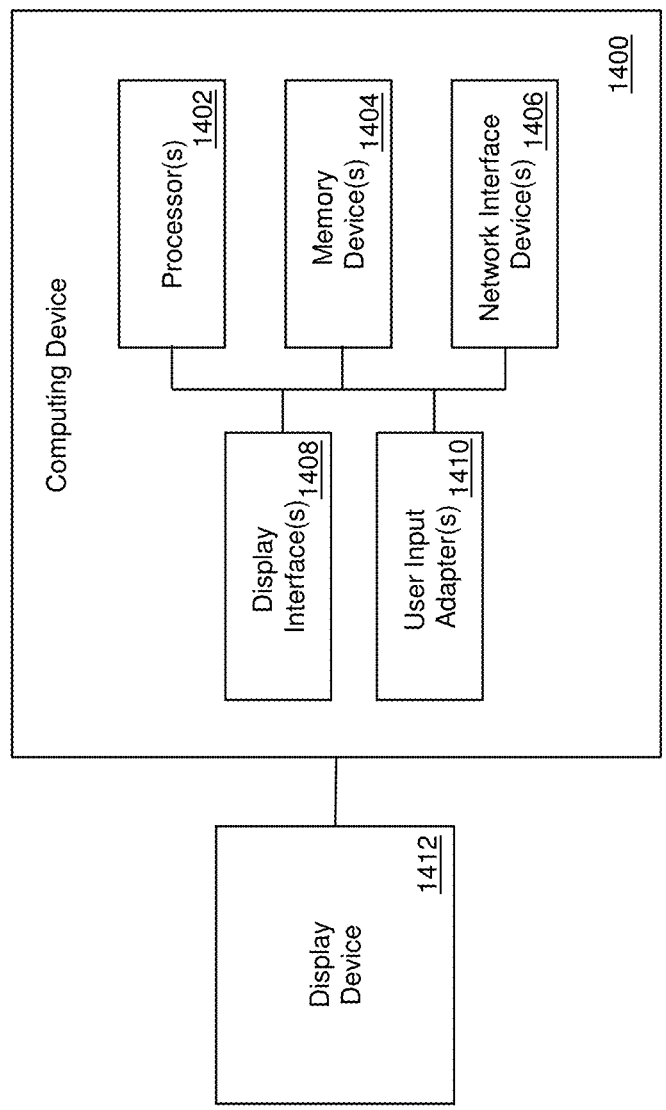
FIG. 14 shows an example computing device that may be used in some embodiments to implement features described herein.

FIG. 1A is an architecture diagram of an example distributed system according to certain example embodiments. FIG. 1B illustrates components of service instances that may be included in the system of FIG. 1A FIGS. 2A and 2B illustrate how messages are processed (e.g., queued) according to the transaction protocol implemented on processing instances of the distributed system of FIG. 1A. FIG. 3 is a flowchart of a state machine that is part of the transaction protocol that may be implemented by each processing instance of the distributed system of FIG. 1A. FIGS. 4A and 4B are signal diagrams that illustrate example processing performed by a sequencer and a single processing instance of the distributed system of FIG. 1A. FIGS. 5A and 5B are signal diagrams that illustrate operations for redundant processing instances of the same service using the system of FIG. 1A. FIGS. 6A and 6B are signal diagrams that illustrate operations for multiple processing instances and multiple services using the system of FIG. 1A. FIGS. 7 and 8 are signal diagrams that illustrate operations for multiple processing instances and multiple services, where the processing of one service is dependent on the output from one of the services. FIGS. 9 and 10 are signal diagrams that illustrate operations for multiple processing instances and multiple services, one of which includes redundant processing instances. FIG. 11A illustrates different points at which crashes in handling a transaction may occur. FIGS. 11B-11C are signal diagrams that illustrate the processing that can occur during recovery process for crashes shown in FIG. 11A. FIG. 12A is a signal diagram that illustrates the processing that occurs when a redundant processing instance of a service crashes during processing for a transaction. FIG. 12B is a signal diagram that illustrates the recovery processing performed by the processing instance that crashed in the example shown in FIG. 12A. FIG. 13A is a flow chart of a recovery process that may be used by processing instances to recover from failures, such as those described in FIGS. 11B and 11C. FIG. 13B is a flow chart that illustrates example processing that may be performed as part of a recovery process for the failed processing instance from FIG. 5B. FIG. 14 shows an example computing device that may be used in some embodiments to implement features described herein.

In many places in this document, software (e.g., modules, software engines, processing instances, services, applications and the like) and actions (e.g., functionality) performed by software are described. This is done for case of description; it should be understood that, whenever it is described in this document that software performs any action, the action is in actuality performed by underlying hardware elements (such as a processor and a memory device) according to the instructions that comprise the software. Such functionality may, in some embodiments, be provided in the form of firmware and/or hardware implementations. Further details regarding this are provided below in, among other places, the description of FIG. 14.

Description of FIG. 1A: Distributed Computing System

FIG. 1A is an architecture diagram of an example distributed computing system (system) 100 that includes a sequencer 102 and multiple processing instances 110 for processing distributed transactions according to certain example embodiments.

The example system 100 is designed to process transactions that involve one or more services provided by the system. Each service can include one or more service instances (e.g., which may be implemented on or a type of processing instance) configured to perform one or more operations (e.g., a local operation, a local transaction operation, or a local data operation). The operations can be, for example, against a local datastore (e.g., local database 116). Accordingly, in carrying out a distributed transaction, system 100 will use one or more services that each perform one or more operations as part of that overall distributed transaction.

In certain example embodiments, a distributed transaction may involve a single service that has redundant service instances. In certain example embodiments, a distributed transaction may involve multiple different services (of which each may have multiple redundant service instances) that each perform a part of an overall distributed transaction. In some examples, performance of a first service in an overall distributed transaction relies on performance of a second service. Accordingly, different types of arrangements of services within the system may be provided according to need.

Requesting computer systems 106 submit requests that are handled by gateway 104. Communication between the various components of system 100 occurs using messaging subsystem 108. The processing instances 110 of the system 100 may be grouped into one or more services, of which each may have redundant service instance(s) for a given service. Turning now to example components of system 100.

1) Messaging Subsystem 108

System 100 includes a messaging subsystem 108 that is used to facilitate communication between processing instances, processes, modules, and the like that are part of system 100. Such communication can be carried out by using, for example, a command bus that is used to communicate unsequenced messages 130 to the sequencer 102 and a sequenced message bus that is used to communicate messages that have been sequenced by the sequencer 102 to other modules of the system 100. The messaging subsystem 108 may be an example of an electronic data network in certain example embodiments that may be implemented using different physical and/or logical communication technologies.

Unsequenced messages 130 may be communicated to the sequencer 102 via, for example, a command bus or the like of the messaging subsystem 108.

Sequenced messages 132 can be communicated from the sequencer 102 using a sequenced message bus. Accordingly, whenever a sequenced message is discussed herein as being communicated, that message may, in some embodiments, be communicated using the sequenced message bus or the like. Correspondingly, communication of a sequenced message also can (as a condition of such communication) include sequencing of the message by the sequencer 102 (described below). Whenever a sequenced message is communicated using the messaging subsystem 108, any/all of the modules (e.g., any of processing instances 110 (including any service instance 170 and gateway 104) in the system 100 that are listening on messaging subsystem 108 will receive that message. It is up to each module that receives a message to determine (e.g., by processing that message) if the message is relevant to the module and if it should take action/perform some operation in response to/based on the message.

As discussed herein, sequenced messages allow for a logical ordering of the state of the system 100. In general, prior to a message being sequenced it is not considered to be "within" the system 100. As an example, consider an implementation where a client system 114 transmits a message (via the gateway 104) with data indicating whether a particular light is red, yellow, or green. Once the gateway 104 receives the message, it will (a) communicate the message to the sequencer 102 for processing or (b) generate a corresponding message in a format that is internal to/understood by the messaging subsystem 108 and components within it, and then communicate (e.g., via a command bus) the corresponding message to the sequencer 102 for processing. In either case, the sequencer 102 will receive a message from the transaction gateway, sequence that message, and then communicate a sequenced message back out via the messaging subsystem 108 to be received by the transaction gateway 104 and/or other processing instances that are part of distributed computing system 100. With this type of implementation, a report for a color yellow light is not acknowledged by the system 100 (including, potentially, the transaction gateway that initially received the message) until a sequenced version of that message is communicated from the sequencer 102 back to the transaction gateway, and then back to the requesting system 106. Accordingly, for example, if the gateway 104 crashes after sending the message to the sequencer 102, it may still resume functioning once the sequenced message for the yellow light is received by the gateway-even though gateway 104 may have no record of receiving such a message from a system 106).

It should be noted that different terms other than communicated may be used herein in connection with describing the communication of messages via the messaging subsystem 108. Other terms include sent/sending, transmitted/transmitting, received/receiving, submit, picked up, and the like.

The communication of messages from the sequencer 102 via the messaging subsystem 108 may be carried out via atomic broadcasting, atomic multicasting, or other technics used to communicate messages from the sequencer 102 to other processing instances.

When messages are broadcast, the messages are communicated to all destinations on the messaging subsystem 108 (or do not specify a specific destination). When messages are multicast, the messages may be communicated to all destinations in a given multicast group. Unless otherwise specified herein, it will be appreciated that when the term "broadcasting", "broadcast," or similar is used that it may be similarly applied to multicast, multicasting, and/or other communication techniques. Accordingly, for example, discussion that a message that is broadcast to devices A, B, and C includes multicasting that same messages to a multicast group that includes A, B, and C.

In some implementations, messages that are communicated from the sequencer may specify a specific destination (e.g., a specific processing instance). In some examples, the communication of messages may include guaranteed delivery (e.g., via TCP or other similar protocols) of such messages to a destination. In other examples, the communication of messages may not include a guarantee of delivery (e.g., via UDP) and may only refer to the process of communicating a message from a given component-irrespective of whether any other component receives that message.

Accordingly, in general (and except for external communications and for communication of messages to the sequencer), as related to the communications relevant to the description herein, modules and the like within the distributed computing system 100 receive and operate based on messages that are communicated from the sequencer 102 via the messaging subsystem 108.

However, in some embodiments, other, non-sequenced data may also be communicated to the modules within the distributed computing system 100. For example, an incoming data feed may be a separate part of the messaging subsystem 108 that communicates data to the modules in the distributed computing system 100. For example, real time traffic data, real time weather data, etc. Due to the quantity of messages included in this feed, a separate messaging bus may be used to communicate such data messages to one or more components of system 100.

2) Transaction Gateway 104

A transaction gateway 104 of the system 100 is configured to accept requests (e.g., HTTP GET requests or the like) from external, remote, or other computing systems 106. The requests are then processed by the transaction gateway 104 that then communicates unsequenced messages to the sequencer 102 for processing (e.g., sequencing). In certain examples, the transaction gateway 104 forwards the messages received from external sources to the sequencer. In other examples, the transaction gateway 104 generates a new message that is communicated to the sequencer 102. The newly generated message may be in a different format form the message received by the transaction gateway 104 or may be in the same format.

In certain example embodiments, the transaction gateway 104 may perform additional processing based on newly received requests (e.g., validation processing, lookup processing, metadata generation, and the like) in connection with generating a message that is then communicated to the sequencer 102.

The transaction gateway 104 also receives sequenced messages 132 from the sequencer 102. These can be sequenced versions of the messages communicated from the transaction gateway 104 or may be sequenced messages that have been communicated based on messages communicated from other components of system 100—such as the processing instances for services A, B, or C.

In general, messages communicated from other components of the system 100 will be sequenced messages 132 that have been sequenced by sequencer 102. However, in certain instances, the transaction gateway 104 may receive and process unsequenced messages from other components of system 100. For example, results of database read operations may be communicated as unsequenced messages to transaction gateway 104, which may then reply with those results to a requesting computer system. Accordingly, the architecture of system 100 and the functionality provided by transaction gateway 104 may be flexibly adapted depending on application need.

3) Sequencer 102

The sequencer 102 is responsible for receiving unsequenced messages 130 via the messaging subsystem 108, sequencing those messages, and communicating sequenced versions of those messages back out on the messaging subsystem 108 as sequenced messages 132. This type of architecture allows for higher levels of fault tolerance. In certain example embodiments, the sequencer 102 may generate an message sequence—e.g., a reliable, total-ordered stream of all messages received by the sequencer 102 (or all messages that the sequencer chooses to sequence).

The sequencer 102 includes a sequencer datastore 103 that is provided in locally accessible memory for the sequencer 102. The sequencer datastore 103 may store multiple different sequencer identifiers including: 1) a global sequencer identifier, 2) a processing instance sequence identifier, for which multiple versions are stored for each processing instance within the system 100, and 3) a transaction sequence identifier.

The global sequencer identifier can be used to provide a reference for generating a totally ordered message stream. This identifier may be generated to be unique and increasing. More specifically, each message the is sequenced by the sequencer will be annotated with its own corresponding identifier (e.g. a number) for the global sequencer identifier. The global sequencer identifier can operate based on a logical clock or other clock and is used to generate the value used for each message processed by the sequencer 102. The global sequencer identifier can be increased for each successive message that is sequenced. In certain examples, the increase may be successive (e.g., 1, 2, 3, 4, etc.). Alternatively, the increase may be random or semi random (e.g., 1, 4, 6, 12, 13, 14, 18). and allows for creating and maintaining a totally ordered global state (e.g., of the messages) within the system 100.

The processing instance sequence identifiers may have similar logical ordering to indicate the relative ordering of messages that have been received and/or sent to/from a given processing instance that have been sequenced. Accordingly, each processing instance may have its own sequence identifier to track the ordering of messages communicated from that corresponding processing instance to the sequencer. In general, when the sequencer 102 receives a new message from a given processing instance, then the sequencer 102 will increment that processing instance sequence identifier for that processing instance. The message communicated from the processing instance may also include the identifier (or expected identifier) within the message that is communicated to the sequencer. The sequencer can then determine if the included identifier matches the one in data store 103. If the identifier does not match, then the message may be dropped (e.g., not sequenced or otherwise handled) by the sequencer 102. This type of functionality helps to ensure that the messages communicated by each processing instance (e.g., each service instance) are reliably handled.

A transaction sequence identifier (or a distributed transaction sequence identifier) is used to identify different distributed transactions that are being processed within system 100. This identifier may be generated to be unique and increasing. In certain example embodiments, the transaction sequence identifier may be similar to the other sequence identifiers and be used to indicate a relative ordering of when a given request for a transaction was initially received/processed for sequencer 102 (e.g., from an initial request). Each message for a given transaction that is processed/communicated among the components (e.g., the sequencer 102 and each of the processing instances 110) of the system 100 may include the transaction sequence identifier of the distributed transaction that is associated with that message. As discussed in greater detail below, a transaction sequence identifier may be used by the queuing logic of each service instance to determine how a given message should be processed. For example, each distributed transaction may have its own queuing data structure to store messages for that transaction within the corresponding service instance.

The use of sequencer 102 allows the system 100 to use an overall (e.g., system wide) timing scheme that is based on one or more sequencer generated/maintained identifiers. In certain example embodiments, the sequencer generated identifiers can be timestamps, which may be logical timestamps or based on real-time (e.g., from the real-time clock of the computing device on which the sequencer 102 is operating). For example, the sequencer may use an identifier that is based on the number of milliseconds since the system initialized (e.g., at the start of each day).

Each processing instance that receives sequenced messages can then derive its notion of time from the timestamps/identifiers included with each sequenced message. Accordingly, the correct "time" is provided from the sequencer as opposed to, for example, the internal system clock of the computing device on which one of the processing instances is operating.

In certain example embodiments, the sequencer 102 can have a backup that can act as a rewinder or read-only version of the sequencer. A rewinder instance (which may be called a replay instance or a replay processing instance herein) may store each sequenced message and provide functionality replaying the sequence of messages from any point in time in the stream. As new messages are sequenced, the rewinder may store each of those messages. Upon request, the rewinder may provide one or more sequenced messages to a processing instance. The messages may be communicated (e.g., multicast/broadcast/etc) over a sequenced stream (e.g., so that any other processing instance may see them) or may be communicated directly over a dedicated connection between the rewinder and the requesting processing instance. Additional details of a rewinder are discussed in connection with FIGS. 11A-13B.

In certain example embodiments, the sequencer 102 may include additional functionality. For example, sequencer 102 may be implemented with functionality for a matching engine as described in, for example, U.S. Pat. No. 11,503,108. In certain example embodiment, the sequencer 102 may also include functionality for determining how distributed transactions should be tasked (e.g., which services to use).

4) Processing Instances 110

Turning now more specifically to the processing instances 110, the distributed computing system 100 includes a plurality of processing instances 110 (which may also be referred to as "processing modules" or similar herein) that are distributed across computing nodes of the distributed computing system 100. Each processing instance includes program logic (e.g., in the form of software code, firmware, and/or hardware) that is used to process data, or otherwise provide the indicated functionality within the given processing instance. Processing instances 110 may include, in some examples, sequencer 102 and transaction gateway 104.

Each of the various processing instances may be implemented in different ways—e.g., to take into account design considerations of the distributed computing system 100 and/or the task(s) a given processing instance is designed to perform. For example, in some embodiments, one or more processing instances may be implemented in the form of a software application (e.g., an .exe or a daemon computer process) that, when instantiated and executed, runs with its own computer process space using the underlying computing resources (e.g., processor(s), memories, and/or other hardware resources) of the distributed computing system 100. Alternatively, or additionally, in some embodiments, different ones of the processing instances may be different computing threads or other computing sub-processes within a given computer process. In some embodiments, each, any, or all of the processing instances may be implemented by using a virtualized container or more full virtualized system. For example, each processing instance may be its own Docker container. Each virtual container may include the program logic that, when executed, carries out the tasks associated with that specific processing instance. Alternatively, or additionally, in some embodiments, each, any, or all of the processing instances may be implemented as field programmable gate arrays (FPGAs) or Application Specific Integrated Circuits (ASICs). Alternatively, or additionally, in some embodiments, a variety of the various approaches noted above for implementing these processing instances may be used; e.g., one processing instance may be implemented using a Docker container, another may be implemented as a software application that is running in a non-virtualized environment, and another may be implemented in the form of an FPGA. Accordingly, the techniques herein may be flexibly employed depending on the needs of a particular implementation for a distributed computing system.

In general, functionality that is provided in the processing instances 110 discussed herein is separate from that provided by the sequencer 102. As noted above, the processing instances 110 and the sequencer 102 communicate using the messaging subsystem 108. Processing instances communicate unsequenced messages to the sequencer for sequencing, and the sequencer sends sequenced messages that may be read by any of the processing instances. With the distribution of processing instances away from the sequencer 102 and the totally ordered messaging state that it provides, additional processing instances are able to be implemented without appreciably impacting performance of the overall system 100.

When processing instances are used to deploy services (such as services "A", "B", and "C" discussed herein), those processing instances 110 may be implemented as, or called, "service instances" or the like.

Description of FIG. 1B: Service Instance

FIG. 1B is an architecture diagram for service instances 170 that may be used in the system of FIG. 1A according to certain example embodiments.

Each implemented service (e.g., A, B, C, etc.) may be implemented within the system 100 by using one or more service instances 170. The service instances provide the functionality for that corresponding service. Different services may be included as part of system 100. These may be referred to as "micro" services in certain examples. Any given service may have as many services instances as desired for resiliency, performance, or the like. The service instances for a given service may be redundant service instances.

As an example, Service A in FIG. 1A includes two service instances. The two service instance are separate processing instances 110 and 111. The two service instances each operate as a backup to the other with both acting upon the sequenced messages 132 that are communicated from the sequencer 102. Example processing for a service with redundant service instances is shown in FIG. 5A where service A has service instances A (1) and A (2).

Each service instance 170 includes protocol code 112 that is used to implement, on each respective service instance, the techniques herein for handling sequenced messages received from the sequencer 102 and carrying out tasks, actions, local transactions, and the like as part of executing a distributed transaction within system 100.

Each instance of the protocol code 112 includes a transaction message process 150, at least a current transaction queue 240 (and allocation for future transaction queues 234), and a state machine process 250.

The transaction message process 150 and the state machine process 250 may be provided in separate computer process or may be within the same process space, but within separate computer threads (or fibers). As used herein, the terms "execution process" and "execution thread" include both execution of a computer process and execution of a thread (or fiber) within the same computer process. In general, the techniques herein allow for the transaction message process 150 and the state machine process 250 on the same service instance to operate concurrently. This allows, for example, messages to be written to a transaction queue while the state machine process 250 is operating (or waiting for application code 114 to complete an operation). Thus, in certain example embodiments, execution of the transaction message process 150 will typically not block execution of state machine process 250. Similarly, execution of state machine process 250 will typically not block execution of the transaction message process 150.

The transaction message process 150 may be configured to process sequenced messages 132 received from the sequencer 102. The transaction message process 150 can be used to write results of such processing to a current transaction queue, or one of multiple possible future transaction queues that may be provided within local memory of the computing device on which the service instance is operating. In certain example embodiments, the transaction message process 150 may also handle communicating resulting unsequenced messages 130 back to the sequencer 102 for sequencing. Additional details of the transaction message process 150 are shown and discussed in connection with FIGS. 2A-2B).

The state machine process 250 is configured to read messages from a transaction queue 240 and then take an appropriate action based on the contents of the message that has been read and/or a current state of a state machine. Additional details of the state machine process and actions that are performable therein are discussed in connection with FIG. 3.

The state machine process 250 may also invoke or interface with application code 114. In certain example embodiments, application code 114 is configured to interface with a database 116 that is stored in local storage of the computing device that is executing the respective service instance. In other examples, the application code may not interface with a database, but may have some other processing that is performed in connection with execution of a distributed transaction. For example, the other processing may involve requesting an additional service to perform an action or task. For example, make an airline reservation, send a message to an external service (and await a response), download a file from a website, conduct a stock trade, handling clearing for a stock trade, or any of many other possible actions that can be performed as part of a distributed transaction.

For a local database example, if database 116 is accessed by application code 114, then it may store data that is used in connection with processing a transaction. As an illustrative example, application code 114 may have a SQL query engine that is configured to process and execute queries against database 116 that is stored in non-volatile memory of a computing device on which the service instance is executing.

Each service instance (or each processing instance) may also include a local data store 118 that is configured to store: 1) the current global sequence ID for the global message state (e.g., which may be used to represent the current time for the respective processing instance); 2) the current processing instance sequence identifier for the respective processing instance; 3) a current transaction sequence identifier for the currently active transaction that the processing instance is handling (which may be a pointer to a data structure that holds data about the current transaction); 4) a plurality of data structures (e.g., current transaction queue 240 and future transaction queues 234) that each hold messages for the current and any future transaction (described in FIGS. 2A and 2B); and 5) a data structure to hold attributes of the current transaction, including, for example, the current state of the transaction (e.g., which state the state machine 250 is at), a list of other services (and/or service instances) participating in the transaction (along with the status of those services/instances—e.g., whether a vote to commit has been received for each participating service).

Communication between transaction message process 150 and state machine process 250 may be handled via a transaction queue 180. Examples of the transaction queue 180 include a current transaction queue 240 in FIG. 2A and the future transaction queue(s) 234 shown in FIG. 2B. In certain example embodiments, transaction message process 150 writes messages to any of the current transaction queue 240 and future transaction queue 234. In certain example embodiments, state machine process 250 reads from the current transaction queue. Upon completion of a distributed transaction, the current transaction queue may be updated such that one of the future transaction queues is now the current transaction queue.

Description of FIGS. 2A-2B: Message Queuing Process

The protocol for handling transactions within the system 100 involves reading sequenced messages and processing those into appropriate transaction queues (shown in FIGS. 2A-2B) and then dequeuing messages for processing by a state machine (shown in FIG. 3).

FIG. 2A is a flowchart that illustrates how each processing instance processes data messages read from a message stream of the system of FIG. 1A according to certain example embodiments; FIG. 2B graphically illustrates how transaction queues for each processing instance shown in FIG. 2A is maintained according to certain example embodiments.

At 200, the processing instance reads a new sequenced message from the stream of sequenced messages 132 that is provided by the messaging subsystem 108. As discussed herein and in connection with certain example embodiments, there may be three types of messages that are used by the example transaction protocol.

In certain example embodiments, messages that are communicated over a data communications network may be received by networking circuitry of the computing device that hosts the processing instance and then placed into a transaction queue or the like. Messages that are read at 200 may be read from the transaction queue. Thus, when messages are received, and the process shown in FIGS. 2A-3 is executing (and thus "busy" with other operations), the message may still be received at the computing device that is executing the processing instance.

A first message type is an initialization message which may have a 4 letter identifier of "XACT" in certain examples. This message is used to initiate a transaction (e.g., to inform processing instances that a new transaction has been initiated) and can include any or all of the following fields as contents within the message: 1) a transaction number (e.g., a transaction sequence identifier); 2 a transaction operation identifier (e.g., which indicates which database operation to execute); 3) a timeout period (e.g., the timeout period supplies the time interval to add to the message timestamp to determine the voting timeout time), and/or 4) a participant list (e.g. a list of services that are to participate in the transaction). In some examples, the transaction operation for the XACT message may be a SQL statement, or may be an identifier or other reference to a prepared SQL statement (e.g., to a stored procedure) or other operation to perform. Accordingly, the operation to perform may be carried as part of (e.g., as a payload of) the XACT message or may be a reference to an operation that is to be performed. Note that while database operations may be performed in certain examples for the transaction, that other types of operations may also be specified. As an illustrative example, an operation may be to generate an image, text, or some other content. As another example, an operation may be to request some additional data from a third-party data source (e.g., a website or the like). As another example, the operation may be used to trigger some additional action-such as moving a robot or machine to another position or to perform some additional task (e.g., as part of a manufacturing process). In other words, the type of operation that is performed may be a database option or some other type of operation.

A second message type is a vote message. This message may have a 4-letter identifier of "VOTE" in certain examples. Vote messages are used to carry the vote result from a given service instance (e.g., commit or abort) and any results of a performed (e.g., database) operation. This message can include any or all of the following fields as contents within the message: 1) Transaction number (e.g., a transaction sequence identifier), 2) service name (e.g., a name or identifier of the service providing the vote—in certain examples the service instance may be identified also), 3) vote result (a result of a vote for the service instance casting a vote—e.g., commit/abort), 4) operation results (e.g., the results of a database operation performed by the service instance). An example of the operation results may be, in the case of SQL operation, a JSON encoded query result set.

A third message type is a confirmation message and is used to indicate successful completion of the actual commit or abort operation. This message may have a 4-letter identifier of "CONF" in certain examples. This message can include any or all of the following fields as contents within the message: 1) Transaction number (e.g., a transaction sequence identifier), 2) service name (e.g., a name or identifier of the service providing the confirmation), 3) service number (e.g., an identifier for the service instance that is providing the confirmation)), 4) operation performed (e.g., the actual transaction operation performed by the service instance—e.g., commit or abort).

In certain example embodiments, the above three message types may be used in connection with implementation of the illustrative distributed transaction protocol by the system 100.

Returning to FIG. 2A, at 204, the contents of the message are retrieved by the processing instance and used to update the current time.

At 206, the processing instance determines if the current transaction (e.g., as set in the data store 118) has timed out based on the newly updated time. In certain examples, this process may be performed by comparing the current time to the timeout time for the current transaction.

If the current time is greater than the timeout time (or equal to in certain example embodiments), then the current transaction has timed out and a timeout event/message is generated at 215 and placed into the VOTE/TMOT queue of the current transaction queue 240 for the current transaction.

The process continues by obtaining the transaction number from the current message. If the transaction number in the current message is less than the current transaction number that is being handled by the processing instance, then the message is for a past transaction 220 and is discarded at 222. As an illustrative example, a message may include a confirmation from another service instance for a past transaction. According to the protocol used in connection with certain example embodiments, such a message may be discarded.

The next message is then read at 200. In other words, messages may be communicated and then sequenced by the sequencer—and some of those messages may be out of date. In some instances (e.g., due to database operation latency, network latency, or the like) prior transactions may end up being sequenced by the sequencer.

If the transaction number in the current message is greater than the current transaction number that is being handled by the processing instance, then, at 232, the message is placed into the future transaction queue 234 for that transaction number. FIG. 2B illustrates an example of the future transaction queues 234.

If the transaction number in the current message is the same as the current transaction number that is being handled by the processing instance, then the message is forwarded/placed into the current transaction queue 240.

The transaction queues (e.g., the collection of the current transaction queue 240 and the future transaction queues 234) include three separate priority queues 242, 244, and 246 (which may be called sub-queues in certain examples). Each of queues 242, 244, and 246 may be dedicated to holding incoming messages related to a given protocol state as discussed herein. Specifically, the protocol states for XACT, VOTE (and TMOT), and CONF each have a corresponding sub-queue dedicated for For example, for each given transaction number N, queue 242 is allocated for the transaction request (XACT) messages (e.g., the ready state). Queue 242 is allocated for VOTE and TMOT messages (e.g., the Vote state). And queue 246 is allocated for confirmation (CONF) messages (e.g., the confirm state).

Note that the VOTE message queue is used to perform an additional check before enqueueing a message to that queue. Specifically, if the timestamp on the incoming VOTE message is equal to or greater than the timeout time for the given transaction (either the current transaction or a future transaction), then the corresponding vote message is discarded. This short circuiting of the processing shown in FIG. 2A provides for a more efficient use of processing resources.

In other examples, more than three queues may be used (e.g., for protocols that have more than three states). In other examples, fewer than three queues may be used. In some examples, different states may be placed into the same queue. It will be appreciated that different types of data structures may be used to provide the queueing functionality herein.

In certain examples the queuing functionality may be based on the order in which the messages are read from the stream (e.g., at 200). In other examples, the queuing functionality may be based on the global sequencer identifier of the message. In other words, in certain examples, a message with a lower global sequence number may be received after a higher one (e.g., due to latency, a dropped packet, etc.). In an example where the messages are queued based on their global sequencer number, the lower number will be read from a sub-queue (e.g., 240) before the higher number, even if the higher number is received first. In other examples, the queuing of messages may operate based on the when a message is processed/received and thus a message with a higher global sequencer number may be processed from current transaction queue 240 prior to a message with a lower global sequencer number (e.g., if both messages are to be stored in the same sub-queue).

In any event, the current message is placed into the appropriate sub-queue of the current transaction queue data 240.

Next, at 248, the process reads the next state from one of the sub-queues. The determination of which sub-queue the process reads from is based on which state the current transaction is in for the state machine 250. In some examples, the current state of the state machine is stored in the local data store 118 or may be a queryable/exposed property of the state machine 250.

The read message (which may be the same or different than the message read at 200) is then submitted to the state machine 250 for processing. Details of the processing performed by the state machine are discussed in connection FIG. 3.

In certain example embodiments, when a transaction is completed (e.g., as a result of 308 in FIG. 3), then the future transaction queue of N+1 is set or otherwise "moved" to become the current transaction queue 240. In some cases, this may be accomplished by setting pointer for the current transaction queue to another location in memory (e.g., the location of the future transaction queue of N+1).

Description of FIG. 3: State Machine Process

FIG. 3 is a flowchart for an example state machine that is used to process transaction messages based on the processing performed in FIG. 2A according to certain example embodiments.

State machine 250 includes 3 different states: READY, VOTE, and CONFIRM. The READY state indicates this service instance is ready to start a new transaction. The VOTE state is the state the service enters after it attempts the operation for the transaction and submits, via a VOTE message to the sequencer, its vote for the overall transaction outcome (e.g., commit/abort) and the results of its operation (e.g., the output). In the case of an abort message, there may be an error message (e.g., a reason for the abort), or there ma be no additional data provided with an abort vote. The CONFIRM state is the state the service enters to finalize the transaction (e.g., to perform a commit or abort). In this state, the service will transmit a CONF message to the sequencer for completion of the transaction.

The messages that are read from the current transaction queue are processed to transaction the state machine 250 between these three states. As discussed herein, the current state of the state machine 250 is used to determine from which sub-queue the next message should be read. Note that while there are three different states within the state machine, that various processing may be performed in connection with each of the states. Each of the different states is discussed below.

The READY state 300 of the state machine 250 can be an initialized state for the state machine 250. In this state, the service instance is waiting to receive an XACT message (e.g., an "execute" message). This state is entered on both service initialization and on completion of a previous transaction (e.g., from 322). When in the READY state 300, the state machine processes, at 302, an XACT message by dequeuing the next XACT message from the current transaction queue 240 (e.g., from the XACT sub-queue 242).

At 302, when the state machine 250 processes an XACT message, any or all of the following processing may be performed (e.g., in the order set forth below or any other order).

First, the timeout value for the current transaction (e.g., as indicated in the XACT message) is set. This timeout is used to limit the time spent in the voting stage and may be computed by adding a configurable amount of time to the timestamp on the XACT message. This may be performed by adding the current time (as updated at 204) of the processing instance to the timeout value provided in the message and then storing that value in the local data store of the processing instance.

Second, the operation for the current transaction may be performed (e.g., the particular database operation) as defined in the XACT message (or attempted to be performed). As discussed herein, this may involve performing (for example), a SQL query against a local database 116 of the processing instance. In the case of SQL, the operation defined in the XACT message may include a BEGIN followed by the appropriate SQL statements. Note that in certain example embodiments, no commit or rollback processing may be performed at this state. In certain examples the results of the SQL operation may be written to, for example, a tempdb table or the like (e.g., until being committed).

In certain example embodiments, the operation of the state machine and the performance of the operations that are invoked by the state machine (e.g., the SQL query or other operations) block further pulling of messages from the current transaction queue. However, in certain example embodiments, incoming stream messages may still be processed and enqueued to the appropriate transaction queue as discussed in connection with FIGS. 1B and 2A. In other words, the state machine 250 may operate in one execution process, with the messaging processing discussed in connection with FIG. 2A in another execution process (with appropriate memory techniques used to ensure that the current transaction queue is locked during reads/writes by these two execution processes).

Third (and subsequent to/based on/as a result of the operation being performed), the state machine 250 causes the processing instance to send a vote result (with the results of the performed operation to the sequencer 102 for sequencing. For example, when the SQL query defined in the XACT message completes, the service instance will generate and submit a VOTE message (e.g., as unsequenced message 130—unsequenced vote message) to the sequencer 102 that includes the disposition of the operation (e.g., a commit/abort/error status). Also included in the VOTE message may be results from the SQL operation if any output was produced (e.g., the returned SQL data may be included as payload in the vote message). If other types of operations are performed, then the results of those operations may be included in the payload for the VOTE message that is generated and transmitted.

At 304, after sending the results, then the state machine sets its state to the VOTE state.

When the state machine is at the VOTE state, it will read the next message, at 306, from the sub-queue 244 of the current transaction queue 240. As noted herein, sub-queue 244 can hold both timeout messages and vote messages. If the message that is retrieved from sub-queue 244 is a TMOT message, then time out processing is performed at 308. If, however, the message that is retrieved from sub-queue 244 is a VOTE message, then processing at 310 is performed for the vote message.

When the processing at 308 is performed as a result of removing a TMOT message from sub-queue 244, the process sets all the other votes for the transaction that have yet to be received to abort. For example, a data structure may be maintained (e.g., in local data store 118) that includes the status of the various services/services instances involved in the current transaction. When a TMOT message is processed by the state machine, the process will set the status of every participating service (including the current service) for which a vote has not been received (e.g., processed by the state machine) to "ABORT". The process will then proceed continue processing at 314 (discussed below).

If a VOTE message is read from the current transaction queue 240, then it is processed by the state machine 250 at 310. The process updates an internal data structure-service votes data structure 311—for the vote indicated by that message. Thus, for example, if the state machine is operating on a service instance of service A and the VOTE message is for service B, the internal data structure for this service instance may be updated with the vote from service B for the given transaction.

In certain example embodiments, the service votes data structure may be initialized for the state machine 250 upon processing of the XACT message at 302. Such processing will store a record of the services involved in the transaction (e.g., as specified in the XACT message) at 311 and also initialize the vote state for each service (e.g., to undefined or, abort). Accordingly, when commit votes for a given service are received and processed at 310, they then may be recorded to the service votes data structure 311. Note that if a given service has already recorded a commit vote (e.g., service A1 has been processed when service A2's vote is processed, but service B1 vote has yet to processed), the vote may be discarded. In other words, only the first commit vote is processed and used to update the record for the service in the service votes data structure. However, in some examples, each vote that is processed may be stored within data structure 311 (e.g., it may be used to later analysis to determine performance and the like). Note that when abort votes are processed, those votes may not be stored within the service votes data structure (e.g., as they are not needed to determine when to terminate the voting period). However, in some examples, a record of abort votes may also be stored.

Once the vote from 310 is recorded, then the process moves to 312 to determine if there is a quorum of participating services for which a vote has been received. In certain example embodiments, a voting quorum is achieved when at least one commit vote is received from every service participating in the transaction. Note that the commit vote can be from any service instance of a given service. Indeed, vote messages that are processed may not be annotated with data that identifies the service instance from which the vote message originated. If a commit vote has been received from every service that is participating in the transaction, then the process immediately moves to 314. As used herein "immediately" in this context means without the state machine processing additional messages from the current transaction queue. An illustrative example of this is shown in FIG. 5A where the commit vote from A1 is dropped/not processed at 510. This is because the processing of the commit vote from A2 ends the voting period as discussed above and the state machine immediately transitions to the decide/commit processing.

However, in other examples, a different quorum process may be used. For example, a quorum may be achieved by receiving either a commit vote or at least two votes from services instances for a given service. Or a quorum may be achieved by receiving votes from every service instance of a service.

In any event, if there is a quorum, then the process moves to 314 to decide whether to commit or abort the transaction. If there is no quorum, then the process returns to VOTE state 304 and processes the next message from the current transaction queue 240.

Accordingly, once a vote message is sent (as part of processing performed at 302) from the state machine (e.g., from the corresponding processing instance), the state machine will remain at the voting stage until a quorum of votes is received or, alternatively, a timeout occurs.

It will be appreciated that the receipt of a given ABORT vote may not end the voting period in certain examples. Specifically, in certain example embodiments, the transaction protocol (e.g., as implemented on a given service instance) may have no knowledge of how many redundant service instances may be running for any given participating service. In other words, an ABORT vote from any given service instance does not prevent any other service instance of that same service from subsequently submitting a commit vote. Therefore, in the presence of only abort votes, the voting period is held open as long as possible to allow any potential COMMIT votes to arrive. The timeout set upon entry to the voting stage serves as a limit on how much time the state machine is allowed to wait until the voting period is closed. In alternative implementations, a list of service instances for each service may be provided in addition to each service (e.g., as part of the XACT message). In such a case, the abort votes may be tracked such that if as many votes as services instances have been received, then voting may be closed and the process moved to 314.

At 314, the voting stage ends, and a final decision is made as to the disposition of the overall transaction (e.g., COMMIT or ABORT). In certain example embodiments, the existence of one or more COMMIT votes from each participating service will result in a commit decision (e.g., at least one service instance from each participating service in a transaction will trigger a commit). In all other scenarios, the result of the decision is an ABORT. The following table provides an illustrative example for a two-service (A and B) transaction, with each service including two service instances (0 and 1).

TABLE 1

| #: | A0 | A1 | B0 | B1 | Decision |
|---|---|---|---|---|---|
| 1 | COMMIT | COMMIT | COMMIT | COMMIT | COMMIT |
| 2 | COMMIT | ABORT* | COMMIT | ABORT* | COMMIT |
| 3. | COMMIT | ABORT* | ABORT* | ABORT* | ABORT* |
| 4 | COMMIT | COMMIT | ABORT* | ABORT* | ABORT* |

Note that in the above examples, the listed ABORT votes can indicate: 1) an ABORT vote was processed for that service instance, 2) a timeout for voting occurred, the vote was set to abort, or 3) the voting period ended due to COMMIT votes being received from every service (e.g., in the case of example 2). Note that in certain instances, a record of an ABORT vote may be discarded (e.g., not stored within memory of the local computing device operating the service instance). This is because tracking ABORT votes may not be needed as each state machine can only transition out of the vote state if: 1) a timeout occurs; or 2) commit votes are received from every participating service.

In the above scenario 1, all COMMIT votes are received and thus the transaction is committed. In scenario's 3 and 4, the COMMIT quorum threshold is not reached (e.g., no COMMIT votes received from service B) and accordingly all service instances abort to comply with the overall transaction decision to abort (e.g., if one service votes to abort, then the transaction is aborted).

For scenario 2, multiple different possible actions may occur. In each case, both the A0 and B0 send COMMIT votes (e.g., processed by the state machine for a service instance). Once both of these COMMIT votes are processed, then the state machine that has processed both ends the voting period (e.g., a quorum has been reached as per 312) and then determines whether to commit or abort.

Note, however, that if the current local service instance voted to abort (e.g., the database operation failed), then that service instance will be unable to comply with the COMMIT action (e.g., as the database operation failed for some reason—there will be nothing to commit). In such a scenario, the local service instance may be marked for administrative action (e.g., as shown in FIG. 5B) and, for example, restarted. To put it another way, the local service must succeed with its operation in order for it to faithfully execute the decision for the transaction. If it fails to execute the operation, then it may not be able to carry out the transaction-even if the transaction being performed by system 100 has succeeded in committing.

There may be different reasons for service instances having ABORT votes as shown in the above table. Indeed, in some instances, no vote may be received. For example, in scenario 2, A1 may not be completed by the time both COMMIT votes are received from both services (from A0 and B0). A1 may be running behind (e.g., still working on a previous transaction or the like), experiencing overly long query execution times for the current transaction (longer than the voting timeout period/after the COMMIT from other service instances has been received), be located at a remote location, suffered a crash/failure, or the like. Accordingly, when A1 and B1 eventually catch up or recover (e.g., rewind), they will see (e.g., process) the same slate of votes as A0 and B0 saw originally, and thus make the same overall decision (to COMMIT) as both services have provided COMMIT votes.

In certain example embodiments, when such service instances catch up/recover, they will perform the database operation in accordance with the original transaction request. By this time, however, the transaction's overall disposition may have already been decided. In such a case, the local service instance will make a local decision whether to COMMIT or ABORT. If that local COMMIT/ABORT decision conflicts with the overall transaction decision, the following rule is applied: If the transaction decision was ABORT and the local service instance decision is COMMIT, the service instance aborts the transaction. If, however, the transaction decision was COMMIT and the local service instance decision is ABORT, the service instance must be taken out of service. This is because the local service instance cannot comply with the COMMIT decision (e.g., the operation the local service instance was tasked with performing was not performed and thus cannot be committed). In this type of situation administrative diagnosis may be warranted on the service instance.

Once the final commit/abort decision is made at 314, then transaction finalization is performed (e.g., commit or abort) by the local service instance on which the state machine is being executed.

On successful completion of finalization of the transaction, then a confirmation message (e.g., a CONF message) is sent to the sequencer for sequencing. This message ma include data that the finalization of the transaction has been completed. Any resulting data from the finalized transaction may also be included in the CONF message—e.g., a number of rows affected by the database operation, any error codes, or other data that may have resulted from finalization of the transaction.

After the confirmation message is sent, the state machine 250 transitions to the CONFIRM state 316. While in this state, the service instance will process CONF messages from the current transaction queue at 318 and will continue to do so until its own CONF message is processed at 320. The reception of the sequenced version of the previously transmitted CONF message serves as confirmation to the service instance and state machine that the finalization process for the transaction has completed successfully.

The identification of the CONF message as originating from the current service instance may be based on the included service name and number included in the CONF message.

Once the CONF message for the current service instance is received, then the process increments the current transaction number at 322 and the state machine 250 returns to the READY state at 300—at which point the process discussed herein repeats.

Note that when the transaction number is increased, this may also trigger adjusting which queue is the current transaction queue 240. For example, when the transaction number is increased, the pointer for the current transaction queue may be reassigned to the in-memory location of the next transaction queue (e.g., n+1). Accordingly, the messages that may have been placed in that queue may be processed as discussed above (e.g., because that queue is now the "current" transaction queue).

DESCRIPTION OF ILLUSTRATIVE EXAMPLES

The following are multiple different examples for how the system shown in FIG. 1A (and the components thereof discussed in FIGS. 1B-3) may be used. In each of the sequence diagrams that follow, messages are shown as being communicated between a service instance and the sequencer. Messages with dash-dot outline illustrate unsequenced messages and messages with a solid outline are sequenced messages. Each of the messages that is shown in the various figures may include an identifier for the service (or service instance), the service instance sequence number, and the message type. Thus, for example, message 404 is shown as "A:1:XACT." This indicates that this message is from/for service A (or service instance A1 for examples in which services have multiple instances), that the sequence number for that instance is 1 (e.g., the processing instance sequence identifier), and the message type is the XACT message. As noted herein, additional data may be included in such messages.

Each of the figures provide an illustrative example of how, for example, the state machine 250 moves between different states. FIGS. 4A and 4B illustrate a single service example. FIGS. 5A and 5B illustrate a single service with redundant service instances example. FIGS. 6A-6B illustrate a multiple service example. FIG. 7 illustrates a dependent service example. FIGS. 9-10 illustrate a multi-service with redundancy example. FIGS. 11A-11C illustrate how a single service can recover from crashes at various points in processing a transaction. FIGS. 12A-12B illustrate a redundant service example and the processing that occurs when one service instance fails. FIGS. 13A-13B are flow charts of the recovery processing that may be performed by each service instance in the event of failure.

1) FIGS. 4A-4B: Single Service

FIG. 4A illustrates a single service COMMIT example and FIG. 4B illustrates a single service ABORT example. The two examples illustrate a service 400 that is deployed within system 100, and in communication with sequencer 102.

At 402, a request is received from an external source (e.g., a requesting system 106). At 404, an unsequenced XACT message is communicated to the sequencer 102 for sequencing. The XACT message 404 includes the source ( ) of the message (service A), the processing instance sequence identifier from the processing instance that is communicating the message (1 in this case), the message type (XACT). As noted above, additional details may be included in certain examples and may include, for example, a list of participating services or the like.

The message is received by the sequencer 102 and the message is validated by comparing, at 405, the processing instance sequence identifier included in the message ("1") to the one stored with the sequencer 102 (e.g. "1", which may be stored in data store 103). If the comparison indicates a valid message (e.g., the processing instance sequence identifier in the message matches the one stored with the sequencer), then the message is sequenced by the sequencer 102 and communicated back at 406 as part of the stream of sequenced messages 132.

Note that for ease of description, that the processing performed for the processing instance sequence identifier discussed above is not shown in each figure. It will be appreciated, however, that in certain examples, whenever the sequencer 102 receives a message, and then validates that message as discussed above, the sequencer 102 will then automatically increment the current processing instance sequence identifier for that processing instance. Accordingly, in this example in FIG. 4A, the sequencer 102, in connection with transmitting message 406, may also increment the processing instance sequence identifier for processing instance A from "1" to "2".

The sequenced message from 406 is then received by service A 400. In certain example embodiments, when a new message is received by a processing instance, and that received message indicates the processing instance that has received the message also initially sent the unsequenced message (e.g., because message 406 indicates that "A" sent the message), then the processing instance will validate the received message by comparing the processing instance sequence identifier included in the sequenced message to the processing instance sequence identifier that is stored locally in data store 118. If the numbers match, then the processing instance will increment the processing instance sequence identifier that is stored in data store 118. This allows the processing instance to then use the updated processing instance sequence identifier for future messages that are sent to the sequencer for sequencing (e.g., at 412/422). The approach to using the processing instance sequence identifier in this manner allows the sequencer (and the processing instance) to validate the messages that they receive. For example, if there is no match, then the message may be discarded.

At 408, after the XACT message is received by Service A 400, the state machine of service A is set to the vote state.

At 410, the operation specified in the XACT message is started & performed. In the illustrative example shown in FIG. 4A, the operation is a SQL operation, and this is started with a "BEGIN" command with the provided SQL statements. At 410, the indicated SQL operation is performed against the local database 116.

At 412, Service A completes the SQL operation and generates and transmits a message to the sequencer 102 for sequencing. The message includes the processing instance sequence identifier that was updated at 407, and identification of the service that and the nature of the vote (e.g., COMMIT).

At 414, the sequencer 102 receives the vote messages, sequences it, and then sends a sequenced message at 414.

At 416, Service A receives and processes the sequenced message 414. At this state, Service A determines that a quorum has been reached because at least one commit vote has been received from each participating service (e.g., it is the only service participating in this transaction). Service A then determines the state of the transaction.

At 418, as it has received a commit vote from each participating service, the decision is made to COMMIT the transaction. In this example, the SQL transaction that was started at 410 is committed to the database 116.

At 420, the state of the state machine of Service A is changed to CONFIRM. At 422, a confirmation message is communicated to the sequencer for sequencing that the transaction has been committed.

At 426 the sequencer sends the sequenced version of the conformation message.

At 428, service A receives the confirmation message and determines, because it has received its own conformation message, to transition the state machine back to the READY state.

At 430 a response for the performed transaction may be returned to the requesting computing system. This response may indicate that the transaction was completed successfully (e.g., for an INSERT) or may provide a list of records (e.g., for a SELECT).

Note that in the examples discussed herein, the requests (e.g., 402 and responses (e.g., 430) are illustratively shown as being received/transmitted by services/service instances (e.g., Service A). However, as discussed elsewhere herein, requests may be received by another processing instance, such as gateway 104, which may then send the request to the sequencer 102 for sequencing. Thus, for example, the XACT message may be initially sent to the sequencer from the gateway. The sequencer may then sequence the message. Service A can then read the sequenced XACT message. Responses may be similarly provided by the gateway 104 back to a requesting service (e.g., based on the reception of the CONF message at 426). In other words, other processing instances beyond the service instances involved in a transaction may still act upon/take action based on the sequenced messages that are communicated (e.g., at 406/414/426). Such actions may include sending a response to a requesting computer system—or performing other actions or functionality (e.g., those that depend on completion, or failure, or the initially requested transaction).

In certain example embodiments, when a response is provided back to a requesting system the transaction that was originally requested (e.g., at 402) may be considered "complete" for system 100. Note, however, and in connection with other examples discussed herein, that one or more other service instances of the system 100 may still be processing data in connection with the distributed transaction.

FIG. 4B provides an illustrative example for how processing for a transaction that is aborted may be handled.

In the example shown in FIG. 4B, the initial XACT processing may be the same or similar. However, as shown in the example of FIG. 4B, instead of voting to commit the transaction, Service A 400 votes to abort the transaction. Accordingly, an abort message is communicated to the sequencer at 450. The sequencer 102 sequences that message and communicates the sequenced abort message at 452.

The abort message is processed by Service A. Note, however, that the voting process (e.g., as discussed in FIG. 3) does not terminate upon Service A receiving the abort vote. This is because the illustrative system allows for services to have any number of redundant service instances. Thus, there may be other redundant instances that are attempting the transaction as well. Accordingly, service A 400 (the service instance thereof) waits until a sequenced message 454 is received that is used by service A to compute whether a time out for the transaction has occurred. Note that sequenced message 454 can be any message that has been sequenced. As noted herein, messages that are sequenced by sequencer 102 may carry a global sequence identifier than can be used to compute/update the "time" used by the various processing instances in the system. Accordingly, in this example, sequenced message 454 is used to update the local time of service A 400. This is then used to determine that a timeout for the current transaction occurs at 456.

Once the timeout determination is made by Service A, then Service A performs operation in connection with deciding how to proceed with the transaction at 458. At 460, the transaction is aborted (e.g., the database operation against 116 is aborted). At 462, the state is set to CONFIRM and service A communicates a message 464 to the sequencer 102 for sequencing that confirms the abort processing.

The sequencer 102 sequences the confirmation message at 466. At 468, Service A receives the sequenced confirmation message and then moves the state machine 250 to the ready state.

A response is returned to the requesting computer system at 470.

2) FIGS. 5A-5B: Redundant Service

FIG. 5A illustrates a single service COMMIT example, the single service includes redundant service instances (500 and 502). FIG. 5B illustrates processing that occurs when the redundant instances of the single service conflict in abort/confirm votes.

The processing shown in connection with Example in FIG. 5A proceeds are discussed herein. A request is processed and an unsequenced XACT message is communicated to the sequencer 102 for processing. A sequenced XACT message is communicated and received by service instances 500 and 502. These two service instance act upon the XACT message because they are service instances for service A (which is indicated in the XACT message).

Each of the service instances 500 and 502 perform the requested operation and communicate their corresponding commit votes, which are sequenced by sequencer 102.

At 504, voting ends because a commit vote has been received from every participating service. In this case, A2's sequenced commit vote is received and processed by services instances 500 and 502 before A1's vote. When A2's vote is processed, the voting period ends and the processing by the service instances determines that (based on receiving commit votes from every participating service to the current transaction) to commit the transaction at 508.

At 510, A1's vote is received. However, this vote is moot as the voting period has ended so it will not be processed by the state machine for the respective service instance. In certain examples, the vote message will be placed into the current transaction queue. However, this message may not be read from the current transaction queue as the state machine will be at the CONFIRM state when messages are pulled from the current transaction queue next (e.g., at 318). Furthermore, when the current transaction number is incremented (e.g., at 322), the current transaction queue will be deallocated (e.g., it is not a past transaction queue) and thus not read.

In any event, the state of the state machine is set to CONFIRM and the confirmation message for the commit is communicated to the sequencer for sequencing.

After communicating the confirmation messages, a given service instance will wait until it receives its own confirmation message (e.g., 320 in FIG. 3). Other confirmation messages (e.g., from other service instances) may be moot, discarded, and/or not processed by a service instance. Thus, service instance 500 receives the conformation for A2 first, but continues to wait until its own conformation message is received at 512.

Once a service instance receives its own conformation, it then transactions back to the ready state (including processing for incrementing the current transaction).

FIG. 5B illustrates example processing that can occur when redundant service instances 500 and 502 issue conflicting votes (e.g., one an abort vote and one a commit vote). In this scenario, service A has two instances service instance 500 and service instance 502. During the transaction, service instance 500 votes to commit, but service instance 502 votes to abort (e.g., an issue with A2's local database 116 or the like). But, since at least one instance of service A has voted to commit, the overall transaction will commit.

In certain example embodiments, if any instance can't comply with the disposition of the overall transaction, it must be removed until the condition can be corrected (e.g., to repair the local database 116). Since service instance 502 needs to abort, it should be restarted or otherwise subjected to administrative intervention. Note that upon rewind/restart (e.g., as discussed in FIGS. 13A-13B), service instance 502, assuming it is now fully operational, will ultimately commit and therefore bring itself up to date.

In the example shown in FIG. 5B, the processing performed by service instance 500 is the same or similar as that shown in FIG. 5A. Specifically, service instance 500 votes to commit and then decides that the transaction should be commit at 550. Subsequent conformation messages are communicated after service instance commits the transaction.

However, the processing performed by service instance 502 is different due to the abort vote. Note that when service instance 502 receives its own abort vote that has been sequenced, that voting remains open. But, once the commit vote (from service instance 500) is received, then service instance 502 ends the voting period and determines how to proceed at 554.

At the decide processing 554, service instance 502 determines how to proceed for the transaction. As commit votes have been received from every participating service, the decision is to commit. However, as service instance 502 voted to abort it cannot comply with the commit decision for the transaction (e.g., the aborted transaction cannot be finalized). Accordingly, it may be marked for administrative action and/or restarted at 556. Once restarted, service instance 502 may process the rewind stream 558 (e.g., as discussed in connection with FIGS. 13A-13B).

Note that in the case of both service instances voting to abort, that processing may proceed in a manner similar to that shown in FIG. 4B. Specifically, as no COMMIT votes are received, the processing for each service instance will wait until the timeout period elapses. The processing for confirmation may be similar as well in that each service instance waits for its own conformation. Note that unlike the conflicting vote example shown in FIG. 5B, none of the service instances need to re-tasked/re-booted or the like. This is because the state of each service instance (abort) matches the state of the overall transaction (abort).

3) FIGS. 6A-6B: Multiple Services

FIG. 6A illustrates processing that occurs when multiple services are involved in a transaction, and those services vote to COMMIT a transaction. FIG. 6B illustrates processing that occurs when there are conflicting votes for a transaction.

The illustrative example in FIG. 6A includes processing as 625 that represents example processing that occurs for multiple services voting to commit a transaction. Note that when multiple services are involved in a transaction, each service instance involved in that transaction will wait until it has received commit votes from each service (e.g. irrespective of which service instance of that service is associated with the commit vote). Accordingly (for example), when service instance 600 receives the sequenced vote message for service B, it will continue to wait as no commit vote has been received from service A. However, when service instance 600 receives the COMMIT vote for service A at 610, then the processing performed on service instance 600 will move to the decision and committing of the transaction.

The next component to the performance of a transaction in certain example embodiments is the conformation processing that is performed at 650. In this case, each service instance (600/602) waits until it receives its own confirmation message from the sequencer 102. Accordingly, service instance 600 processes confirmation messages until the sequenced confirmation message of service instance 600 is received. Similarly, service instance 602 processes confirmation messages until the sequenced confirmation message of service instance 602 is received. In the case of service instance 600, the confirmation message from service instance 602 that is received prior to its own is ignored. In the case of service instance 602, the later received confirmation message of service instance 600 will also be ignored/discarded (e.g., it will be for a past transaction and handled as discussed in connection with 222).

FIG. 6B illustrates another example in which services A and B issue conflicting votes for a transaction to which they are involved in. As shown, service instance 600 votes to abort while service instance 602 votes to commit.

In processing these votes, both service instances 600 and 602 will continue to wait as commit votes have not been received from each involved service. Accordingly, a timeout determination at 662 and 664 will be triggered by the arrival of a sequenced message 660. This message may be used by the respective service instances to determine that the voting stage for the current transaction has timed out.

After the timeout determination, both service instances will determine that the transaction should be aborted (as not all services committed). And then the confirmation processing 675 for issuing abort conformation messages will be performed. As with the confirmation processing for commits discussed in connection with FIG. 6A, each service instance will wait for its own conformation message to be provided by the sequencer before transitioning back to the ready state.

This illustrative example scenario shows a transaction where there are two participating services, and one service votes to commit while the other votes abort. The overall transaction aborts—as both services must vote commit in order to commit the transaction. Note that it is irrelevant which service votes first. If the aborting service votes first, the committing service will accept this abort but wait until it sees it own vote on the stream (e.g., aborts do not end voting). If the committing service votes first, then the aborting service will see this commit vote but remain in voting, as it has not received commit votes from both services. Since voting will still be open after both services have voted, the voting period will stay open until timeout. At this time, both services move to the confirm state and the decision is made to abort. The illustrative example processing may be applied to n number of services that participate in a transaction.

Note that in certain example embodiments the processing when both A and B vote to abort may be substantially similar—with the only difference being that service instance's 602 commit vote would be an abort vote. The other aspects shown in FIG. 6B may be the same or similar when both services vote to abort.

4) FIG. 7: Dependent Service

In the illustrative example shown in FIG. 7, two services are provided. A transaction is initiated in which service B uses, as input, output from the operation performed by service A. Since the output from individual operations is carried within the vote messages (e.g., as a payload of message 704, which is then sequenced to message 706), the illustrative protocol discussed herein doesn't need to be substantially modified to handle dependent operations within an overall transaction. Rather, instead of starting its transaction operation immediately upon receiving the transaction request, service B waits to receive the vote message (706) from service A. Service A's output is then used by service B to complete its operation.

In FIG. 7, both service instances 700 and 702 receive the sequenced XACT message. As noted herein, the XACT message may include details for which services are to participate in the transaction, and which operations will be executed by those services. Accordingly, the XACT message may specify that service B's operation is dependent on the output from service A. Accordingly, when service instance 702 receives the XACT message and transitions to the vote state, it may enter a waiting period 710 until it receives the results of the operation performed by service A. Those results may be carried on the sequenced vote message 706.

Once service instance 702 receives vote message 706, it may retrieve the relevant data from the vote message and perform the operation. The results of its operation may then be carried on the vote message from service instance 702 (in accordance with the other example discussed herein).

Note that service instance 700 (and 702) will both wait until they have received conformation from each participating service (e.g., A and B) before determining how to finalize the transaction. Once finalized, then conformation processing 650 may be performed.

Note that dependencies can be supported across any set of service instances. As some illustrative examples. Service D may require input from services A, B and C. In such a case, service D waits for the vote messages from A, B, and C. It then extracts the required information from each vote message, and then proceeds with its own operation.

As another example, Service C may require information from service B, who in turn requires information from service A. Service B waits for service A's vote message, extracts the needed information, then proceeds with its operation. Service C waits until it sees service B's vote message and does the same.

The depth or chain in which services can depend on may be performed up to a timeframe related to the timeout parameter for the transaction. Thus, the longer the timeout, more services can be chained together for a given transaction. Accordingly, (as the timeout parameter is adjustable), the chain of services can effectively be any level.

5) FIG. 8: Service Timeout

FIG. 8 illustrates an example of the processing that occurs when one of the services involved in a transaction causes a timeout to occur. For example, one of the two participating services requires an extended amount of time to complete its database operation (which exceeds the set timeout time for the transaction).

As shown in FIG. 8, the operation 810 performed by service instance 802 for service B takes an extended amount of time (much longer than the time required for service A to complete its operation). Accordingly, by the time the results of the operation 810 are reported at 812 (much less communicated as a sequenced message to the processing instances of system 100), the timeout period for the transaction has expired. Accordingly, service A determines that the transaction should be aborted.

Note that due to the extended period in which operation 810 is being performed that there may be a backup in messages to be processed by service instance 802. Accordingly, the sequenced message carrying the time that triggers a timeout (e.g., as discussed in connection with 206 in FIG. 2A) may be processed by the transaction message process 150, but may only be placed into the current transaction queue for service instance 802 until it is processed in connection with the state machine thereof. In other words, the timeout message may be received by the service instance 802, but will not be acted upon (e.g., to terminate the transaction) until being processed in connection with the state machine.

In any event, the time determination at 814 and 816 is triggered because voting has ended and there is only a commit vote received for service A, but not vote for service B. Accordingly, the lack of a vote by service B is treated as an abort, and the decision that is executed by both service instances 800 and 802 is to abort. enough such that it does not submit a vote prior to voting period timeout.

Conformation processing 675 is then performed to confirm the ABORT of the transaction.

Note that the processing shown in FIG. 8 as part of the operation 810 may also be due to, for example, service instance 802 crashing—or some problem with the database that caused the database operation to hang. In such an event the following would occur (e.g., as discussed in connection with FIGS. 13A-13B) for service instance 802 (note this example assumes the confirmation process shown in FIG. 8 completes and the processing instance sequencer identifier that is stored with the sequencer is now 3 (or it expects 3).

First, service instance 802 would be set to the ready state and the number set to 1. Service instance 802 would eventually see the XACT sequenced message as part of the rewind stream and attempt to perform the operation again. Assuming the operation completes faster this time, a commit vote would be communicated to the sequencer 102. However, the sequencer 102 would drop this message as a duplicate. This is because the processing instance sequencer identifier included in the vote message to commit would be 1, when the sequencer is expecting it to be 3.

Service instance 802 would process the commit vote from service A, and then the timeout would be triggered (note that the commit vote noted in the above paragraph from service instance 802 was dropped by the sequencer and not sequenced). Accordingly, as voting has ended there is only one commit and service instance 802 decides to abort. It will be appreciated that this result is the same as the original transaction-even though service instance 802 sent a vote to commit.

With the decision to abort, service instance 802 sends a conformation message. This message is also dropped (e.g., it would have a processing instance sequencer identifier of 2, when the sequencer is expecting 3). However, service instance 802 would see its original conformation message (sent as part of the conformation processing of 675 in FIG. 8) as part of the sequenced stream and thus the conformation period for service instance 802 would be completed again. Service instance 802 would now be up-to-date with the sequencer (e.g. the processing instance sequencer identifiers would match).

Thus, even if service instance 802 of service B is manually restarted rather than crashing, the rewind process will still lead to the same outcome as the original transaction. Advantageously, once a transaction's voting history (e.g., whether explicit votes or timeout-aborts) is recorded to the sequenced stream 132, a replay of that sequenced stream will lead to the same result as the originally attempted transaction. Note that the use of a stream based concept of "time" can help to ensure that the voting timeout event occurs at the same point in the stream for all service instances. This, in turn, ensures that all service instances see, whether "live" or during a rewind, the exact same effective votes in the overall voting period. This behavior can thus be the source of the transaction protocol's guarantee that transactions always result in the same outcome, regardless of whether that outcome is a COMMIT, ABORT, or whether the transaction occurs live or during a rewind.

6) FIGS. 9-10: Multi-Service With Redundant Instance

In FIGS. 9 and 10, examples are provided for the processing that can occur when one of the services involved in a transaction has redundant service instances. FIG. 9 illustrates process that occurs when one redundant service instance votes to abort while the other votes to commit. FIG. 10 illustrates process that occurs when one redundant service instance exceeds the timeout period.

In FIG. 9, there are two services (A and B) where one service (B) has redundant service instances 904 and 906. Service A may have one service instance 902. In this example, during the processing for a transaction (e.g., in which processing performed by service instances 902 and 904 includes the same features as illustrated in 625), service instance 906 votes to abort by sending an abort vote 910, instance During the transaction, the redundant instance votes abort.

The sequenced abort vote is communicated to the service instances 902, 904, and 906. However, because each service has at least one COMMIT vote, the abort vote is ignored/dropped, and the determination for the transaction is that it should be committed.

But because the transaction is going to be committed, service instance 906 cannot comply (because it did not perform the transaction/it has been aborted). Accordingly, error handling process at 912 may be performed, which may necessitate restarting/reprovisioning service instance 906 at 914.

While service instance 906 is restarted and otherwise not able to complete the transaction, both service instances 902 and 904 perform the confirmation processing 650 to carry out confirmation/committing of the transaction.

This example illustrates the high availability provided when using multiple service instances for a given service. Since only one instance of a given service is required to commit, every other service instance of a service can fail without impacting availability.

Note that the restart/reprovisioning of service instance 906 may use the recovery processing discussed in connection with FIGS. 13A-13B. For example, if service instance 906 where to be restarted the following may occur.

First, the state of service instance 906 may be set to ready, with the current transaction number being 1. Service instance 906 would then receive the initial XACT request and attempt the option specified therein. Assuming the operation completes successfully, service instance 906 will then send a commit vote to the sequencer 102 for sequencing. However, this message will be dropped as a duplicate (e.g., due to the sequencer seeing the first abort vote 910).

Service instance 906 will then see the commit votes for both services A and B (as well as service instance's 906 original abort vote). The reception of the original sequenced abort vote for service instance 906 will cause service instance 906 to increase its processing instance sequence identifier.

The reception of COMMIT votes from every service in the transaction will then cause service instance 906 to end the voting period and determine how to proceed. The decision will be to commit and accordingly service instance 906 will commit the operation that it performed locally in accordance with the determination for the transaction. Service instance 906 will then send a conformation message as detailed herein. Once it receives its own conformation message, it will the move to the ready state (and increase the current transaction number) and be up to date.

Now turning to FIG. 10, this signal diagram illustrates a different example in which a redundant service instance takes a longer time to perform its operation. Specifically, using the techniques herein, redundant service instances (e.g., from an availability perspective) can be provided in a variety of situations. In certain example embodiments, it does not matter if the service instances are slow, in a remote Availability Zone, or even crash. This is because the transaction can still proceed by relying on faster/non-failing instances. The slow service instances will eventually "catch up" to the communicated sequenced message stream—and the protocol guarantees that the messages processing by a slow instance will lead to the same transaction outcome as the other service instances (e.g., the fast/non-failing instances) and their results.

Indeed, in this example, the time it takes service instance 906 to complete operation 1002 can even exceed the timeout "time" for the transaction. However, due to processing being performed based on time from the sequenced stream of messages, service instance 906 will continue processing the transaction (albeit slower than the other service instances participating in the transaction).

Turning to the specifics of FIG. 10, vote processing that involves service instances 902 and 904 is performed as discussed in connection with 625. Service instance 906 similarly begins performing its operation in 1002 accordance with the parameters of the XACT message. While service instance 906 is executing, service instances 902 and 904 complete and the results of their votes are communicated via sequenced messages 1002 and 1004. These are both received by service instance 906 and will be queued in the current transaction queue of service instance 906 while (or after) the execution of operation 1002.

Service instance 906 may also receive message 1008 (which may be received during execution of operation 1002) that includes a timestamp that causes the transaction message process 150 to add a timeout message to the current transaction queue. Note, however, that the timeout message will be after the commit messages in the current transaction queue (e.g., the timeout message will be processed by the state machine after the vote messages from 902 and 904). In certain example embodiments, the ordering of messages in the current transaction queue may be based on the global sequence identifier of that message.

Note that in some examples, a lower level protocol for the sequenced messages may only provide messages (e.g., as part of 200) to a processing instance in the order of the global sequenced stream (as opposed to the order in which such messages may arrive at the corresponding computing device on which the processing instance is operating). This technique can assist in resolving reception of messages in the global sequence of system 100 if they arrive out of order.

When operation 1002 is completed, service instance 906 will communicate a vote message 1006 to the sequencer 102 for sequencing. After communicating the vote message 1006, the state machine of service instance 906 will move the vote state and begin processing messages from the current transaction queue.

At 1010, the state machine of service instance 906 determines it has a quorum because the first two messages in the current transaction queue that are processed are the commits votes for both services A and B. As a quorum has been achieved, voting ends and the service instance moves to decide how to proceed with the transaction. Note that the next message that may be in the current transaction queue (in the VOTE/MTOM sub-queue) may be the timeout message. However, this timeout message will not get processed by the state machine as voting has ended.

After determining to commit the transaction, service instance 906 moves to the CONFIRM state and communications the conformation message to the sequencer for sequencing (not that conformation processing between service instances 902 and 904 may have already occurred at 650). As each service instance is only looking for its own conformation, service instance 906 waits until it receives its own conformation back as a sequence message before transitioning back to the ready state and incrementing the current transaction, and adjusting the current transaction queue (which will effectively discard the timeout message that has still yet to be processed)

Note that the sequenced messages of the COMMIT vote from service instance 906 are dropped (e.g., they are discarded per 222 in FIG. 2A) by each search instance (e.g., because voting has closed by the time those messages reach the service instances that are involved in the transaction).

The example shown in FIG. 10 also can be applied to situations in which multiple services (or all services) have redundant service instances. Accordingly, even if redundant services are placed in remote locations with long network delays (or computing systems with slower database access are used, etc.), all service instances involved in a transaction can still be guaranteed to reach the same transaction outcome.

It will be appreciated that, as a practical matter, voting timeouts can be determined and set to a value large enough to support network delays and database operations. Such considerations can ensure that even if a service instance in a primary zone fails, a remote instance will still be able to provide availability. In other words, if voting timeouts are too short and the primary instance is unavailable, the remote instance, although operating, will not be able to submit its vote in time. This can thus cause the overall transaction to abort (e.g., no commit vote was received in time from service A), and the protocol will ensure that all other participants (e.g., service B) in the transaction will abort as well.

7) FIGS. 11A-11C: Single Service Reliability

An advantageous aspect is the redundancy provided by the techniques discussed herein. Specifically, different types of crashes or errors can occur during processing. These can be hardware failures or the like. Advantageously the techniques herein can alleviate the problems posed by such issues.

FIGS. 11B-11C are sequence diagrams that illustrate recovery processing for a service instance 400 that has crashed in the situations shown in FIG. 11A using the system shown in FIG. 1A according to certain example embodiments. FIG. 11A shows different points at which a crash can occur from the processing for service instance 400 of FIG. 4A.

Crash 1104 occurs after the operation for the transaction has started (e.g., application code 116 has crashed), but before sending of a vote result for sequencing. Recovery processing for this example is shown in FIG. 11B.

Crash 1106 occurs after the operation for the transaction has ended, and after a vote result has been sent for sequencing. Crash 1108 occurs after the service instance 400 finalizing the local operation via a commit, but before a conformation can be communicated for sequencing. Recovery processing for crashes 1106 and 1108 is shown in FIG. 11C.

Turning to FIG. 11B, after restarting service instance 400 from crash 1104, service instance 400 is initialized by setting the current processing instance sequence identifier to 1 (or other initial number). Service instance 400 then initiates a rewind request 1112 to the rewinder 1100. In the request may be included the service name, the instance ID, and/or the amount of replay of the stream that is being requested.

In response to this request, the rewinder 1100 provides sequenced messages that would not have been received by service instance 400. This can include, for example, sequenced messages based on messages sent from service instance 400 and other sequenced messages. In certain example embodiments, every sequenced message from the start of processing by the sequencer 102 until the request may be provided by the rewinder.

In the example shown in FIG. 11B, the message that is provided to service instance 400 is the sequenced XACT message 1104. This message is communicated at 1114 from the rewinder 1100 to service instance 400. Once service instance 400 receives the XACT message, the same processing that is performed in FIG. 4A (e.g., from 408 onwards) is performed and the transaction is completed.

The example shown in FIG. 11C applies to the crashes that occur at 1106 and 1108. In both of these scenarios, service instance 400 crashes after its vote for the commit operation is communicated to the sequencer 102.

As shown in FIG. 11C, a rewind request 1122 is initiated to start the process of restoring service instance 400. In response, sequenced messages 1124 (XACT) and 1130 (VOTE) are provided. Note that these messages may be delivered at the same time (e.g., within milliseconds of each other). However, the transaction message process 150 will write the messages to the current transaction queue for processing. Accordingly, the VOTE message may already be in the current transaction queue 240 as the XACT message is being processed by the state machine 250.

In any event, as a result of processing the XACT message 1124, service instance 400 will send a VOTE message 1126 to the sequencer 102 for sequencing. However, the sequencer 102 will drop this message 1128 as the Processing Instance Sequence ID included in the VOTE message will not be valid. Specifically, the sequencer 102 will be expecting the next message from service instance 400 to have a Processing Instance Sequence ID of "3" (as opposed to 2). This is because the sequencer 102 would have increased the Processing Instance Sequence ID for service instance 400 when it originally received the vote message before the crash at either 1106 or 1108 (as shown in FIG. 11A).

However, as service instance 400 has moved to the next state in the state machine, it will process the VOTE message 1130. It will process the vote message no differently than if the vote message had been communicated from the sequencer (e.g., as in FIG. 4A). The remaining processing will proceed as discussed in connection with FIG. 4A to complete the transaction.

8) FIGS. 12A-12B: Redundant Service Reliability

FIG. 12A is sequence diagram that illustrates processing that occurs when a crash to a redundant service instance (1200) occurs using the system shown in FIG. 1A according to certain example embodiments. FIG. 12B is sequence diagram that illustrates recovery processing for a redundant service instance that has crashed in the example shown in FIG. 12A according to certain example embodiments. The processing performed in FIG. 12 may be the same or similar to that shown in FIG. 5A (which discusses processing for redundant service instances).

Redundant service instances 1200 and 1202 are involved in a transaction for service A that is initiated via the XACT message communicated from the sequencer. In performing processing for the transaction, service instance 1200 crashes at 1220. The crash occurs before service instance is able to send its vote message to the sequencer. The crash 1220 necessitates a restart of service instance 1200, at which point recovery processing 1250 is performed for service instance 1200 (discussed in connection with FIG. 12B).

Advantageously, while recovery processing is being performed, service instance 1200 continues to receive sequenced messages from sequencer 102 while also receiving prior sequenced messages from rewinder 1100. In other words, the messaging protocol and how a service instance handles sequenced messages may not depend on the source of the sequenced messages and accordingly sequenced messages from sequencer 102 can be processed in-line with sequenced message received from the rewinder 1100.

Also advantageously, while the recovery process of 1200 is being performed, the processing of conducting the transaction using service A (and specifically service instance 1202) can continue without interruption. Indeed, as discussed herein, an advantageous technical aspect of the employed protocol is that service instance 1202 (and sequencer 102) do not need to be informed of, or even aware, that service instance 1200 has crashed. Instead, they both can continue operating and processing operations for the requested transaction without interruption or explicit reliance on the existence of service instance 1200.

FIG. 12B illustrates recovery processing that is performed to have service instance 1200 recover from its crash. Note that while the processing shown in FIG. 12B is performed, service instance 1202 continues to operate as shown in FIG. 12A.

Similar to the restoration of service instance 400 in FIGS. 11B and 11C, a rewind request 1246 is initiated from service instance 1200. This causes the rewinder 1100 to send all (or some) of the sequenced messages that have been sequenced by the sequencer 102. In this example, the list of sequenced messages may include the XACT message 1248, the VOTE message 1252 (originally for service instance 1202), and the conformation message 1256 (also originally from service instance 1202). Note that depending on when the rewind request is initiated that some of the processing being performed by service instance 1202 may still be occurring. In such situations, those sequenced messages may arrive directly from the sequencer 102.

In any event, the XACT message 1248 is processed by service instance 1200. This cause the local operation to be performed, which (unlike in FIG. 12A), succeeds. As a result, a vote message 1250 is sent to the sequencer 102 for sequencing the includes the results of the operation performed by the service instance 1200. The vote message 1250 is received by the sequencer 102, which sequences that message and returns sequenced message 1254 (which will be dropped by all services as voting period will have closed).

In the meantime, service instance 1200 processes the vote message 1252 of service instance 1202. While vote message 1252 is shown as arriving from rewinder 1100, in certain examples it may arrive via sequencer. In any event, the processing of vote message 1252 causes the voting period of the state machine of service instance 1200 to close.

Service instance 1200, then finalizes the transaction and sends its conformation message at 1258. Note that the confirmation message 1256 of service instance 1202 may be received in the meantime. However, this will be ignored as the state machine of service instance 1200 remains in the conformation state until a service instance's own sequenced confirmation message is received at 1260. Accordingly, service instance 1200 is brought up to a current state via the recovery process.

This example illustrates that when a redundant service instance is used for a service, one of those service instances can crash without impacting availability. The surviving service instance will commit the transaction immediately and the failed instance will commit on rewind. Note that this example can be expanded to any number of redundant service instances with only one service instance required for a transaction to proceed.

Redundancy can be supported on a per-service basis. This means that the level of redundancy used in a system can be tailored to each individual service, with redundancy ranging from none to as many redundant instances as desired for each service.

In certain example embodiment, upon restart, service instances may start with an empty database and will re-apply each operation performed on that database to get back to a current state. In certain example embodiments, alternative recovery processing may be applied to speed up a restore of a service instance. For example, if a requested transaction operation was a read operation, the read operation may be skipped or otherwise short circuited during the recovery process as such an operation would not alter the state of the database. In some examples, this processing may be performed as part of the state machine. In some examples, the processing for handling this may be part of the application code. In other words, the application code may dictate that a read operation is to be skipped. In such a case an empty set or the like may be returned. However, even if the local database operations where to be skipped, the messaging protocol would still be used in connection with operations performed by the state machine. While some or all of the database read operations could be skipped, all write operations would be performed to ensure that the database recovers to its proper state.

Different types of service redundancy can be used in connection with the techniques described herein. Redundancy can be cold, warm, or hot.

In the case of a cold redundancy, a service instance is only activated when needed, at the cost of a delay until the service processes all relevant (e.g., write) transactions from the stream. The advantage of cold redundancy/backup can be cost avoidance as no compute instances need be allocated or running until they are required.

For warm redundancy, a service instance is live but only processes write transactions. The instance remains synchronized with the primary instance (in terms of state) but does not otherwise participate in live transactions (e.g., it is not a read replica). Warm backups can be made available without the delay incurred by cold backups (as a cold backup must consume the entire stream upon activation. The advantage of warm backups is in reduced time-to-recover, at the cost of deploying a compute instance on the same schedule as the primary instance.

For hot redundancy, a service instance participates in all transactions along with the primary instance. Hot redundant service instances can integrate seamlessly into an example system. Such service instances may be available immediately with no action on the part of system operator. Hot service instances can simultaneously perform a dual function of backup and read replica with little or no added operational or configuration complexity.

Redundancy can be provided in a local domain (e.g. the same data center, but a different computing device) or in a remote available zone or remote region. With such example technics, services using N redundant service instances for protection from failures can withstand the simultaneous failure of up to N−1 service instances without loss of availability.

Advantageously, redundancy can be added via compute instances of any appropriate level of performance/cost. For example, a primary instance of a service instance may warrant a high-powered compute resource for performance and responsiveness, but upon a failure of a primary instance it may be acceptable to temporarily operate in a performance-reduced mode. In this service model, availability is maintained while avoiding the cost of expensive redundant instances.

Description of FIG. 13A-13B: Recovery Processing

FIG. 13A is a flow chart of a recovery process that may be used by a service instance to recover from a failure according to certain example embodiments 11C. The process shown in FIG. 13A may also be used to add a new processing instance to the system 100.

After failure of a service instance, the service instance may be rebooted/restarted/reinitialized or the like at 1300. In certain example embodiment, restarting an existing service instance that has failed may be the same or similar to adding a new service instance to system 100. The new service instance may be a redundant service instance or may be a single service instance for a given service.

After restarting, the service instance may go through an initialization process that includes setting the state machine 250 of the service instance to a ready state at 1302 and then setting the current transaction sequence number to 1 at 1304. Setting the current transaction number to 1 will allow the service instance to process the messages from every transaction in order to bring the state of the local database of the service instance up to date.

At 1306 the service instance communicates a request for a stream of sequenced messages. In some examples this request is communicated directly to the rewinder of system 100. As noted herein the rewinder is a type of processing instance that functions as a read only record of the messages communicated from the sequencer 102. The rewinder does not sequence messages directly, but rather the rewinder records each sequenced message that is communicated by the sequencer as part of the stream of sequenced messages 132.

Accordingly, when a request is received from a processing instance of system 100, the rewinder may provide a replay of the stream of sequenced messages that was created by the sequencer 102. Note that because each message may be annotated with a global sequence identifier, a receiving processing instance can know the order in which those messages are to be processed.

The messages are received by the requesting service instance at 1308 and then processed.

The processing of messages includes, at 1310, processing each messages of the sequenced stream using the by the transaction message process 150 (as discussed in connection with FIG. 2A). Each message is processed and as needed, added to the relevant transaction queue of the service instance at 1312.

At 1314, messages are retrieved from the current transaction queue of the service instance and executed against the state machine.

It will be appreciated that the processing performed at 1310 and 1312 (e.g., performed by the transaction message process 150) may operate concurrently with the processing performed at 1314 (e.g., performed by the state machine process 250). This advantageously allows for processing a large amount of messages by the transaction message process 150 without having to wait for competition of, for example, the operations (e.g., the SQL operations) to be performed by the state machine process. Thus, if there is a large amount of sequenced messages provided by the rewinder for many transactions, the future queue(s) 234 may be used extensively and the state machine process can operate uninterrupted in order to update the state of the local database to a current state.

FIG. 13B is a flow chart that illustrates example processing that may be performed as part of a recovery process for a failed service instance according to certain example embodiments—such as shown in FIG. 5B. The example shown in FIG. 5B illustrates processing that occurs when a redundant service recovers from failing because that instance cannot comply with an overall decision to commit a transaction. The flow chart may operate in conjunction with the processing shown in FIG. 13A and illustrates a more detailed explanation of the processing that is performed when a failure such as shown in FIG. 5B occurs.

As discussed in connection with FIG. 5B, in certain instances, a service instance may vote to abort a transaction. However, the result of the overall transaction may be to commit (e.g., because a redundant service instance voted to commit). In such cases, even though the service instance has not crashed or otherwise gone offline, it still has entered a state in which it cannot comply with the overall transaction decision. For example, the database 116 of the service instance became corrupted or the like and thus the execution of the SQL operation failed (which caused the abort vote). In such instances, the service instance may be rebooted or otherwise reinitialized and the processing shown in FIG. 13B may be performed.

After the initialization process discussed in connection with FIG. 13A is performed, at 1350, the service instance will receive/process the original XACT message (as part of the request for the replay of the sequenced message stream).

At 1352, as part of processing the XACT message by the state machine of the service instance, the SQL operation will be performed. Assuming the SQL operation successfully completes this time, the state machine will transition to the vote state at 1354 and send a COMMIT vote to the sequencer 102 for sequencing at 1356. This COMMIT vote will (because the service instance has been reset) a Processing Instance Sequence ID of "1" (which is the same as the ABORT vote that was sent during the initial attempt to perform the SQL operation).

Note, however, that this COMMIT vote will be dropped by the sequencer because the sequencer is expecting the Processing Instance Sequence ID for service instance to be 2 (e.g., using FIG. 5B as an example). This is because the sequencer had previously sequenced the ABORT vote (as discussed in connection with FIG. 5B). Accordingly, the new COMMIT vote sent by service instance at 1356 to the sequencer 102 will be dropped (e.g. not sequenced) by the sequencer 102.

Once the COMMIT vote is sent by the service instance, the state machine of service instance will transition to the VOTE state and begin processing messages from the VOTE sub-queue of the current transaction queue of the service instance. In this example, the first message in the VOTE sub-queue is the ABORT message that was communicated by service instance (e.g., using the processing from FIG. 5B as an example).

Accordingly, at 1358, the ABORT vote is processed for service instance A2. As part of processing the ABORT vote, the state machine will update the Processing Instance Sequence ID that is stored in the local data store 118 (e.g., to be increased by 1 to 2). However, because this is an ABORT and no COMMIT votes have been received, voting remains open. Accordingly, the next vote message (which is A1's vote) is processed from the vote sub-queue at 1360. Because the vote from A1 is a COMMIT vote, voting is terminated at 1361.

At 1362, processing by the state machine is performed to commit the local data operation in accordance with the overall transaction state.

At 1364, the state machine sends a confirmation message. The conformation message that is communicated to the sequencer for sequencing includes a Processing Instance Sequence ID of 2 (which was increased based on reception of the ABORT message that was communicated from the replay service). Further, for this message, unlike the communication of the COMMIT vote at 1356, the message will be accepted by the sequencer 102 and sequenced.

At 1366, after sending the confirmation message, the state machine moves to the CONFIRM state and begins processing messages from the CONF sub-queue of the current transaction queue.

At 1368, the first confirmation message included in the CONF sub-queue that is processed may be the conformation message sent by A1 (e.g. as discussed in connection with FIG. 5B). However, as the confirmation process requires processing a service instance's own conformation before proceeding (e.g., as discussed in connection with 320), A1's confirmation message will be ignored.

At 1370, the next CONF message may be from A2 (which was just sent & sequenced by the sequencer 102) the state machine of the service instance will process this confirmation message and then transition back to the ready state at 1372 (e.g. by incrementing the current transaction number, etc.).

The above described processing illustrates aspects of the transaction protocol discussed herein that allow for an original failed vote to be part of the sequenced stream, but still have a service instance reliability commit (e.g., after being restarted) the transaction. This occurs even though the abort message from the failed service instance remains as part of the sequenced stream.

ADDITIONAL EMBODIMENTS

The techniques described herein may be employed in various ways.

In certain example embodiments a process instance (e.g., the gateway) may be dedicated to receiving requests and then communicating distributed transaction requests to the sequencer. In certain example embodiments, the described techniques may be used to enable parallel reads. For example, a system in which read operations are more frequent than write operations may be provided. For example, a typical transaction sequence for a given service (which may have multiple service instances) may be Write1, Read1, Read2, Read3. In certain example embodiments, a transaction coordinator service can be used to assign Read1, Read2, and Read3 to three different service instances of the given instance for execution in parallel. Note that due to the techniques discussed herein that the system ensures that all three service instances will have performed Write1 before attempting any of the three reads. Thus, each read can be assigned to a different service instance, concurrently, knowing that every service instance will have the same database state (post-Write1). In certain example embodiments such assignment may be performed by the sequencer, by a transaction coordinator service (e.g., the gateway), or another processing instance and allows multiple service instances to provide not only redundancy, but also deliver performance (e.g., significant) improvements via currently/pipelined reads.

The above implementation can also be employed in a scenario where system data can be partitioned (e.g., by alpha-partitions where data is partitioned between 26 different instances). Functionally identical services could then be deployed to manage each alpha partition individually. In such an implementation, a read query whose scope encompasses the entire alphabet, such as "Select all products that have been shipped in the last week." The system (e.g., the transaction gateway or the sequencer, or some other processing instance) can issue this broad query once, and all 26 per-letter services will perform the requested search on their particular letter (e.g., their local database) in parallel. All query results may then be published to the sequenced stream (e.g., they are carried as payload on vote messages). The transaction gateway (or other processing instance) can then reassemble the results to construct a complete response to the client. This approach turns a large, time consuming query against a single, large database into 26 small queries against 26 small databases in parallel.

In certain example embodiments, the techniques discussed herein can be used within an electronic exchange, such as described in connection with U.S. Pat. No. 11,503,108. The techniques herein may be used to allow an electronic exchange to simultaneously support both high performance trading and lower volume, more complex asset trading. Indeed, the techniques herein may leverage the sequencer functionality of illustrative electronic exchanges.

In certain example embodiments, high volume and low volume activities could be generally partitioned (e.g., onto separate processing instances) within an example distributed computing system (e.g., an electronic exchange). Such a distributed approach could then be used to allow certain types of assets (e.g., those that require higher performance, such as automated trading) to be deployed alongside other types of assets that may be traded manually or at least do not require such higher performance. In certain example embodiments, the technology described herein may be used in situations where, for example, new types of assets/markets that are just starting and the initial trading may have (or require) low performance. However, as requirements/demands evolve such that transitions to higher speed are desirable (e.g., for automatic trading and the like), the techniques herein may also be used in conjunction with higher speed distributed transaction systems.

Description of FIG. 14

FIG. 14 is a block diagram of an example computing device 1400 (which may also be referred to, for example, as a "computing device," "computer system," or "computing system") according to some embodiments. In some embodiments, the computing device 1400 includes one or more of the following: one or more processors 1402 (which may be referred to as "hardware processors" or individually as a "hardware processor"); one or more memory devices 1404; one or more network interface devices 1406; one or more display interfaces 1408; and one or more user input adapters 1410. Additionally, in some embodiments, the computing device 1400 is connected to or includes a display device 1412. As will explained below, these elements (e.g., the processors 1402, memory devices 1404, network interface devices 1406, display interfaces 1408, user input adapters 1410, display device 1412) are hardware devices (for example, electronic circuits or combinations of circuits) that are configured to perform various different functions for the computing device 1400. In some embodiments, these components of the computing device 1400 may be collectively referred to as computing resources (e.g., resources that are used to carry out execution of instructions and include the processors (one or more processors 1402), storage (one or more memory devices 1404), and I/O (network interface devices 1406, one or more display interfaces 1408, and one or more user input adapters 1410). In some instances, the term processing resources may be used interchangeably with the term computing resources. In some embodiments, multiple instances of computing device 1400 may arranged into a distributed computing system.

In some embodiments, each or any of the processors 1402 is or includes, for example, a single- or multi-core processor, a microprocessor (e.g., which may be referred to as a central processing unit or CPU), a digital signal processor (DSP), a microprocessor in association with a DSP core, an Application Specific Integrated Circuit (ASIC), a Field Programmable Gate Array (FPGA) circuit, or a system-on-a-chip (SOC) (e.g., an integrated circuit that includes a CPU and other hardware components such as memory, networking interfaces, and the like). And/or, in some embodiments, each or any of the processors 1402 uses an instruction set architecture such as x86 or Advanced RISC Machine (ARM).

In some embodiments, each or any of the memory devices 1404 is or includes a random access memory (RAM) (such as a Dynamic RAM (DRAM) or Static RAM (SRAM)), a flash memory (based on, e.g., NAND or NOR technology), a hard disk, a magneto-optical medium, an optical medium, cache memory, a register (e.g., that holds instructions), or other type of device that performs the volatile or non-volatile storage of data and/or instructions (e.g., software that is executed on or by processors 1402). Memory devices 1404 are examples of non-transitory computer-readable storage media.

In some embodiments, each or any of the network interface devices 1406 includes one or more circuits (such as a baseband processor and/or a wired or wireless transceiver), and implements layer one, layer two, and/or higher layers for one or more wired communications technologies (such as Ethernet (IEEE 802.3)) and/or wireless communications technologies (such as Bluetooth, WiFi (IEEE 802.11), GSM, CDMA2000, UMTS, LTE, LTE-Advanced (LTE-A), LTE Pro, Fifth Generation New Radio (5G NR) and/or other short-range, mid-range, and/or long-range wireless communications technologies). Transceivers may comprise circuitry for a transmitter and a receiver. The transmitter and receiver may share a common housing and may share some or all of the circuitry in the housing to perform transmission and reception. In some embodiments, the transmitter and receiver of a transceiver may not share any common circuitry and/or may be in the same or separate housings.

In some embodiments, data is communicated over an electronic data network. An electronic data network includes implementations where data is communicated from one computer process space to computer process space and thus may include, for example, inter-process communication, pipes, sockets, and communication that occurs via direct cable, cross-connect cables, fiber channel, wired and wireless networks, and the like. In certain examples, network interface devices 1406 may include ports or other connections that enable such connections to be made and communicate data electronically among the various components of a distributed computing system.

In some embodiments, each or any of the display interfaces 1408 is or includes one or more circuits that receive data from the processors 1402, generate (e.g., via a discrete GPU, an integrated GPU, a CPU executing graphical processing, or the like) corresponding image data based on the received data, and/or output (e.g., a High-Definition Multimedia Interface (HDMI), a DisplayPort Interface, a Video Graphics Array (VGA) interface, a Digital Video Interface (DVI), or the like), the generated image data to the display device 1412, which displays the image data. Alternatively or additionally, in some embodiments, each or any of the display interfaces 1408 is or includes, for example, a video card, video adapter, or graphics processing unit (GPU).

In some embodiments, each or any of the user input adapters 1410 is or includes one or more circuits that receive and process user input data from one or more user input devices (not shown in FIG. 14) that are included in, attached to, or otherwise in communication with the computing device 1400, and that output data based on the received input data to the processors 1402. Alternatively or additionally, in some embodiments each or any of the user input adapters 1410 is or includes, for example, a PS/2 interface, a USB interface, a touchscreen controller, or the like; and/or the user input adapters 1410 facilitates input from user input devices (not shown in FIG. 14) such as, for example, a keyboard, mouse, trackpad, touchscreen, etc.

In some embodiments, the display device 1412 may be a Liquid Crystal Display (LCD) display, Light Emitting Diode (LED) display, or other type of display device. In embodiments where the display device 1412 is a component of the computing device 1400 (e.g., the computing device and the display device are included in a unified housing), the display device 1412 may be a touchscreen display or non-touchscreen display. In embodiments where the display device 1412 is connected to the computing device 1400 (e.g., is external to the computing device 1400 and communicates with the computing device 1400 via a wire and/or via wireless communication technology), the display device 1412 is, for example, an external monitor, projector, television, display screen, etc.

In various embodiments, the computing device 1400 includes one, or two, or three, four, or more of each or any of the above-mentioned elements (e.g., the processors 1402, memory devices 1404, network interface devices 1406, display interfaces 1408, and user input adapters 1410). Alternatively or additionally, in some embodiments, the computing device 1400 includes one or more of: a processing system that includes the processors 1402; a memory or storage system that includes the memory devices 1404; and a network interface system that includes the network interface devices 1406. Alternatively, or additionally, in some embodiments, the computing device 1400 includes a system-on-a-chip (SoC) or multiple SoCs, and each or any of the above-mentioned elements (or various combinations or subsets thereof) is included in the single SoC or distributed across the multiple SoCs in various combinations. For example, the single SoC (or the multiple SoCs) may include the processors 1402 and the network interface devices 1406; or the single SoC (or the multiple SoCs) may include the processors 1402, the network interface devices 1406, and the memory devices 1404; and so on. The computing device 1400 may be arranged in some embodiments such that: the processors 1402 include a multi or single-core processor; the network interface devices 1406 include a first network interface device (which implements, for example, WiFi, Bluetooth, NFC, etc.) and a second network interface device that implements one or more cellular communication technologies (e.g., 3G, 4G LTE, CDMA, etc.); the memory devices 1404 include RAM, flash memory, or a hard disk. As another example, the computing device 1400 may be arranged such that: the processors 1402 include two, three, four, five, or more multi-core processors; the network interface devices 1406 include a first network interface device that implements Ethernet and a second network interface device that implements WiFi and/or Bluetooth; and the memory devices 1404 include a RAM and a flash memory or hard disk.

As previously noted, whenever it is described in this document that a software module or software process performs any action, the action is in actuality performed by underlying hardware elements according to the instructions that comprise the software module. Consistent with the foregoing, in various embodiments, each or any combination of the processing instances 110, service instances 170, protocol code 112, application code 114, sequencer 102, gateway 104, transaction message process 150, transaction queue 180, state machine process 250, each of which will be referred to individually for clarity as a "component" for the remainder of this paragraph, are implemented using an example of the computing device 1400 of FIG. 14. In such embodiments, the following applies for each component: (a) the elements of the 1400 computing device 1400 shown in FIG. 14 (i.e., the one or more processors 1402, one or more memory devices 1404, one or more network interface devices 1406, one or more display interfaces 1408, and one or more user input adapters 1410), or appropriate combinations or subsets of the foregoing) are configured to, adapted to, and/or programmed to implement each or any combination of the actions, activities, or features described herein as performed by the component and/or by any software modules described herein as included within the component; (b) alternatively or additionally, to the extent it is described herein that one or more software modules exist within the component, in some embodiments, such software modules (as well as any data described herein as handled and/or used by the software modules) are stored in the memory devices 1404 (e.g., in various embodiments, in a volatile memory device such as a RAM or an instruction register and/or in a non-volatile memory device such as a flash memory or hard disk) and all actions described herein as performed by the software modules are performed by the processors 1402 in conjunction with, as appropriate, the other elements in and/or connected to the computing device 1400 (i.e., the network interface devices 1406, display interfaces 1408, user input adapters 1410, and/or display device 1412); (c) alternatively or additionally, to the extent it is described herein that the component processes and/or otherwise handles data, in some embodiments, such data is stored in the memory devices 1404 (e.g., in some embodiments, in a volatile memory device such as a RAM and/or in a non-volatile memory device such as a flash memory or hard disk) and/or is processed/handled by the processors 1402 in conjunction, as appropriate, the other elements in and/or connected to the computing device 1400 (i.e., the network interface devices 1406, display interfaces 1408, user input adapters 1410, and/or display device 1412); (d) alternatively or additionally, in some embodiments, the memory devices 1402 store instructions that, when executed by the processors 1402, cause the processors 1402 to perform, in conjunction with, as appropriate, the other elements in and/or connected to the computing device 1400 (i.e., the memory devices 1404, network interface devices 1406, display interfaces 1408, user input adapters 1410, and/or display device 1412), each or any combination of actions described herein as performed by the component and/or by any software modules described herein as included within the component.

The hardware configurations shown in FIG. 14 and described above are provided as examples, and the subject matter described herein may be utilized in conjunction with a variety of different hardware architectures and elements. For example: in many of the Figures in this document, individual functional/action blocks are shown; in various embodiments, the functions of those blocks may be implemented using (a) individual hardware circuits, (b) using an application specific integrated circuit (ASIC) specifically configured to perform the described functions/actions, (c) using one or more digital signal processors (DSPs) specifically configured to perform the described functions/actions, (d) using the hardware configuration described above with reference to FIG. 14, (c) via other hardware arrangements, architectures, and configurations, and/or via combinations of the technology described in (a) through (c).

Technical Advantages of Described Subject Matter

In certain example embodiments, the distributed transaction processing techniques herein provide for guaranteed atomicity, consistency, isolation, and durability (ACID) of distributed transactions—such as distributed database transactions. In connection with one or more examples described herein, the distributed transaction processing techniques ensure that all participants (e.g., the services, and the service instances that make up each service) to a given distributed transaction follow a single, global decision as to the overall distributed transaction's disposition (e.g., either the distributed transaction commits or aborts). In some embodiments, the performance of distributed transactions with ACID properties can be enabled by using: 1) a sequencer that provides an ordered stream of messages consumed by service instances participating in a transaction, 2) a message queuing protocol that operates on each service instance to queue the messages, and/or 3) a state machine that controls execution, voting, and/or confirmation of the performance of distributed transactions (e.g., based on those messages that have been queued). In some examples, the message queuing protocol and the state machine protocol may be included as part of a transaction protocol that is implemented on service instances for different services involved in performing distributed transactions in a distributed computer system.

In certain example embodiments, the system includes a sequencer that provides a reliable, total-ordered stream of messages to the service instances (and other processing instances of the system). In some examples, the use of sequencer advantageously provides for a system-wide notion of time (e.g., as opposed to each service instance independently determining a current time). Specifically, each message that is provided by the sequencer includes a sequencer-generated timestamp that is unique and increasing. This type of implementation is advantageous as the time value of each service instance is based on the sequenced messages communicated from the sequencer—as opposed to relying on a RTC of the device on which the service instance is operating. Accordingly, when each service instance processes a message, it can update its own internal notion of time and take any appropriate action based on that updated time value. Advantageously, because every service instance is operating on the same time (e.g. logical time), aspects such as timeouts, ordering of transactions, and the like may be handled more efficiently than other distributed algorithms.

Another example of the advantageous aspects of using a sequencer and/or its provided notion of time is that service instances can recover from failures by reprocessing the total-ordered stream of messages. As the stream is processed by the recovering instance, transaction related operations that are time dependent can be replayed exactly as they were initially by time be derived from the message properties of the message stream.

In certain example embodiments, the transaction protocol used by each service instance includes as few as three message exchanges: (e.g., execute, vote, and confirm messages) to complete a transaction within the system. This type of protocol implementation provides for a relatively lower protocol overhead when implementing a distributed transaction system (e.g., as compared to other approaches).

In certain example embodiments, a message queuing protocol is provided on each service instance to process sequenced messages into one or more local queues. The queueing of messages to local queues allows the messages to processed by, for example, another execution thread (such as the state machine). Advantageously, the message queuing protocol may be placed into its own execution thread and may operate asynchronously or separate from other execution threads (e.g., the state machine). This technical advantage allows each service instance to process incoming messages and queue them appropriately without having to wait for execution (e.g., performed via a state machine) based on those messages.

In certain example embodiments, the message queuing protocol includes processing messages into current and future transaction queues that are maintained within local memory of each service instance. As messages are received, they may be placed into the current transaction queue, a future transaction queue, or discarded (e.g., if the message is for a past transaction). This processing into the various queues allows messages to be appropriately routed and then handled by the service instance.

In certain example embodiments, the message queuing protocol maintains different sub-queues within each queue. Each of the sub-queues are used to hold different ones of the various message types that may be communicated as part of the transaction protocol. For example, the types-execute, vote, and confirm, may each have their own sub-queue into which such messages are placed. Advantageously, by having the message queuing protocol separate the messages into separate sub-queues, then can then be processed more efficiently when they are read (e.g., by the state machine).

In certain example embodiments, the message queuing protocol includes timeout processing and/or updating a local notion of time. As noted herein, the local time on a service instance may be based on timestamp values included in sequenced messages. When the time value is updated based on processing of a sequenced messages, a timeout message may be determined and then inserted into a queue for the given transaction. The inserted timeout message may then be processed by the state machine when that message is dequeued. In some examples, the timeout messages is added to the same sub-queue as the vote messages. Advantageously, as the timeout message is inserted into the vote-sub queue, the logical timing of when the timeout message is processed by the state machine will be the same for all service instances. In other words, all service instances will process the timeout message in the same order (relative to other vote messages).

In certain example embodiments, the distributed transaction processing techniques herein allow for performing distributed transactions without relying on centralized transaction coordinator or manager such as found in other types of distributed transaction techniques. This type of processing is thus different from and a technical improvement over other distributed transaction techniques such as Two Phase Commit or Saga. This technical improvement is based on use of the state machine that controls execution, voting, and/or confirmation of the performance of distributed transactions.

In certain example embodiments, the performance of distributed transactions using the techniques herein is performed at a rate determined by the fastest available service instance(s). More specifically, in some examples, since only one (service instance of a given service can be required for a transaction to proceed (e.g., a commit vote), other instances may lag behind (or suffer a crash failure) without delaying the transaction. Slower instances may then eventually catch up or recover (e.g., based on receiving messages from a replay instance). The techniques herein leverage the described state machine ensure (e.g., via the sequencer and/or processing of messages by the state machine) that slower instances (or those that have crashed) will conform to the correct overall transaction outcome.

In some examples, the increase in performance may be based on determining success of a transaction upon receiving a commit vote from each participating service regardless of which service instance of that service provides the vote. Once this minimum number of commit votes is received (e.g., 1), the transaction protocol (e.g., the state machine) will proceed without waiting to receive votes from other service instances. This type of approach can result in improved performance characteristics for distributed transactions-without impacting service reliability. Note that instances whose votes arrive after a commit quorum is reached (e.g., those that are slow or have crashed) may still comply with the overall decision to commit the transaction. Moreover, the full voting timeout period may be used when only abort votes are received (or no vote is received). This type of implementation thus allows for adding additional service instances without impacting performance-indeed performance may be positively impacted as additional services instance may provide commit votes more quickly.

In certain example embodiments, each service instance (e.g., each state machine) participating in a distributed transaction has a list/record (which may be defined statically and/or dynamically) of all other services participating in that same transaction. This information may be provided in the execute message. However, advantageously, each service instance (including in some examples the sequencer) does not require a list of all participating service instances. This approach allows additional service instances to be deployed dynamically/on demand/at any time with little or no impact on the configuration or operation of the distributed computing system. This type of configuration, in some examples, can also decrease the overall configuration complexity of the transaction protocol (e.g., as each service instance and/or the sequencer does not need a list of every other service instance). Moreover, when a vote message is processed by the state machine, the service instance that initially sent the vote message is not needed in determining how the current service instance is to proceed with the transaction. In certain examples, this service level awareness of the protocol (as opposed to a service instance level of awareness) enables vote messages to be processed when any service instance of a given service provides a commit vote.

In certain example embodiments, the distributed transaction processing techniques herein allow for increased horizontal scaling of the system that are practically only bound by physics (e.g., network latency). The distributed transaction processing techniques herein also can be flexibly deployed on different levels of computing power. For example, a service may have a primary service instance deployed using a high powered compute resource to provide responsiveness and performance, but may be accompanied by one or more medium or low powered compute instances for redundancy. There is no inherent requirement that instances deployed for redundancy necessarily match the cost and performance level of a service's primary instance. Advantageously, distributed transaction processing techniques herein allow for all service instances achieve to identical transaction outcomes even if one or more of the instances is lagging behind the "live" stream and/or experiences a crash/restart.

In certain example embodiments, the described transaction protocol (e.g., the state machine) only requires confirmation messages to include service instance details in submitted confirmation messages. The service instance details are provided so that a given service instance can confirm that its own confirmation message has been processed. This is in contrast to the processing of commit votes, which may be based on processing votes for a given service (as opposed a specific service instance). More specifically, a given service instance does not need to wait for every service instance to confirm a transaction before proceeding (e.g., before processing the next transaction). Rather, in some examples, each service instance only need wait until it receives its own, sequenced, confirmation message. In other words, each service instance only cares about its own state (e.g. its own confirmation vote)—as opposed to the confirmation state of other service instances.

In certain example embodiments, the distributed transaction processing techniques herein allow for consistency (e.g., immediate consistency). For example, so-called dirty reads are not needed and there may be no need to manage the eventual consistency of a given instance as all instances of a given service may be guaranteed to perform the necessary writes before participating in a subsequent read transaction. The guarantee is enforced by: 1) the sequenced message stream; 2) the message queueing protocol that operates on each instance; and/or 3) the state machine process that controls execution, voting, and confirmation of transactions.

In certain example embodiments, service instances can be configured to perform all relevant datastore writes. Such service instances can thus also be used, in certain examples, as read replicas-without the pitfalls of dirty reads or eventual consistency. Note that while some service instances "lag" behind in processing (e.g., still working on a prior transaction) new transactions, there is no possibility of a newly arriving read transaction being performed out of order. This is guaranteed because all transaction requests can be sequenced through the sequencer of the system (and arranged within each instance using the described message queueing protocol). Accordingly, a read request will, in certain examples, never be attempted before all prior transactions are performed by a given service instance.

In certain example embodiments, the techniques herein provide a transaction protocol that satisfies three requirements (termination, integrity, and agreement) of a valid consensus algorithm. 1) Agreement—All service instances agree on the same value (e.g., the outcome of commit or abort); 2) Integrity—The decided value (e.g., outcome) must have been proposed by some service instance in the group; and 3) Termination—All non-faulty service instances eventually decide on some value (e.g., the outcome). The use of a system-wide clock (e.g., the sequencer) in combination with synchronous messaging (where messages are assumed to arrive within some maximum timeframe) allows for satisfying the above consensus algorithm requirements. These techniques can be accomplished without the downsides associated with other types of implementations in, for example, fully asynchronous distributed environments.

In certain example embodiments, the distributed transaction processing techniques herein provide functionality for supporting interdependent operations within a single transaction without adding unnecessary (e.g., additional) messaging or transaction overhead. For example, a distributed transaction involves 2 services, A and B. If the datastore operation on B requires, as input, the output from the datastore operation on A, then B cannot start its operation until it receives the output from the operation on A. The distributed transaction processing techniques advantageously allow for this type of interdependent operation without the added complexity or messaging as compared to fully independent operations (e.g., that would involve A and B).

In certain example embodiments, the distributed transaction processing techniques herein allow for systems that have increased redundancy without comprising availability and/or performance. In certain types of traditional implementations, the addition of redundant processing capability can degrade performance (e.g., due to communication latencies between instances). In contrast, additional service instances for a given service using the techniques herein allow for redundancy protection, while also allowing consistent read replicas. Indeed, in certain example embodiments, multiple redundant services instances (or multiple services, each with corresponding service instances) can parallelize read requests to increase performance and responsiveness.

In certain example embodiments, the apportionment of logic and processing load across different processing instances (including different services and service instances) achieves a number of benefits, including (a) a more straight-forward design for the components (e.g., because, for example, different functionality can be split into separate components and a decrease in overall configuration complexity, (b) enhanced performance of the components because, for example, hardware resources can be dedicated to the functionality associated with a given service—while also allowing service instances to operate on votes from services and their own conformation messages, (c) enhanced overall performance of the system (with regards to throughput, latency, fault determinism, and the like)—including transaction performance based on the fastest available service instance, (d) maintainability of the system (e.g., because service instance can be dynamically added); and (e) increased tolerance and resiliency through the ability of the system handle errors or faults when service instances fail while processing a transaction.

Selected Terminology

The elements described in this document include actions, features, components, items, attributes, and other terms. Whenever it is described in this document that a given element is present in "some embodiments," "various embodiments," "certain embodiments," "certain example embodiments, "some example embodiments," "an exemplary embodiment," "an example," "an instance," "an example instance," or whenever any other similar language is used, it should be understood that the given element is present in at least one embodiment, though is not necessarily present in all embodiments. Consistent with the foregoing, whenever it is described in this document that an action "may," "can," or "could" be performed, that a feature, element, or component "may," "can," or "could" be included in or is applicable to a given context, that a given item "may," "can," or "could" possess a given attribute, or whenever any similar phrase involving the term "may," "can," or "could" is used, it should be understood that the given action, feature, element, component, attribute, etc. is present in at least one embodiment, though is not necessarily present in all embodiments.

Terms and phrases used in this document, and variations thereof, unless otherwise expressly stated, should be construed as open-ended rather than limiting. As examples of the foregoing: "and/or" includes any and all combinations of one or more of the associated listed items (e.g., a and/or b means a, b, or a and b); the singular forms "a", "an", and "the" should be read as meaning "at least one," "one or more," or the like; the term "example", which may be used interchangeably with the term embodiment, is used to provide examples of the subject matter under discussion, not an exhaustive or limiting list thereof; the terms "comprise" and "include" (and other conjugations and other variations thereof) specify the presence of the associated listed elements but do not preclude the presence or addition of one or more other elements; and if an element is described as "optional," such description should not be understood to indicate that other elements, not so described, are required.

As used herein, the term "non-transitory computer-readable storage medium" includes a register, a cache memory, a ROM, a semiconductor memory device (such as D-RAM, S-RAM, or other RAM), a magnetic medium such as a flash memory, a hard disk, a magneto-optical medium, an optical medium such as a CD-ROM, a DVD, or Blu-Ray Disc, or other types of volatile or non-volatile storage devices for non-transitory electronic data storage. The term "non-transitory computer-readable storage medium" does not include a transitory, propagating electromagnetic signal.

The claims are not intended to invoke means-plus-function construction/interpretation unless they expressly use the phrase "means for" or "step for." Claim elements intended to be construed/interpreted as means-plus-function language, if any, will expressly manifest that intention by reciting the phrase "means for" or "step for"; the foregoing applies to claim elements in all types of claims (method claims, apparatus claims, or claims of other types) and, for the avoidance of doubt, also applies to claim elements that are nested within method claims. Consistent with the preceding sentence, no claim element (in any claim of any type) should be construed/interpreted using means plus function construction/interpretation unless the claim element is expressly recited using the phrase "means for" or "step for."

Whenever it is stated herein that a hardware element (e.g., a processor, a network interface, a display interface, a user input adapter, a memory device, or other hardware element), or combination of hardware elements, is "configured to" perform some action, it should be understood that such language specifies a physical state of configuration of the hardware element(s) and not mere intended use or capability of the hardware element(s). The physical state of configuration of the hardware elements(s) fundamentally ties the action(s) recited following the "configured to" phrase to the physical characteristics of the hardware element(s) recited before the "configured to" phrase. In some embodiments, the physical state of configuration of the hardware elements may be realized as an application specific integrated circuit (ASIC) that includes one or more electronic circuits arranged to perform the action, or a field programmable gate array (FPGA) that includes programmable electronic logic circuits that are arranged in series or parallel to perform the action in accordance with one or more instructions (e.g., via a configuration file for the FPGA). In some embodiments, the physical state of configuration of the hardware element may be specified through storing (e.g., in a memory device) program code (e.g., instructions in the form of firmware, software, etc.) that, when executed by a hardware processor, causes the hardware elements (e.g., by configuration of registers, memory, etc.) to perform the actions in accordance with the program code.

A hardware element (or elements) can be therefore be understood to be configured to perform an action even when the specified hardware element(s) is/are not currently performing the action or is not operational (e.g., is not on, powered, being used, or the like). Consistent with the preceding, the phrase "configured to" in claims should not be construed/interpreted, in any claim type (method claims, apparatus claims, or claims of other types), as being a means plus function; this includes claim elements (such as hardware elements) that are nested in method claims.

ADDITIONAL APPLICATIONS OF DESCRIBED SUBJECT MATTER

Although process steps, algorithms or the like, including without limitation with reference to 4A-13B, may be described or claimed in a particular sequential order, such processes may be configured to work in different orders. In other words, any sequence or order of steps that may be explicitly described or claimed in this document does not necessarily indicate a requirement that the steps be performed in that order; rather, the steps of processes described herein may be performed in any order possible. Further, some steps may be performed simultaneously (or in parallel) despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary, and does not imply that the illustrated process is preferred.

Although various embodiments have been shown and described in detail, the claims are not limited to any particular embodiment or example. None of the above description should be read as implying that any particular element, step, range, or function is essential. All structural and functional equivalents to the elements of the above-described embodiments that are known to those of ordinary skill in the art are expressly incorporated herein by reference and are intended to be encompassed. Moreover, it is not necessary for a device or method to address each and every problem sought to be solved by the present invention, for it to be encompassed by the invention. No embodiment, feature, element, component, or step in this document is intended to be dedicated to the public.

The invention claimed is:

1. A distributed computer system for processing distributed database transactions, the distributed computer system comprising:
   a plurality of computing devices that communicate by using an electronic data network, each of the plurality of computing devices including at least one hardware processor;
   wherein the plurality of computing devices is configured to execute, across different ones of the plurality of computing devices, a sequencer, and a plurality of service instances that each include a local database;
   wherein the sequencer is configured to perform first operations comprising:
      receiving a plurality of unsequenced messages;
      for each corresponding one of the plurality of unsequenced messages, generating a corresponding sequenced message that includes a sequence identifier;
      communicating, using the electronic data network, each corresponding sequenced message;
   wherein the plurality of service instances are each configured to perform second operations comprising:
      initiating, based on a first sequenced message that has been sequenced by the sequencer, an operation against the local database that is part of a distributed transaction being performed by the distributed computer system;
      based on a result of the performance of the operation against the local database, sending, to the sequencer and as one of the plurality of unsequenced messages, a vote message that includes: a) a result of the operation against the local database, and 2) a vote result that is one of a commit vote and an abort vote;
      starting a voting period and, during the vote period, processing one or more sequenced vote messages that have been sequenced by the sequencer;
      ending the voting period;
      based on the processing of the one or more sequenced vote messages and the ending of the voting period, performing a determination as to whether the distributed transaction is to be committed or aborted; and
      based on the determination being to commit the distributed transaction:
         a) committing the operation to the local database; and
         b) sending, to the sequencer and as one of the plurality of unsequenced messages, a confirmation message for the distributed transaction, the conformation message including an identifier for the corresponding service instance.

2. The distributed computer system of claim 1, wherein the second operations further comprise:
   wherein the voting period is ended immediately upon determination that each service participating in the distributed transaction is associated with a commit vote.

3. The distributed computer system of claim 2, wherein a single service is participating in the distributed transaction, wherein at the single service has at least two different service instances of the plurality of service instances, wherein the voting period is ended immediately upon reception of the first commit vote of the one or more sequenced vote message that is/are processed.

4. The distributed computer system of claim 2, wherein the second operations further comprise:
   as part of processing the one or more sequenced vote messages that have been sequenced by the sequencer, storing, to a service votes data structure, a vote status for each service participating in the distributed transaction,
   wherein based on each service having a recorded commit vote in the service votes data structure the voting period is ended immediately, and then determination as to whether the distributed transaction is to be committed or aborted is performed.

5. The distributed computer system of claim 1, wherein the second operations further comprise:
   processing a sequenced confirmation message that includes the identifier of the corresponding service instance; and
   after processing the sequenced confirmation message, processing further messages for additional distributed transactions based on reception of additional sequenced messages, of the plurality of sequenced messages.

6. The distributed computer system of claim 1, wherein the second operations further comprise:
   maintaining a plurality of transaction queues in memory local to the corresponding service instance, the plurality of transaction queues including a current transaction queue and at least one future transaction queue.

7. The distributed computer system of claim 6, wherein the second operations further comprise:
   concurrently executing a message transaction process and a state machine process,
   wherein the message transaction process includes processing the plurality of sequenced messages and writing at least some messages to at least one of the plurality of transaction queues based on the sequenced messages,
   wherein the state machine process includes performing processing based on messages read from the current transaction queue.

8. The distributed computer system of claim 7, where the plurality of transaction queues each have multiple different sub-queues.

9. The distributed computer system of claim 8, wherein which one of the plurality of sub-queues the state machine reads from is based on which state, of a plurality of states, that the state machine is in.

10. The distributed computer system of claim 9, wherein the plurality of states includes a ready state, a vote state, and a confirmation state.

11. The distributed computer system of claim 6, wherein the second operations further comprise:
   changing one of the future transaction queues to be the current transaction queue;
   processing messages from the changed current transaction queue to carry out a further distributed transaction.

12. The distributed computer system of claim 1, wherein the second operations further comprise:
   updating, based on processing of a sequenced message of the plurality of sequenced messages, a current time for the corresponding service instance; and
   determining, based on the current time, whether the voting period has exceeded a timeout period.

13. The distributed computer system of claim 12, based on determination that the timeout period has been exceeded, ending the voting period, and determining that the distributed transaction is to be aborted.

14. The distributed computer system of claim 1, wherein
the first sequenced message includes results of another database operation performed by another service instance of a first service participating in the distributed transaction, and
the determination to commit is further based on reception of commit votes for at least the first service and a second service that both are participating in the performance of the distributed transaction.

15. The distributed computer system of claim 1, wherein the first operations further comprise:
storing, in local memory and for each corresponding one of the plurality of service instances, a service instance sequence identifier;
based on sequencing a message from a corresponding service instance, incrementing the service instance sequence identifier for the corresponding service instance, wherein the sequenced message includes an identifier that is at least based on the service instance sequence identifier for that corresponding service instance.

16. The distributed computer system of claim 15, wherein the first operations further comprise:
validating a sequence identifier included in an unsequenced message from a first service instance against the service instance sequence identifier stored in local memory for the first service instance; and
based on determination that the sequence identifier is not valid, discarding the unsequenced message without sequencing.

17. The distributed computer system of claim 1, wherein the distributed transaction involves multiple services, wherein each of the multiple services includes at least two service instances of the plurality of processing instance,
wherein the voting period remains open until one of:
a commit vote is received for every one of the multiple services that is participating in the distributed transaction, without regard to which service instance is associated with the commit vote, and
the voting period has exceeded a timeout period,
wherein the second operations further comprise confirming the distributed transaction by identifying a sequenced confirmation message that includes an identifier for the corresponding service instance.

18. A method of processing distributed database transactions in a distributed computer system that includes a plurality of computing devices that communicate by using an electronic data network, each of the plurality of computing devices including at least one hardware processor, the method comprising:
executing a sequencer;
executing, across different ones of the plurality of computing devices, a plurality of service instances that each include a local database;
at the sequencer:
receiving a plurality of unsequenced messages;
for each corresponding one of the plurality of unsequenced messages, generating a corresponding sequenced message that includes a sequence identifier;
communicating, using the electronic data network, each corresponding sequenced message;
at each of the plurality of service instances:
initiating, based on a first sequenced message that has been sequenced by the sequencer, an operation against the local database that is part of a distributed transaction being performed by the distributed computer system;
based on a result of the performance of the operation against the local database, sending, to the sequencer and as one of the plurality of unsequenced messages, a vote message that includes: a) a result of the operation against the local database, and 2) a vote result that is one of a commit vote and an abort vote;
starting a voting period and, during the vote period, processing one or more sequenced vote messages that have been sequenced by the sequencer;
ending the voting period;
based on the processing of the one or more sequenced vote messages and the ending of the voting period, performing a determination as to whether the distributed transaction is to be committed or aborted; and
based on the determination being to commit the distributed transaction:
a) committing the operation to the local database; and
b) sending, to the sequencer and as one of the plurality of unsequenced messages, a confirmation message for the distributed transaction, the conformation message including an identifier for the corresponding service instance.

19. The method of claim 18, further comprising:
at each of the plurality of service instances:
updating, based on processing of a sequenced message of the plurality of sequenced messages, a current time for the corresponding service instance; and
determining, based on the current time, whether the voting period has exceeded a timeout period.

20. A non-transitory computer readable storage medium storing instructions for use with a distributed computer system that includes a plurality of computing devices that communicate by using an electronic data network, each of the plurality of computing devices including at least one hardware processor, the method comprising, the stored instructions comprising instructions that are configured to cause at least one hardware processor to perform operations comprising:
executing a sequencer;
executing, across different ones of the plurality of computing devices, a plurality of service instances that each include a local database;
at the sequencer:
receiving a plurality of unsequenced messages;
for each corresponding one of the plurality of unsequenced messages, generating a corresponding sequenced message that includes a sequence identifier;
communicating, using the electronic data network, each corresponding sequenced message;
at each of the plurality of service instances:
initiating, based on a first sequenced message that has been sequenced by the sequencer, an operation against the local database that is part of a distributed transaction being performed by the distributed computer system;
based on a result of the performance of the operation against the local database, sending, to the sequencer and as one of the plurality of unsequenced messages, a vote message that includes: a) a result of the operation against the local database, and 2) a vote result that is one of a commit vote and an abort vote;

starting a voting period and, during the vote period, processing one or more sequenced vote messages that have been sequenced by the sequencer;

ending the voting period;

based on the processing of the one or more sequenced vote messages and the ending of the voting period, performing a determination as to whether the distributed transaction is to be committed or aborted; and based on the determination being to commit the distributed transaction:
  a) committing the operation to the local database; and
  b) sending, to the sequencer and as one of the plurality of unsequenced messages, a confirmation message for the distributed transaction, the conformation message including an identifier for the corresponding service instance.

* * * * *